(12) United States Patent
Tsuchiya et al.

(10) Patent No.: US 9,275,444 B2
(45) Date of Patent: Mar. 1, 2016

(54) IMAGE PROCESSING APPARATUS, IMAGE PROCESSING METHOD, AND PROGRAM TO PREVENT DEGRADATION OF IMAGE QUALITY

(71) Applicant: Sony Corporation, Tokyo (JP)

(72) Inventors: Takashi Tsuchiya, Tokyo (JP); Akihiro Okumura, Kanagawa (JP); Ichiro Fujisawa, Kanagawa (JP); Katsutoshi Ando, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 68 days.

(21) Appl. No.: 14/220,412

(22) Filed: Mar. 20, 2014

(65) Prior Publication Data

US 2014/0294294 A1 Oct. 2, 2014

(30) Foreign Application Priority Data

Mar. 29, 2013 (JP) ................................. 2013-071167

(51) Int. Cl.
*G06K 9/36* (2006.01)
*G06T 5/00* (2006.01)
(52) U.S. Cl.
CPC ................. *G06T 5/008* (2013.01); *G06T 5/003* (2013.01); *G06T 2207/20081* (2013.01)
(58) Field of Classification Search
None
See application file for complete search history.

(56) References Cited

U.S. PATENT DOCUMENTS 6,678,405 B1 * 1/2004 Kondo et al. ................. 382/159
2010/0086026 A1 * 4/2010 Paniconi et al. ......... 375/240.12

FOREIGN PATENT DOCUMENTS

JP 2000-308079 11/2000
JP 2000-341705 12/2000

* cited by examiner

*Primary Examiner* — Brian P Werner
(74) *Attorney, Agent, or Firm* — Frommer Lawrence & Haug LLP; William S. Frommer; Ellen Marcie Emas

(57) ABSTRACT

There is provided an image processing apparatus including: a prediction tap selection unit which selects a pixel which is a prediction tap used for prediction operation for acquiring a pixel value of a target pixel which is a target from a second image obtained by converting a first image, from the first image; a classification unit which classifies the target pixel to any class from a plurality of classes; a tap coefficient output unit which outputs a tap coefficient of a class of the target pixel from tap coefficients, acquired by learning to minimize an error between a result of the prediction operation using a student image corresponding to the first image and a teacher image corresponding to the second image; and an operation unit which acquires a pixel value of the target pixel by performing the prediction operation using the tap coefficient and the prediction tap.

9 Claims, 34 Drawing Sheets

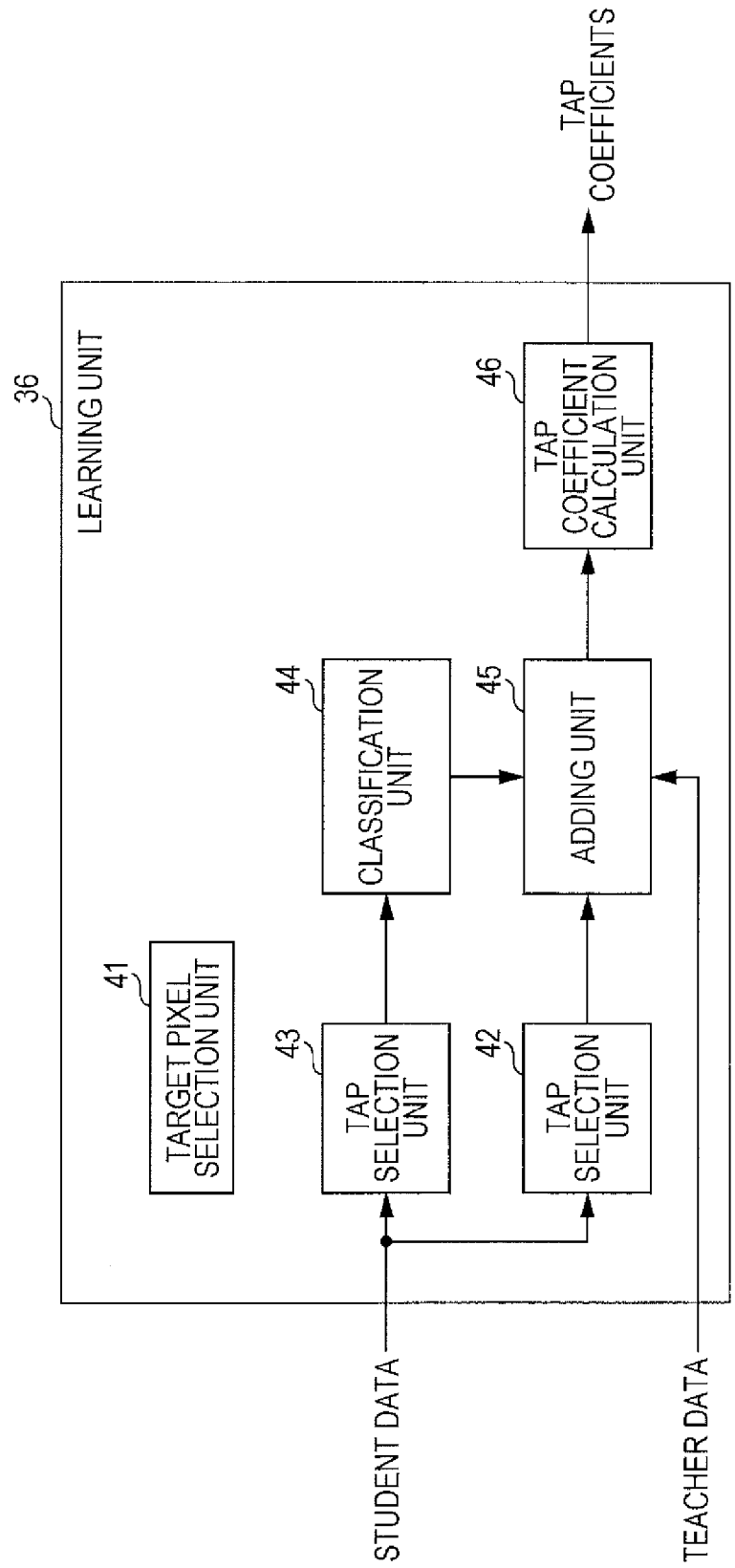

4 bit ADRC: PERFORM COMPRESSION BY SETTING DYNAMIC RANGE OF CLASS TAP WHICH IS EQUALLY DIVIDED INTO 16 PARTS AS THRESHOLD VALUE 1 bit ADRC: PERFORM BINARIZATION BY SETTING 1/2 VALUE OF DYNAMIC RANGE OF CLASS TAP AS THRESHOLD VALUE

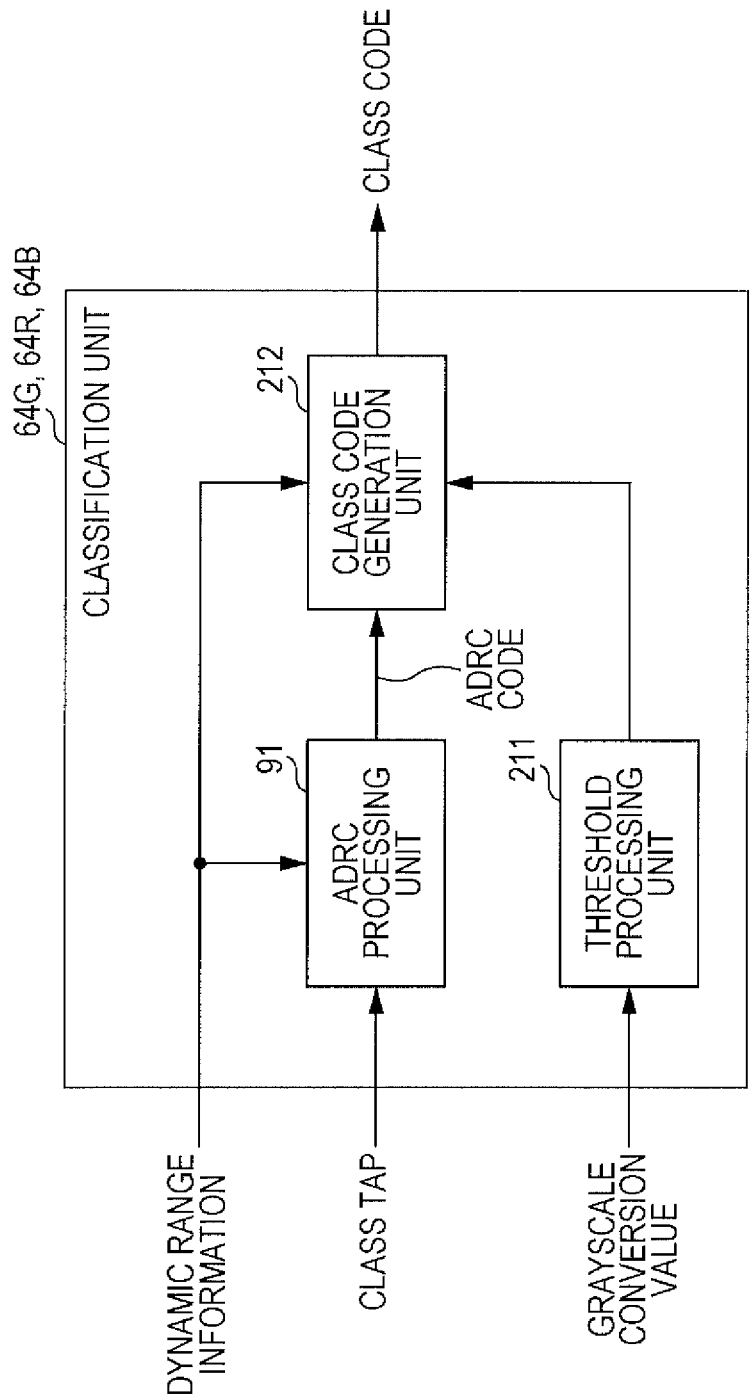

IMAGE PROCESSING APPARATUS, IMAGE PROCESSING METHOD, AND PROGRAM TO PREVENT DEGRADATION OF IMAGE QUALITY

CROSS REFERENCE TO RELATED APPLICATIONS

This application claims the benefit of Japanese Priority Patent Application JP 2013-071167 filed Mar. 29, 2013, the entire contents of which are incorporated herein by reference.

BACKGROUND

The present technology relates to an image processing apparatus, an image processing method, and a program, particularly to an image processing apparatus, an image processing method, and a program capable of preventing degradation of image quality.

There is classification adaptive processing or high-frequency emphasis processing, as sharpness improvement processing for improving sharpness of an image.

For example, an input image is converted into an output image having high image quality, by an operation using a plurality of tap coefficients acquired by learning and pixel values of a plurality of pixels of the input image (for example, see Japanese Unexamined Patent Application Publication No. 2000-308079 and Japanese Unexamined Patent Application Publication No. 2000-341705).

SUMMARY

In the classification adaptive processing, negative values are included in the tap coefficients, and as such negative tap coefficients are present, the output image having sharpness which is obtained by emphasizing a high frequency of the input image can be obtained.

However, in a case of a sharp change in pixel values of the input image, ringing occurs on the output image due to an effect of the negative tap coefficients, and as a result degradation in image quality such as occurrence of black pool-like marks around a high luminance portion of the output image, for example, occurs.

The present technology is provided to prevent the degradation of the image quality.

According to an embodiment of the present technology, there are provided an image processing apparatus or a program for executing a computer to function as an image processing apparatus including: a prediction tap selection unit which selects a pixel which is a prediction tap used for prediction operation for acquiring a pixel value of a target pixel which is a target from a second image obtained by converting a first image, from the first image; a classification unit which classifies the target pixel to any class from a plurality of classes according to a predetermined regulation; a tap coefficient output unit which outputs a tap coefficient of a class of the target pixel from tap coefficients used for the prediction operation for each of the plurality of classes, acquired by learning to minimize an error between a result of the prediction operation using a student image corresponding to the first image and a teacher image corresponding to the second image; an operation unit which acquires a pixel value of the target pixel by performing the prediction operation using the tap coefficient of the class of the target pixel and the prediction tap of the target pixel; and a dynamic range detection unit which detects dynamic range information showing a local dynamic range in a position of the first image corresponding to the target pixel, in which the prediction tap selection unit changes the number of taps which is the number of pixels which are the prediction taps, based on the dynamic range information.

According to an embodiment of the present technology, there is provided an image processing method including: selecting a pixel which is a prediction tap used for a prediction operation for acquiring a pixel value of a target pixel which is a target from a second image obtained by converting a first image, from the first image; classifying the target pixel to any class from a plurality of classes according to a predetermined regulation; outputting a tap coefficient of a class of the target pixel from tap coefficients used for the prediction operation for each of the plurality of classes, acquired by learning to minimize an error between a result of the prediction operation using a student image corresponding to the first image and a teacher image corresponding to the second image; acquiring a pixel value of the target pixel by performing the prediction operation using the tap coefficient of the class of the target pixel and the prediction tap of the target pixel; and detecting dynamic range information showing a local dynamic range in a position of the first image corresponding to the target pixel, in which, in the selecting of the pixel, the number of taps which is the number of pixels which are the prediction taps is changed, based on the dynamic range information.

In the present technology, the pixel which is the prediction tap used for the prediction operation for acquiring the pixel value of the target pixel which is the target from the second image obtained by converting the first image, is selected from the first image, and the target pixel is classified to any class from the plurality of classes according to the predetermined regulation. The tap coefficient of the class of the target pixel from tap coefficients used for the prediction operation for each of the plurality of classes, acquired by learning to minimize the error between the result of the prediction operation using the student image corresponding to the first image and the teacher image corresponding to the second image is output, and the pixel value of the target pixel is acquired by performing the prediction operation using the tap coefficient of the class of the target pixel and the prediction tap of the target pixel. In this case, the dynamic range information showing the local dynamic range in the position of the first image corresponding to the target pixel is detected, and the number of taps which is the number of pixels which are the prediction taps is changed, based on the dynamic range information.

The image processing apparatus may be an independent apparatus or may be an internal block configuring one apparatus.

A program can be provided by transferring through a transfer medium or by recording on a recording medium.

According to the present technology, it is possible to prevent the degradation of the image quality.

BRIEF DESCRIPTION OF THE DRAWINGS

FIG. 4 is a block diagram showing a configuration example of a learning unit;

FIG. 29 is a block diagram showing a configuration example of a classification unit;

DETAILED DESCRIPTION OF EMBODIMENTS

Figure 1:
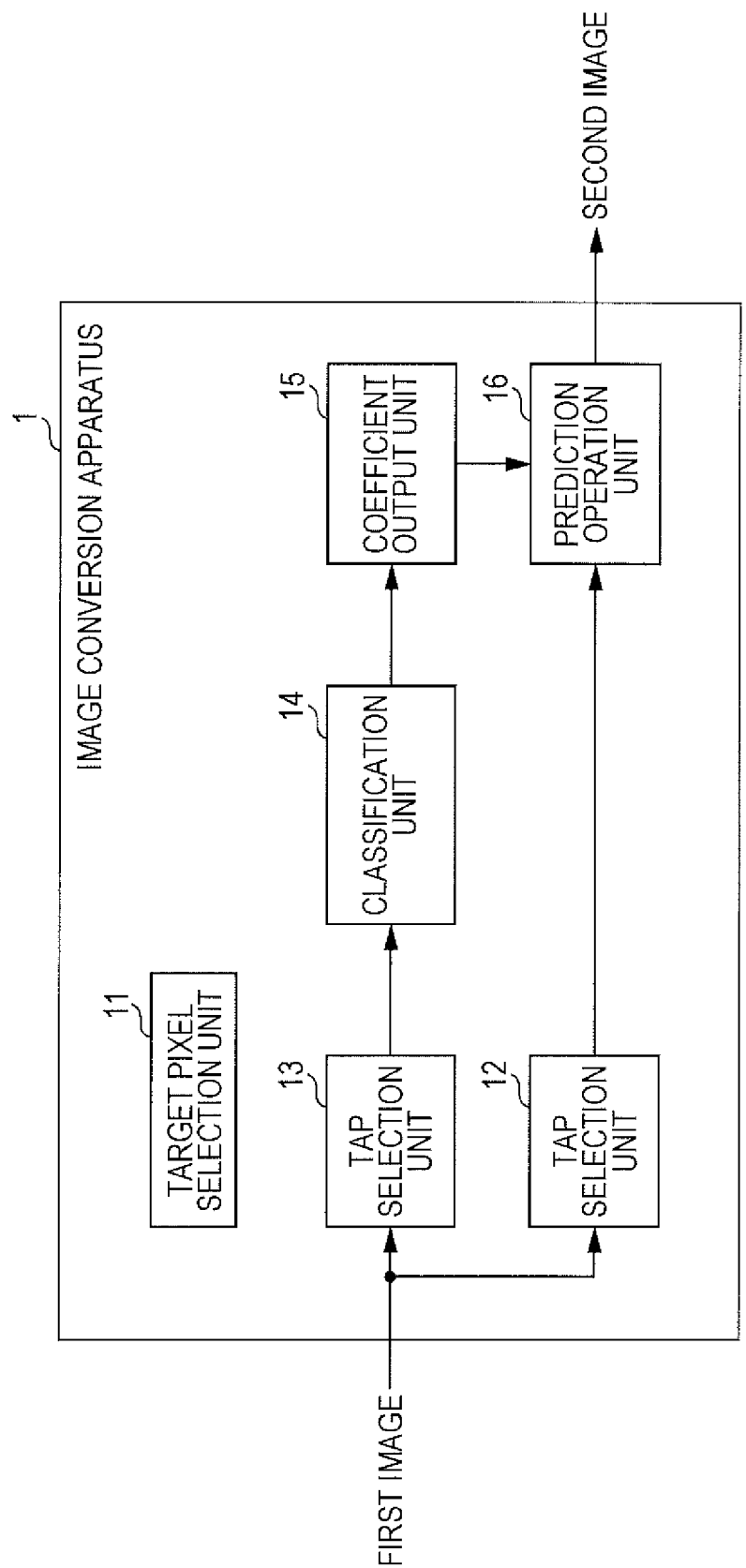
FIG. 1 is a block diagram showing a configuration example of an image conversion device which performs an image conversion process performed as a classification adaptive process.

Hereinafter, embodiments of the present technology will be described, but a classification adaptive process will be described first.

Classification Adaptive Process

The classification adaptive process is an image conversion process for converting a first image (image signal) to a second image (image signal), and accordingly is various signal processes depending on a definition of the first and second images.

That is, if the first image is set to be an image having low spatial resolution and the second image is set to an image having high spatial resolution, the image conversion process can be a spatial resolution creation (improvement) process for improving the spatial resolution.

If the first image is set to an image having a low S/N (Signal/Noise) ratio and the second image is set to an image having high S/N, for example, the image conversion process can be a noise removal process for removing noise.

If the first image is set to an image having a predetermined number of pixels (size) and the second image is set to an image having more or fewer pixels than the pixels of the first image, for example, the image conversion process can be a resizing process for performing resizing (enlargement or reduction) of an image.

If the first image is set to an image having low temporal resolution and the second image is set to an image having high temporal resolution, for example, the image conversion process can be a temporal resolution creation (improvement) process for improving temporal resolution.

If the first image is set to a decoded image obtained by decoding an image which is encoded in a block unit of a moving picture experts group (MPEG) encoding and the second image is set to an image before the encoding, for example, the image conversion process can be a distortion removal process for removing various distortions such as a block distortion generated due to MPEG encoding and decoding.

In the spatial resolution creation process, when converting the first image which is the image having low spatial resolution into the second image which is the image having high spatial resolution, the second image can be converted into an image having the same number of pixels as the first image and also can be converted into an image having a greater number of pixels than that of the first image. In a case of converting the second image into the image having the greater number of pixels than that of the first image, the spatial resolution creation process is a process for improving the spatial resolution and is also the resizing process for enlarging the image size (number of pixels).

As described above, according to the classification adaptive process, various signal processes can be realized depending on the definition of the first and second images.

In such a classification adaptive process, (a pixel value of) a target pixel is acquired by an operation using a tap coefficient of a class obtained by classifying (a pixel value of) a target pixel which is a target from the second image into any class among a plurality of classes, and (a pixel value of) a pixel of the first image selected with respect to the target pixel.

FIG. 1 is a block diagram showing a configuration example of the image conversion device which performs the image conversion process performed as the classification adaptive process.

In an image conversion device 1, an image supplied thereto is supplied to tap selection units 12 and 13 as the first image.

A target pixel selection unit 11 sequentially sets pixels configuring the second image as target pixels, and supplies information showing the target pixels to a necessary block.

The tap selection unit 12 selects some (pixel values) of the pixels configuring the first image used for predicting (pixel value of) the target pixel as prediction taps.

In detail, the tap selection unit 12 selects the plurality of pixels of the first image positioned spatially and temporally close to the temporal and spatial position of the target pixel, as the prediction taps.

The tap selection unit 13 selects some pixels configuring the first image used for performing classification to classify the target pixels to any of several classes, as class taps. That is, the tap selection unit 13 selects the class taps in the same manner as in the selection of the prediction taps performed by the tap selection unit 12.

Tap structures of the prediction tap and the class tap may be the same tap structure or may be different from each other.

The prediction taps obtained by the tap selection unit 12 are supplied to a prediction operation unit 16, and the class taps obtained by the tap selection unit 13 are supplied to a classification unit 14.

The classification unit 14 classifies the target pixels according to predetermined regulation, based on the class taps from the tap selection unit 13, and supplies class codes, obtained as a result, corresponding to the classes of the target pixels, to a coefficient output unit 15.

Herein, as a method of performing classification, adaptive dynamic range coding (ADRC) of quantizing pixel values (of pixels) as the class taps can be employed, for example.

In the method using the ADRC, the (pixel values of) pixels configuring the class taps are quantized and the classes of the target pixels are determined based on the ADRC code obtained as a result thereof.

That is, in L-bit ADRC, for example, a maximum value MAX and a minimum value MIN of the pixel values of the pixels configuring the class tap are detected, DR=MAX−MIN is set as a local dynamic range of an assembly of the pixels configuring the class tap, and the pixel value of each pixel configuring the class tap is quantized to an L-bit, based on this dynamic range DR. In detail, the minimum value MIN is subtracted from the pixel value of each pixel configuring the class tap, and the subtracted value is divided (quantized) by $DR/2^L$.

A bit string which is obtained by arranging the L-bit pixel value of each pixel configuring the class tap obtained as described above, in predetermined order, is output as an ADRC code.

Accordingly, in a case where the class tap is subjected to a 1-bit ADRC process, for example, the pixel value of each pixel configuring the class tap thereof is divided by an average value of the maximum value MAX and the minimum value MIN (round down decimal places) and accordingly the pixel value of each pixel is set to 1 bit (binarization). A bit string obtained by arranging the 1-bit pixel value in predetermined order is output as the ADRC code. In a case of performing the classification only with the ADRC, the ADRC code is set to the class code, for example.

In the classification unit 14, a pattern of level distribution of the pixel values of the pixels configuring the class tap can be output as the class code as it is, for example. However, in this case, when the class tap is configured with the pixel values of N pixels and an A bit is allocated to the pixel value of each pixel, the number of the case of the class code output by the classification unit 14 is $(2^N)^A$, and is the large number which is exponentially proportional to the number of bits A of the pixel value of the pixel.

Accordingly, in the classification unit 14, it is preferable to perform the classification by compressing an information amount of the class tap by the ADRC described above or vector quantization.

The coefficient output unit 15 stores the tap coefficient for each class acquired by the learning which will be described later, and outputs the tap coefficient (tap coefficient of the class shown by the class code supplied from the classification unit 14) stored in an address corresponding to the class code supplied from the classification unit 14 from the stored tap coefficients thereof. The tap coefficient is supplied to the prediction operation unit 16.

Herein, the tap coefficient corresponds to a coefficient to be multiplied by input data in a so-called tap, of the digital filter.

The prediction operation unit 16 acquires the prediction tap output by the tap selection unit 12 and the tap coefficient output by the coefficient output unit 15, and performs a predetermined prediction operation for acquiring a prediction value of (a true value of) the pixel value of the target pixel, using the prediction tap and the tap coefficient. Accordingly, the prediction operation unit 16 acquires and outputs (the prediction value of) the pixel value of the target pixel, that is, the pixel value of the pixel configuring the second image.

Figure 2:
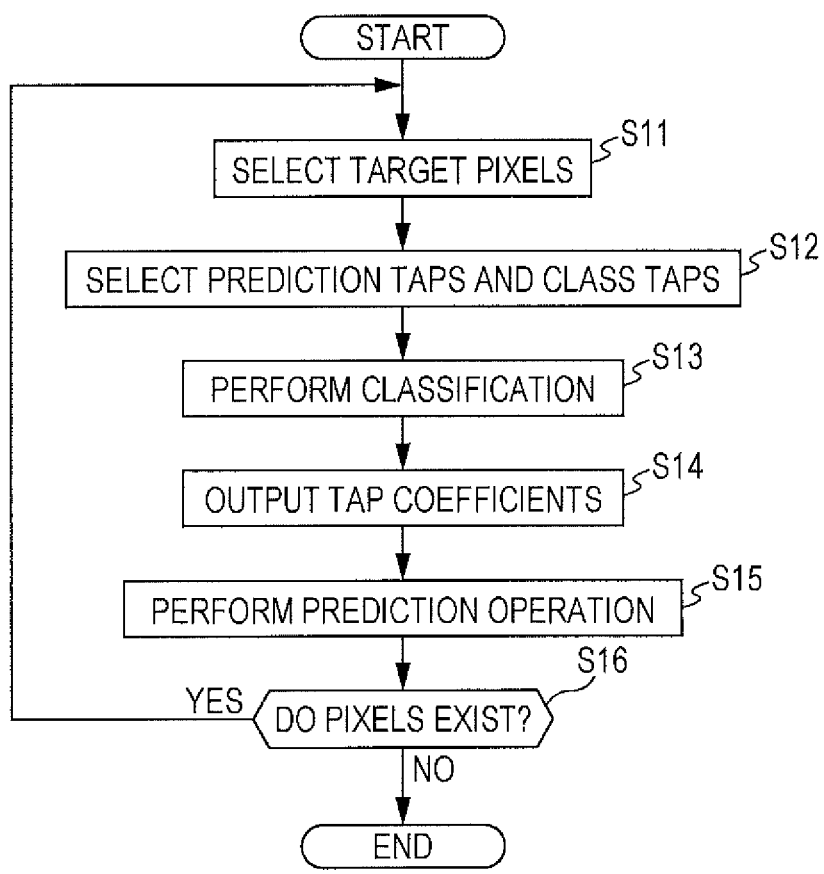
FIG. 2 is a flowchart illustrating an image conversion process performed by an image conversion device.

FIG. 2 is a flowchart illustrating the image conversion process performed by the image conversion device 1 of FIG. 1.

In Step S11, the target pixel selection unit 11 selects one pixel which is not yet a target pixel, from the pixels configuring the second image with respect to the first image input into the image conversion device 1, as a target pixel, and the process proceeds to Step S12. That is, in the target pixel selection unit 11, a pixel which is not yet a target pixel, in raster scan order, from the pixels configuring the second image, is selected as the target pixel, for example.

In Step S12, the tap selection units 12 and 13 respectively select pixels for the prediction tap and the class tap for the target pixel, from the first image which is supplied thereto. The prediction tap is supplied to the prediction operation unit 16 from the tap selection unit 12, and the class tap is supplied to the classification unit 14 from the tap selection unit 13.

The classification unit 14 receives the class tap for the target pixel from the tap selection unit 13, and in Step S13, the target pixels are classified based on the class tap. In addition, the classification unit 14 outputs the class code showing the class of the target pixel obtained as a result of the classification thereof, to the coefficient output unit 15, and the process proceeds to Step S14.

In Step S14, the coefficient output unit 15 acquires and outputs the tap coefficient stored in the address corresponding to the class code supplied from the classification unit 14. In addition, in Step S14, the prediction operation unit 16 acquires the tap coefficient output by the coefficient output unit 15, and the process proceeds to Step S15.

In Step S15, the prediction operation unit 16 performs predetermined prediction operation using the prediction tap output by the tap selection unit 12 and the tap coefficient acquired from the coefficient output unit 15. Accordingly, the prediction operation unit 16 acquires and outputs the pixel value of the target pixel, and the process proceeds to Step S16.

In Step S16, the target pixel selection unit 11 determines whether or not there is the second image with the pixel which is not yet the target pixel. In a case where it is determined that there is the second image with the pixel which is not yet the target pixel, in the Step S16, the process returns to Step S11, and then the processes subsequent thereto are repeated in the same manner as described above.

In a case where it is determined there is no second image with the pixel which is not yet the target pixel, in the Step S16, the process ends.

Next, the prediction operation of the prediction operation unit 16 of FIG. 1 and the learning of the tap coefficient stored in the coefficient output unit 15 will be described.

Herein, for example, by setting an image (high quality image) having high image quality to the second image, and an image (low quality image) having low image quality obtained by filtering the high quality image with a low pass filter (LPF) to decrease the image quality (resolution) thereof, to the first image, the prediction tap may be selected from the low quality image, and the pixel value of the pixel (high quality pixel) of the high quality image may be acquired (predicted) by the predetermined prediction operation, using the prediction tap and the tap coefficient.

If a linear primary prediction operation is used, for example, as the predetermined prediction operation, a pixel value y of the high quality pixel is acquired by the following linear primary formula.

$$y = \sum_{n=1}^{N} w_n x_n \quad (1)$$

Herein, in the formula (1), $x_n$ represents a pixel value of n-th pixel of a low quality image (hereinafter, appropriately referred to as low quality pixel) configuring the prediction tap for the high quality pixel y, and $w_n$ represents an n-th tap coefficient to be multiplied by the n-th (pixel value of) low quality pixel X. In the formula (1), the prediction tap is configured with N low quality pixels $x_1, x_2, \ldots,$ and $x_N$.

Herein, the pixel value y of the high quality pixel can also be acquired by a secondary or a higher-order formula, not by the linear primary formula shown in the formula (1).

If the true value of the pixel value of the (k-th) high quality pixel of the k-th sample is represented by $y_K$ and a prediction value of the true value $y_K$ thereof obtained by the formula (1) is represented by $y_k'$, a prediction error $e_k$ of the prediction value $y_k'$ with respect to the true value $y_k$ is represented in the following formula.

$$e_k = y_k - y_k' \quad (2)$$

Herein, since the prediction value $y_k'$ of the formula (2) is acquired based on the formula (1), when the $y_k'$ of the formula (2) is replaced based on the formula (1), the following formula is obtained.

$$e_k = y_k - \left(\sum_{n=1}^{N} w_n x_{n,k}\right) \quad (3)$$

Herein, in the formula (3), $x_{n,k}$ represents an n-th low quality pixel configuring the prediction tap for the high quality pixel $y_k$ of the k-th sample.

The tap coefficient $w_n$ for setting the prediction error $e_k$ as 0 of the formula (3) (or the formula (2)) is the optimal tap coefficient for predicting the high quality pixel $y_k$, but generally, it is difficult to acquire such a tap coefficient $w_n$ for all high quality pixel $y_k$.

If a least-squares method is used, for example, as an example of showing that the tap coefficient $w_n$ is the optimal value, the optimal tap coefficient $w_n$ can be acquired by minimizing a sum total E of a square error represented by the following formula.

$$E = \sum_{k=1}^{K} e_k^2 \quad (4)$$

Herein, in the formula (4), K represents the number of samples (number of samples for learning) of a set of the high quality pixel $y_k$ and low quality pixels $x_{1,k}, x_{2,k}, \ldots, x_{N,k}$ configuring the prediction tap for the high quality pixel $y_k$.

As shown in a formula (5), a minimum value (extremely small value) of the sum total E of the square error of the formula (4) is acquired by $w_n$ in which the result of partial differentiation of the sum total E by the tap coefficient $w_n$ is 0.

$$\frac{\partial E}{\partial w_n} = e_1 \frac{\partial e_1}{\partial w_n} + e_2 \frac{\partial e_2}{\partial w_n} + \ldots + e_k \frac{\partial e_k}{\partial w_n} = 0 \quad (5)$$

$$(n = 1, 2, \ldots, N)$$

Herein, if the formula (3) described above is subjected to partial differentiation by the tap coefficient $w_n$, the following formula is obtained.

$$\frac{\partial e_k}{\partial w_1} = -x_{1,k}, \frac{\partial e_k}{\partial w_2} = -x_{2,k}, \ldots, \frac{\partial e_k}{\partial w_N} = -x_{N,k}, \quad (6)$$

$$(k = 1, 2, \ldots, K)$$

The following formula is obtained from the formulae (5) and (6).

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (7)$$

By substituting $e_k$ of the formula (7) with the formula (3), the formula (7) can be represented by a normal equation shown in a formula (8).

$$\begin{bmatrix} \left(\sum_{k=1}^{K} x_{1,k}x_{1,k}\right) & \left(\sum_{k=1}^{K} x_{1,k}x_{2,k}\right) & \cdots & \left(\sum_{k=1}^{K} x_{1,k}x_{N,k}\right) \\ \left(\sum_{k=1}^{K} x_{2,k}x_{1,k}\right) & \left(\sum_{k=1}^{K} x_{2,k}x_{2,k}\right) & \cdots & \left(\sum_{k=1}^{K} x_{2,k}x_{N,k}\right) \\ \vdots & \vdots & \ddots & \vdots \\ \left(\sum_{k=1}^{K} x_{N,k}x_{1,k}\right) & \left(\sum_{k=1}^{K} x_{N,k}x_{2,k}\right) & \cdots & \left(\sum_{k=1}^{K} x_{N,k}x_{N,k}\right) \end{bmatrix}$$

$$\begin{bmatrix} w_1 \\ w_2 \\ \vdots \\ w_N \end{bmatrix} = \begin{bmatrix} \left(\sum_{k=1}^{K} x_{1,k}y_k\right) \\ \left(\sum_{k=1}^{K} x_{2,k}y_k\right) \\ \vdots \\ \left(\sum_{k=1}^{K} x_{N,k}y_k\right) \end{bmatrix}$$

(8)

In the normal equation of the formula (8), the tap coefficient $w_n$ can be solved by using a sweep-out method (Gauss-Jordan elimination method), for example.

By formulating and solving the normal equation of the formula (8) for each class, the optimal tap coefficient (herein, tap coefficient with the minimized sum total E of the square error) $w_n$ can be acquired for each class.

Figure 3:
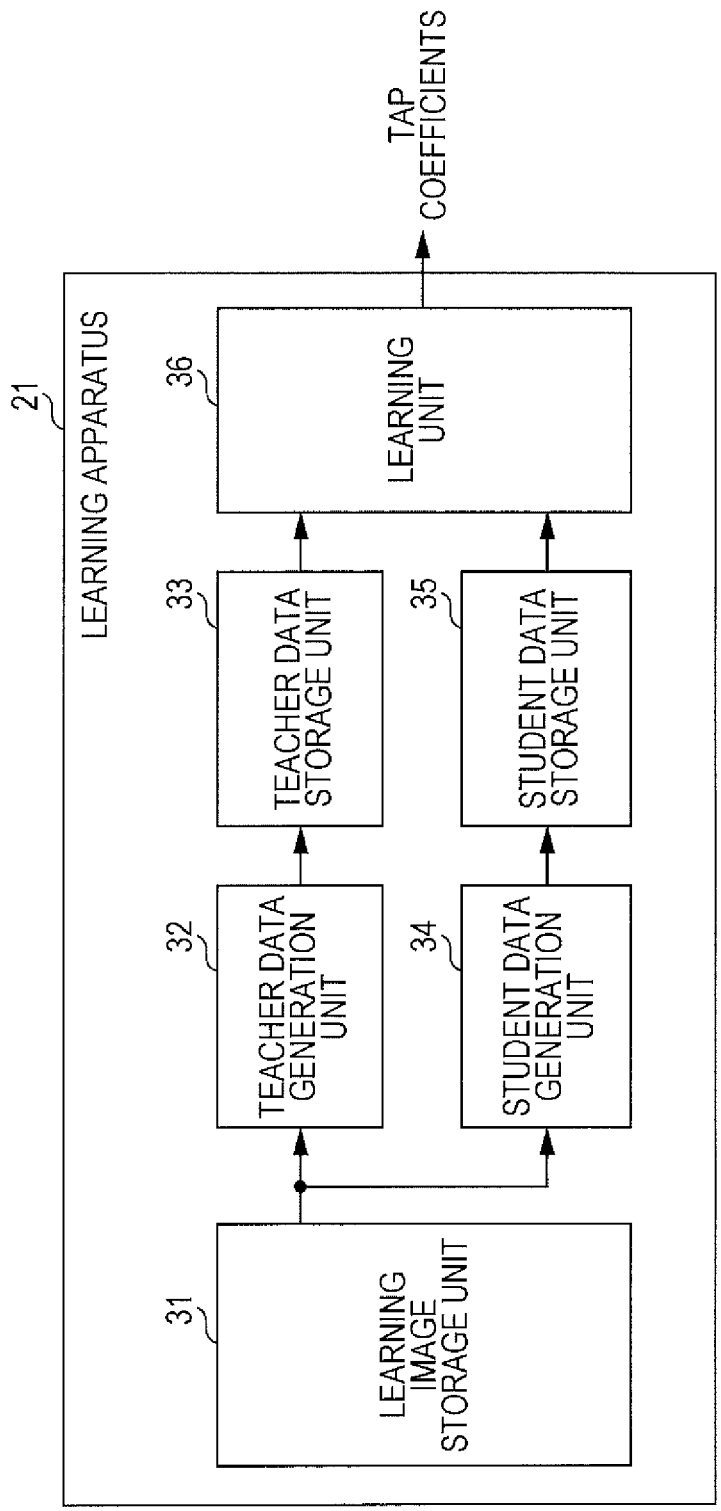
FIG. 3 is a block diagram showing a configuration example of a learning device.

FIG. 3 is a block diagram showing a configuration example of a learning device which performs learning for acquiring the tap coefficient $w_n$ by formulating and solving the normal equation of the formula (8).

In a learning device 21, a learning image storage unit 31 stores an image for learning used for learning of the tap coefficient $w_n$. Herein, as the image for learning, a high quality image having high resolution can be used, for example.

A teacher data generation unit 32 reads out the image for learning from the learning image storage unit 31. In addition, the teacher data generation unit 32 generates a teacher (true value) for learning of the tap coefficient, that is, teacher data (teacher image) which is the pixel value of a mapping destination of mapping as prediction operation performed with the formula (1), from the image for learning, and supplies the data to a teacher data storage unit 33. For example, the teacher data generation unit 32 can supply the high quality image as the image for learning to the teacher data storage unit 33 as the teacher data as it is.

The teacher data storage unit 33 stores the high quality image as the teacher data supplied from the teacher data generation unit 32.

A student data generation unit 34 reads out the image for learning from the learning image storage unit 31. In addition, the student data generation unit 34 generates a student for learning of the tap coefficient, that is, student data (student image) which is the pixel value to be a conversion target by mapping as the prediction operation performed with the formula (1), from the image for learning, and supplies the data to a student data storage unit 35. Herein, the student data generation unit 34 generates a low quality image by filtering the high quality image as the image for learning to decrease the resolution thereof, and supplies the low quality image to the student data storage unit 35 as the student data.

The student data storage unit 35 stores the student data supplied from the student data generation unit 34.

A learning unit 36 sequentially sets pixels configuring the high quality image as the teacher data stored in the teacher data storage unit 33 as target pixels, and selects the low quality pixel having the same tap structure as that selected by the tap selection unit 12 of FIG. 1 from the low quality pixels configuring the low quality image as the student data stored in the student data storage unit 35, as the prediction taps for the target pixels. Further, the learning unit 36 acquires the tap coefficient for each class by formulating and solving the normal equation of the formula (8) for each class, using each pixel configuring the teacher data and the prediction tap selected when the pixel is set to the target pixel.

FIG. 4 is a block diagram showing a configuration example of the learning unit 36 of FIG. 3.

A target pixel selection unit 41 sequentially selects the pixels configuring the teacher data stored in the teacher data storage unit 33 as target pixels, and supplies information showing the target pixels to a necessary block.

A tap selection unit 42 selects the same pixels selected by the tap selection unit 12 of FIG. 1 as the prediction taps, from the low quality pixels configuring the low quality image as the student data stored in the student data storage unit 35, for the target pixel, and accordingly acquires the prediction taps having the same tap structure as that acquired by the tap selection unit 12 to supply the prediction taps to an adding unit 45.

A tap selection unit 43 selects the same pixels selected by the tap selection unit 13 of FIG. 1 as the class taps, from the low quality pixels configuring the low quality image as the student data stored in the student data storage unit 35, for the target pixel, and accordingly acquires the prediction taps having the same tap structure as that acquired by the tap selection unit 13 to supply the prediction taps to a classification unit 44.

The classification unit 44 performs the same classification as that of the classification unit 14 of FIG. 1 based on the class taps output by the tap selection unit 43, and outputs the class code corresponding to the class obtained as a result thereof to the adding unit 45.

The adding unit 45 reads out the teacher data (pixel) which is the target pixel from the teacher data storage unit 33, and performs adding with the target pixel thereof and the student data (pixel) configuring the prediction taps for the target pixel supplied from the tap selection unit 42 as targets, for each class code supplied from the classification unit 44.

That is, the teacher data $y_k$ stored in the teacher data storage unit 33, the prediction tap $x_{n,k}$ output by the tap selection unit 42, and the class code output by the classification unit 44 are supplied to the adding unit 45.

The adding unit 45 performs operation corresponding to multiplication ($x_{n,k}x_{n',k}$) of the student data items with each other and summation ($\Sigma$) in the matrix on the left side of the formula (8) using the prediction taps (student data) $x_{n,k}$, for each class corresponding to the class code supplied from the classification unit 44.

In addition, the adding unit 45 also performs operation corresponding to multiplication ($x_{n,k}y_k$) of the student data $x_{n,k}$ and the teacher data $y_k$, and summation ($\Sigma$) in the vector on the right side of the formula (8) using the prediction taps (student data) $x_{n,k}$ and the teacher data $y_k$, for each class corresponding to the class code supplied from the classification unit 44.

That is, the adding unit 45 stores the components ($\Sigma x_{n,k}x_{n',k}$) in the matrix on the left side and the components ($\Sigma x_{n,k}y_k$) in the vector on the right side of the formula (8) previously acquired for the teacher data which is set to the target pixel, in an embedded memory (not shown) thereof, and adds (performs calculation represented by summation in the formula (8)) the corresponding component $x_{n,k+1}x_{n',k+1}$ or $x_{n,k+1}y_{k+1}$ calculated by using teacher data $y_{k+1}$ and student data $x_{n,k+1}$ for the teacher data which is newly set to the target pixel, with respect to the component ($\Sigma x_{n,k}x_{n',k}$) in the matrix thereof or the components ($\Sigma x_{n,k}y_k$) in the vector thereof.

The adding unit 45 performs the addition described above by setting all teacher data items stored in the teacher data storage unit 33 (FIG. 3) as the target pixel, to formulate the normal equation shown in the formula (8) for each class, and then the normal equation is supplied to a tap coefficient calculation unit 46.

The tap coefficient calculation unit 46 acquires and outputs the optimal tap coefficient $w_n$ for each class, by solving the normal equation for each class supplied from the adding unit 45.

The tap coefficient $w_n$ for each class obtained as described above is stored in the coefficient output unit 15 of the image conversion device 1 of FIG. 1.

Herein, the student data corresponds to the first image, and the teacher data corresponds to the second image. As the tap coefficient, the tap coefficient for performing various image conversion processes as described above can be obtained, depending on the selection of the image to be the student data corresponding to the first image and of the image to be the teacher data corresponding to the second image.

FIGS. 5A to 5D are diagrams illustrating examples of the image conversion process as the classification adaptive process using the tap coefficients obtained by learning.

Figure 5A:
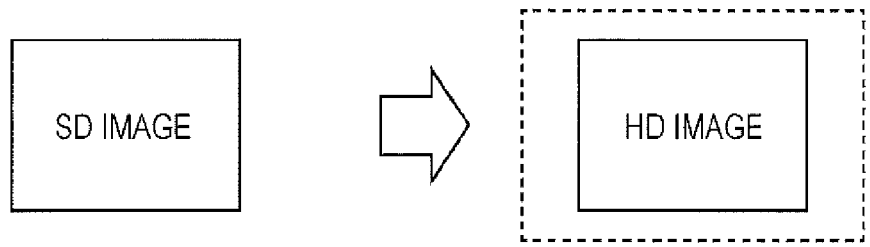
FIGS. 5A to 5D are diagrams illustrating examples of an image conversion process as a classification adaptive process using a tap coefficient obtained by learning.

As described above, by performing the learning of the tap coefficients by setting the high quality image as the teacher data corresponding to the second image and the low quality image obtained by degrading the spatial resolution of the high quality image as the student data corresponding to the first image, as the tap coefficient, the tap coefficient for performing the image conversion process as the spatial resolution creation process of converting the first image which is the low quality image (standard definition (SD) image) into the second image which is the high quality image (high definition (HD) image) having the improved spatial resolution, can be obtained, as described in FIG. 5A.

In this case, the first image (student data) may have the same or a smaller number of pixels than that of the second image (teacher data).

Figure 5B:
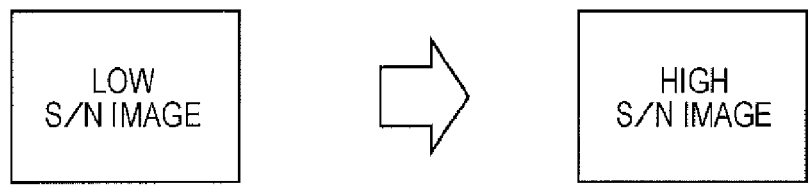

For example, by performing the learning of the tap coefficients by setting the high quality image as the teacher data and an image obtained by superimposing noise with respect to the high quality image as the teacher data, as the student data, as the tap coefficient, the tap coefficient for performing the image conversion process as the noise removal process of converting the first image as a low S/N image into the second image which is a high S/N image obtained by removing (reducing) the noise contained therein, can be obtained, as described FIG. 5B.

Figure 5C:
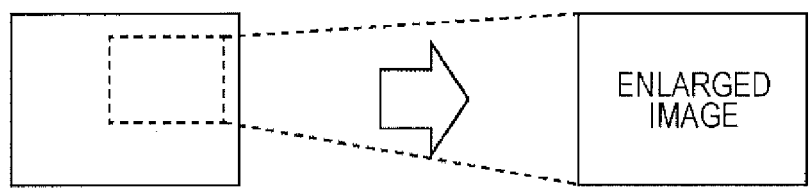

For example, by performing the learning of the tap coefficients by setting a certain image as the teacher data and an image obtained by thinning the number of pixels of the image as the teacher data, as the student data, as the tap coefficient, the tap coefficient for performing the image conversion process as the enlargement process (resizing process) of converting the first image which is a part of the image into the second image which is an enlarged image obtained by enlarging the first image, can be acquired as shown in FIG. 5C.

The tap coefficients for performing the enlargement process can also be obtained by performing the learning of the tap coefficients by setting the high quality image as the teacher data and the low quality image obtained by degrading the spatial resolution and thinning the number of pixels of the high quality image, as the student data.

Figure 5D:
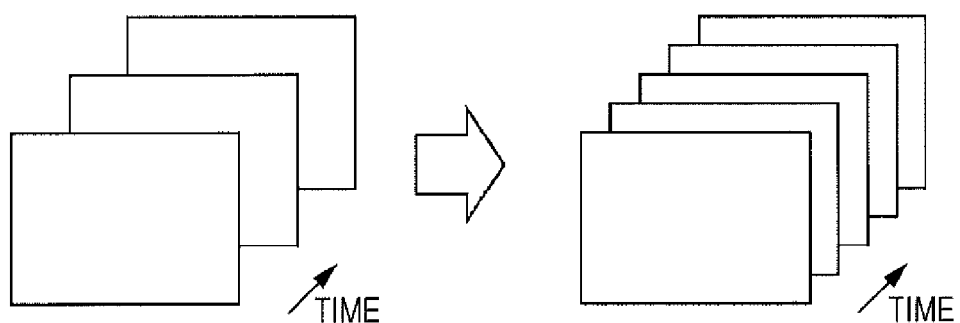

For example, by performing the learning of the tap coefficients by setting an image having a high frame rate as the teacher data and an image obtained by thinning the frame of the image having a high frame rate as the teacher data, as the student data, as the tap coefficient, the tap coefficient for performing the image conversion process as the temporal resolution creation process of converting the first image having a predetermined frame rate into the second image having a high frame rate, can be obtained, as described in FIG. 5D.

Figure 6:
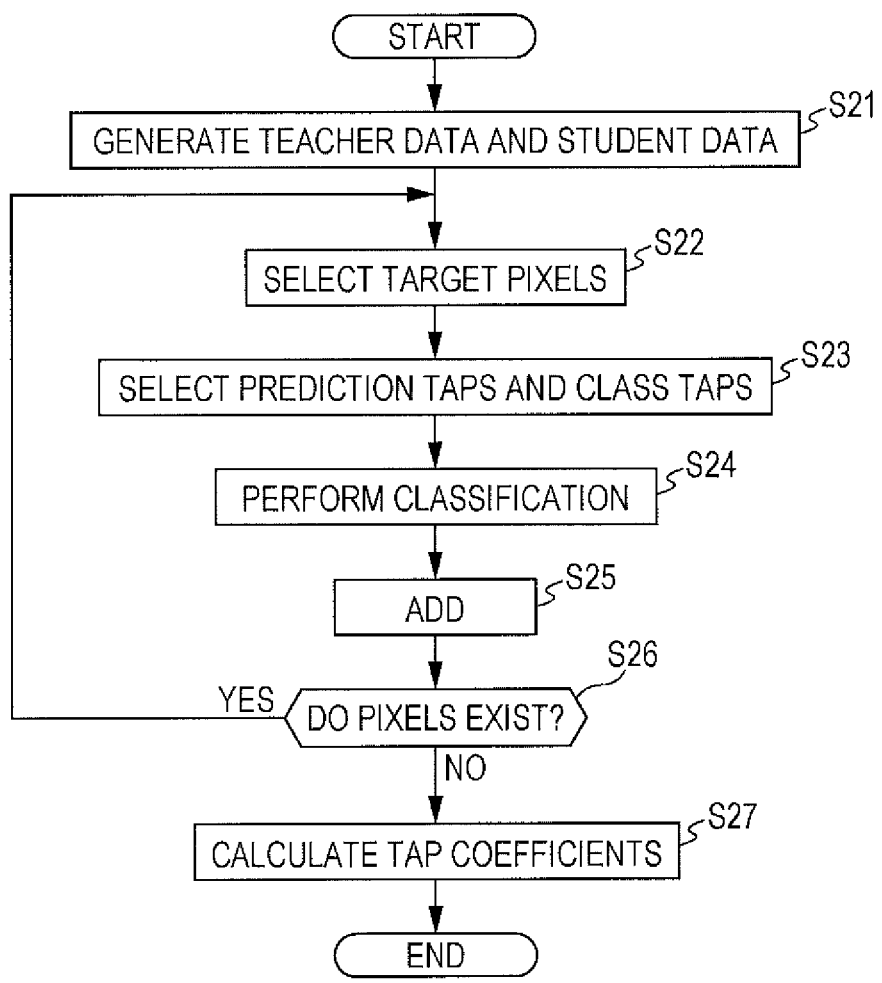
FIG. 6 is a flowchart illustrating a process (learning process) of a learning device.

FIG. 6 is a flowchart illustrating the process (learning process) of the learning device 21 of FIG. 3.

First, in Step S21, the teacher data generation unit 32 and the student data generation unit 34 generate the teacher data and the student data from the image for learning which is stored in the learning image storage unit 31, and supply the data items to the teacher data storage unit 33 and the student data storage unit 35, to be respectively stored therein.

The generation of the respective student data and the teacher data in the teacher data generation unit 32 and the student data generation unit 34 depends on the learning of the tap coefficient performed among various classification adaptive processes as the image conversion processes described above.

After that, the process proceeds to Step S22. In the learning unit 36 (FIG. 4), the target pixel selection unit 41 selects the pixel which is not yet set as the target pixel, as the target pixel, from the teacher data stored in the teacher data storage unit 33, and the process proceeds to Step S23. In Step S23, the tap selection unit 42 selects the pixel as the student data which is the prediction tap from the student data stored in the student data storage unit 35, for the target pixel, and supplies the pixel to the adding unit 45, and the tap selection unit 43, in the same manner, selects the student data which is the class tap from the student data stored in the student data storage unit 35, for the target pixel, and supplies the student data to the classification unit 44.

Then, the process proceeds to Step S24. The classification unit 44 performs classification of the target pixel based on the class tap for the target pixel, and outputs the class code corresponding to the class obtained as a result thereof to the adding unit 45, and the process proceeds to Step S25.

In Step S25, the adding unit 45 reads out the target pixel from the teacher data storage unit 33, and performs adding of the formula (8) with the target pixel thereof and the student data configuring the prediction taps selected for the target pixel supplied from the tap selection unit 42 as targets, for each class code supplied from the classification unit 44, and the process proceeds to Step S26.

In Step S26, the target pixel selection unit 41 determines whether or not the teacher data which is not yet set as the target pixel is stored in the teacher data storage unit 33. In a case where it is determined that the teacher data which is not yet set as the target pixel is stored in the teacher data storage unit 33 in Step S26, the process returns to Step S22, and then the processes subsequent thereto are repeated in the same manner as described above.

In a case where the teacher data which is not yet set as the target pixel is not stored in the teacher data storage unit 33 in Step S26, the adding unit 45 supplies the matrix on the left side and the vector on the right side of the formula (8) for each class obtained by the processes from Steps S22 to S26 to the tap coefficient calculation unit 46, and the process proceeds to Step S27.

In Step S27, the tap coefficient calculation unit 46 acquires and outputs the tap coefficient $w_n$ for each class, by solving the normal equation for each class configured by the matrix on the left side and the vector on the right side of the formula (8) for each class supplied from the adding unit 45, and the process ends.

A class for which the necessary number of normal equations for acquiring the tap coefficient is not obtained, may be generated due to the insufficient number of images for learning, but for such a class, the tap coefficient calculation unit 46 can output a default tap coefficient, for example.

Embodiment of Digital Camera to which Present Technology is Applied

Figure 7:
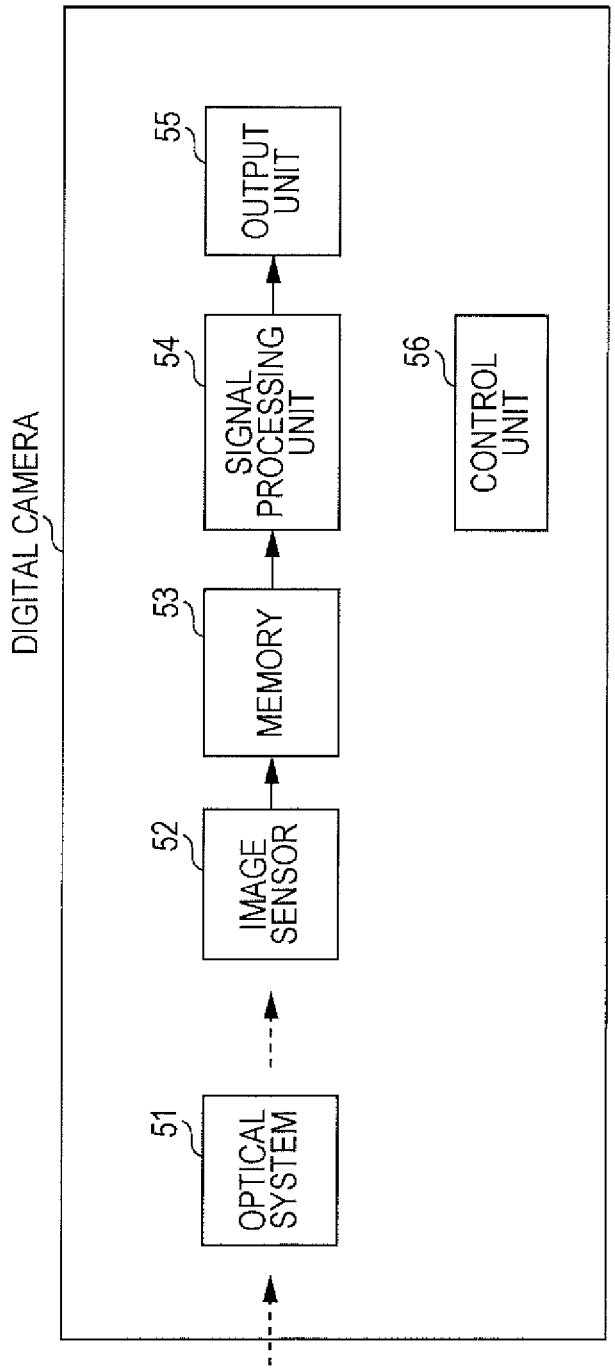
FIG. 7 is a block diagram showing a configuration example of one embodiment of a digital camera to which the present technology is applied.

FIG. 7 is a block diagram showing a configuration example of one embodiment of a digital camera to which the present technology is applied.

The digital camera can image both a still image and a moving image.

In FIG. 7, the digital camera includes an optical system 51, an image sensor 52, a memory 53, a signal processing unit 54, an output unit 55, and a control unit 56.

The optical system 51, for example, includes a zoom lens, a focusing lens, and an aperture (not shown), and emits light from the outside to the image sensor 52.

The image sensor 52, for example, is a complementary metal oxide semiconductor (CMOS) image sensor which receives incident light from the optical system 51 and performs photoelectric conversion to output image data as an electrical signal corresponding to the incident light from the optical system 51.

The memory 53 temporarily stores the image data output by the image sensor 52.

The signal processing unit 54 performs the image processes, for example, a demosaic process, the noise removal process, and the sharpness improvement process, as the signal process using the image data stored in the memory 53, and supplies the data to the output unit 55.

The output unit 55 outputs the image data from the signal processing unit 54.

That is, the output unit 55, for example, includes a display (not shown) configured with liquid crystal or the like, and displays an image corresponding to the image data from the signal processing unit 54 as a so-called through image.

The output unit 55 also includes, for example, a driver (not shown) for driving a semiconductor memory, or a magnetic disk or an optical disc, and records the image data from the signal processing unit 54 on the recording medium.

The control unit 56 controls each block configuring the digital camera based on the manipulation of a user.

In the digital camera configured as described above, the image sensor 52 receives the incident light from the optical system 51 and outputs the image data based on the incident light.

The image data output by the image sensor 52 is supplied to and recorded in the memory 53. The signal process performed by the signal processing unit 54 is performed for the image data stored in the memory 53, and the image data obtained as a result thereof is supplied to and output to the output unit 55.

Configuration Example of Image Conversion Device which Performs Sharpness Improvement Process in Signal Processing Unit 54

Figure 8:
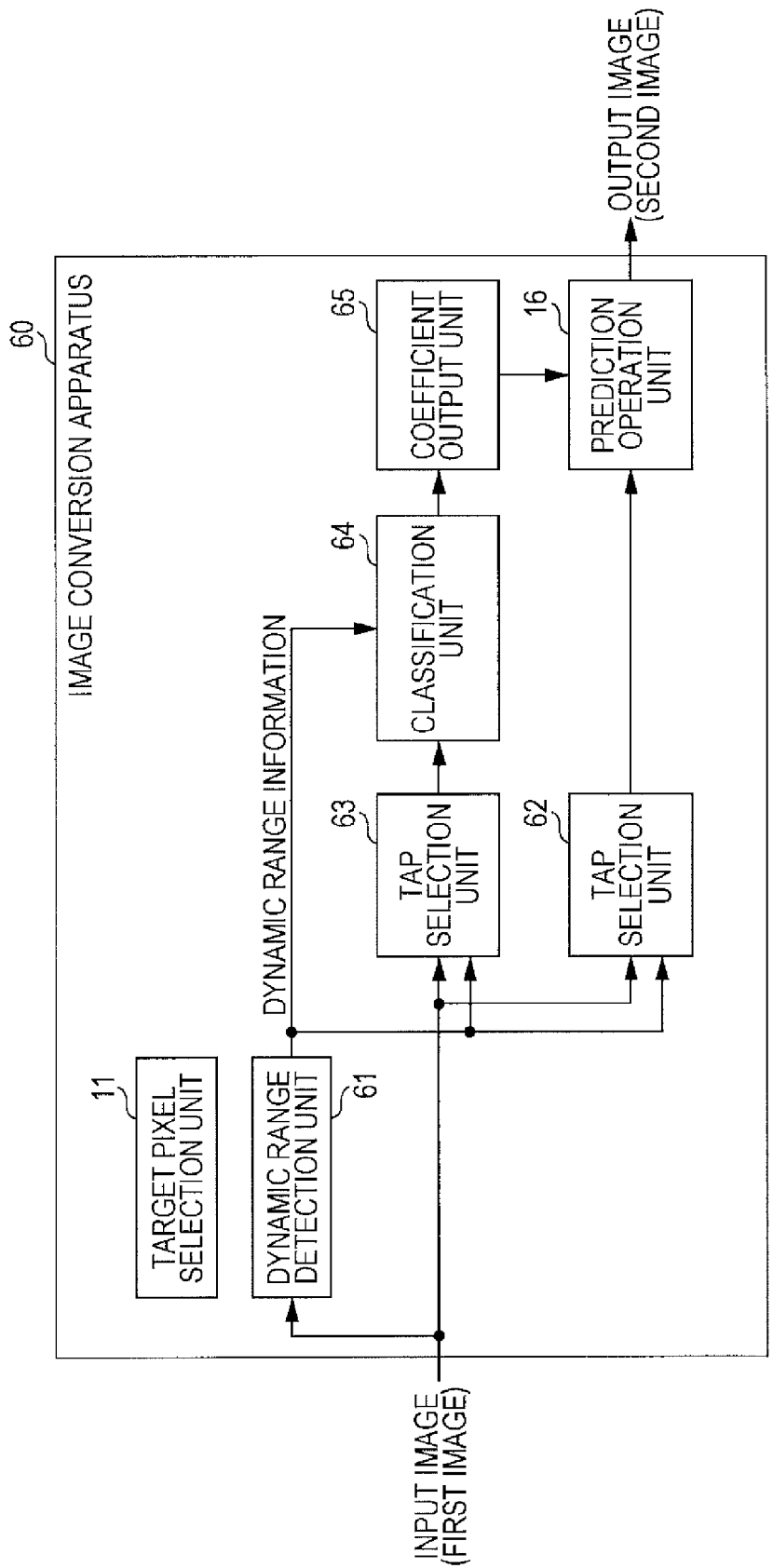
FIG. 8 is a block diagram showing a configuration example of an image conversion device which performs a sharpness improvement process performed by a signal processing unit.

FIG. 8 is a block diagram showing a configuration example of the image conversion device which performs the sharpness improvement process performed by the signal processing unit 54 of FIG. 7.

The signal processing unit 54 of FIG. 7 includes an image conversion device 60 embedded therein, and the sharpness improvement process is performed in the image conversion device 60.

In the image conversion device 60 of FIG. 8, the parts corresponding to the image conversion device 1 of FIG. 1 are denoted with the same reference numerals, and the description thereof will be appropriately omitted hereinafter.

The image conversion device 60 of FIG. 8 includes the target pixel selection unit 11 and the prediction operation unit 16 in common with the image conversion device 1 of FIG. 1. However, the image conversion device 60 is different from the image conversion device 1 of FIG. 1, in a point that a dynamic range detection unit 61 is newly provided and tap selection units 62 and 63, a classification unit 64, and a coefficient output unit 65 are provided instead of the tap selection units 12 and 13, the classification unit 14, and the coefficient output unit 15.

In FIG. 8, the image conversion device 60 performs the image conversion process of converting an input image to an image having improved sharpness, as the sharpness improvement process of the input image which is input to the image conversion device 60, using the classification adaptive process.

When an image output from the image conversion device 60 is set to an output image, in the image conversion device 60, the output image obtained by improving the sharpness of the input image and improving the spatial resolution is acquired by the image conversion process, for example.

In FIG. 8, in the image conversion device 60, the image (data) stored in the memory 53 is supplied as the input image (first image). The input image supplied to the image conversion device 60 is supplied to the dynamic range detection unit 61, and to the tap selection units 62 and 63.

Herein, the input image supplied to the image conversion device 60 has luminance (value) as a pixel value, for example.

The dynamic range detection unit 61 detects dynamic range information showing a local dynamic range in a position of the input image corresponding to the target pixel selected from the pixels of the output image (second image) in the target pixel selection unit 11, and supplies the dynamic range information to the tap selection units 62 and 63 and the classification unit 64.

The tap selection unit 62 selects (the pixel value of) the pixel which is set to the prediction tap from the input image for the target pixel, and supplies the pixel to the prediction operation unit 16.

That is, in the same manner as that of the tap selection unit 12 of FIG. 1, for example, the tap selection unit 62 selects the plurality of pixels of the input image positioned spatially and temporally close to the position of the target pixel, as the prediction taps.

However, the tap selection unit 62 changes the number of taps which is the number of pixels which are set to the prediction taps, based on the dynamic range information from the dynamic range detection unit 61.

In the same manner as the tap selection unit 13 of FIG. 1, for example, the tap selection unit 63 selects (the pixel value of) the pixel which is set to the class tap from the input image for the target pixel, and supplies the pixel to the classification unit 64.

In the same manner as the tap selection unit 62, the tap selection unit 63 can change the number of taps which is the number of pixels which are set to the class taps, based on the dynamic range information from the dynamic range detection unit 61. However, in the tap selection unit 63, the number of class taps can be fixed to a constant value regardless of the dynamic range information.

The classification unit 64 classifies the target pixel according to a predetermined regulation, for example, by the ADRC or the like, based on the dynamic range information from the dynamic range detection unit 61 and the class taps from the tap selection unit 63, and supplies the class code corresponding to the class of the target pixel obtained as a result thereof to the coefficient output unit 65.

The classification unit 64 can change the predetermined regulation employed for the classification, based on the dynamic range information from the dynamic range detection unit 61.

The coefficient output unit 65 stores the tap coefficients for each class acquired by the learning which will be described later in the embedded memory (not shown). The coefficient output unit 65 reads out and acquires the tap coefficients (tap coefficients of the class shown by the class code supplied from the classification unit 64) stored in the address corresponding to the class code supplied from the classification unit 64, from the tap coefficients stored in the embedded memory, and supplies the tap coefficients to the prediction operation unit 16.

Configuration Example of Dynamic Range Detection Unit 61

Figure 9:
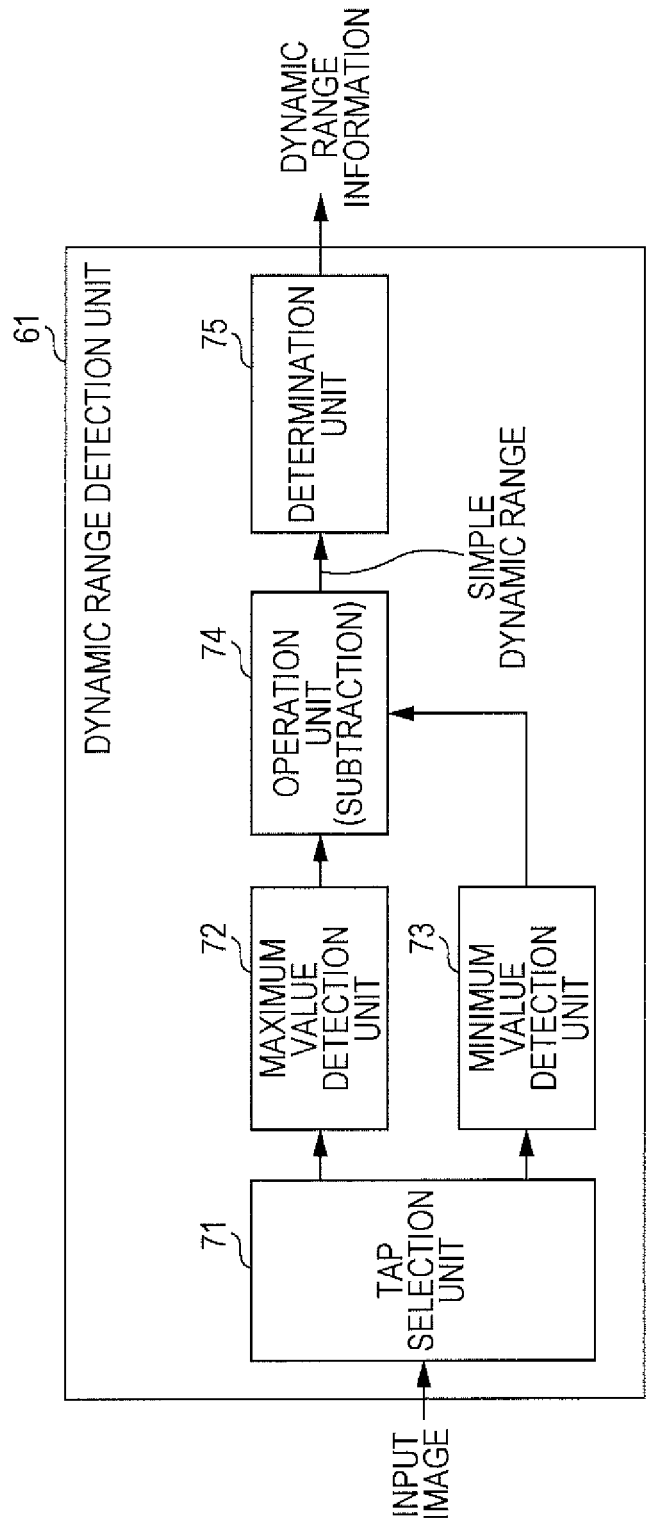
FIG. 9 is a block diagram showing a configuration example of a dynamic range detection unit.

FIG. 9 is a block diagram showing a configuration example of the dynamic range detection unit 61 of FIG. 8.

In FIG. 9, the dynamic range detection unit 61 includes a tap selection unit 71, a maximum value detection unit 72, a minimum value detection unit 73, an operation unit 74, and a determination unit 75.

The input image is supplied to the tap selection unit 71.

The tap selection unit 71 selects (pixel values of) the pixels which are set to detection taps used for the detection of the local dynamic range in the position of the input image corresponding to the target pixel, for the target pixel, and supplies the pixels to the maximum value detection unit 72 and the minimum value detection unit 73.

Herein, in the tap selection unit 71, for example, a predetermined area containing the pixels as the prediction taps or the class taps for the target pixels can be employed as a dynamic range detection area for detecting the dynamic range, and pixels in the dynamic range detection area can be employed as the detection taps for the target pixel. That is, as the structure of the detection taps (input pixel configuring the detection taps), the same structure as that of the class taps in a normal mode which will be described later, can be used, for example.

The maximum value detection unit 72 detects a maximum pixel value from pixel values of the pixels of the detection taps from the tap selection unit 71 and supplies the maximum pixel value to the operation unit 74.

The minimum value detection unit 73 detects a minimum pixel value from pixel values of the pixels of the detection taps from the tap selection unit 71 and supplies the minimum pixel value to the operation unit 74.

The operation unit 74 carries out an operation of a difference between the maximum pixel value from the maximum value detection unit 72 and the minimum pixel value from the minimum value detection unit 73 (subtracted value obtained by subtracting the minimum pixel value from the maximum pixel value) (hereinafter, also referred to as simple dynamic range), as the local dynamic range for the target pixel, and supplies the local dynamic range to the determination unit 75.

The determination unit 75 determines a magnitude relationship between the local dynamic range for the target pixel from the operation unit 74, and a predetermined threshold value. The determination unit 75 supplies, for example, 1-bit dynamic range information showing whether or not the size of the local dynamic range for the target pixel is larger than the predetermined threshold value, to the tap selection units 62 and 63 and the classification unit 64.

The determination unit 75 can determine the magnitude relationship between the local dynamic range for the target pixel and the plurality of threshold values, and in this case, a plurality of bits showing that the extent to which the size of the local dynamic range is larger (or smaller) than the threshold values, can be employed as the dynamic range information.

Figure 10:
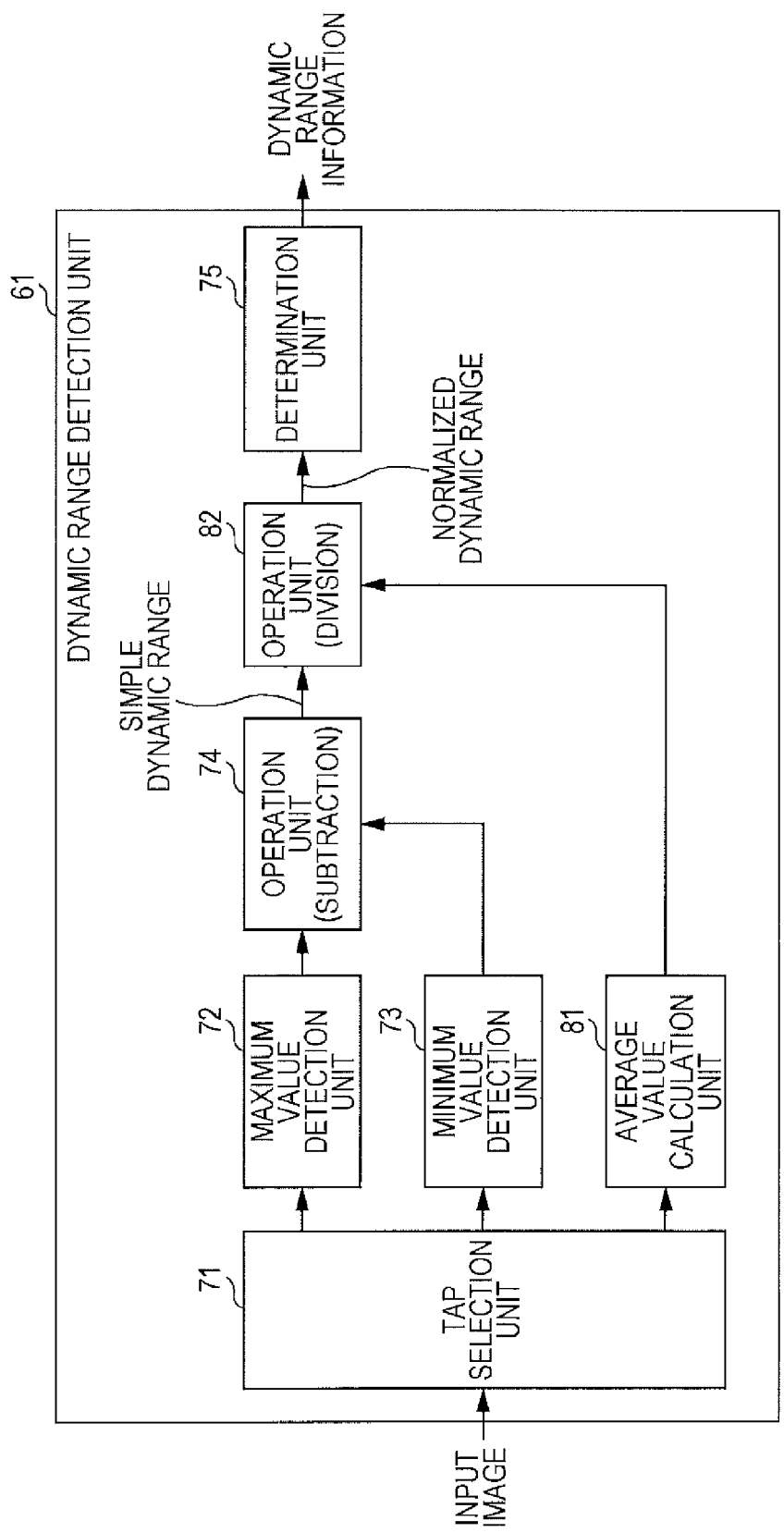
FIG. 10 is a block diagram showing another configuration example of a dynamic range detection unit.

FIG. 10 is a block diagram showing another configuration example of the dynamic range detection unit 61 of FIG. 8.

In the drawing, parts corresponding to those of FIG. 9 are denoted with the same reference numerals and the description thereof will be appropriately omitted hereinafter.

The dynamic range detection unit 61 of FIG. 10 includes the tap selection unit 71 to the determination unit 75, in common with the case of FIG. 9. However, the dynamic range detection unit 61 of FIG. 10 is different from the case of FIG. 9, in a point that an average value calculation unit 81 is newly provided and an operation unit 82 is newly provided between the operation unit 74 and the determination unit 75.

The detection taps are supplied to the average value calculation unit 81 from the tap selection unit 71.

The average value calculation unit 81 acquires an average pixel value which is an average value of the pixel values of the pixels as the detection taps from the tap selection unit 71 and supplies the average pixel value to the operation unit 82.

The average pixel value is supplied to the operation unit 82 from the average value calculation unit 81, and the simple dynamic range is also supplied thereto from the operation unit 74.

The operation unit 82 acquires a normalized dynamic range obtained by normalizing the simple dynamic range, by dividing the simple dynamic range from the operation unit 74 by the average pixel value from the average value calculation unit 81, and supplies the normalized dynamic range to the determination unit 75, as the local dynamic range for the target pixel.

Accordingly, in FIG. 10, the determination unit 75 determines the magnitude relationship between the normalized dynamic range, not the simple dynamic range, and the predetermined threshold value, and outputs dynamic range information showing the magnitude relationship.

As the dynamic range detection unit 61, it is possible to select the configuration of FIG. 9 employed for detecting the dynamic range information showing the (magnitude relationship between the threshold value and) simple dynamic range, or the configuration of FIG. 10 employed for detecting the dynamic range information showing the (magnitude relationship between the threshold value and the) normalized dynamic range, based on a grayscale property of the input image, for example.

That is, in a case where the input image is an image having a linear grayscale property which changes a pixel value linearly with respect to light intensity, as a so-called RAW image (image before development), for example, the configuration of FIG. 10 of detecting the dynamic range information showing the normalized dynamic range can be employed as the dynamic range detection unit 61.

In a case where the input image is an image having a so-called gamma grayscale property, for example, not the linear grayscale property, the configuration of FIG. 9 of detecting the dynamic range information showing the simple dynamic range can be employed as the dynamic range detection unit 61.

By employing the configuration of FIG. 10 as the dynamic range detection unit 61, and employing the configuration so as to select the target for determining the magnitude relationship with the threshold value from the simple dynamic range obtained by the operation unit 74 and the normalized dynamic range obtained by the operation unit 82 in the determination unit 75 of FIG. 10, the grayscale property of the input image and, if necessary, the information showing the simple dynamic range or the normalized dynamic range can be selected as the dynamic range.

Configuration Example of Prediction Tap

Figure 11A:
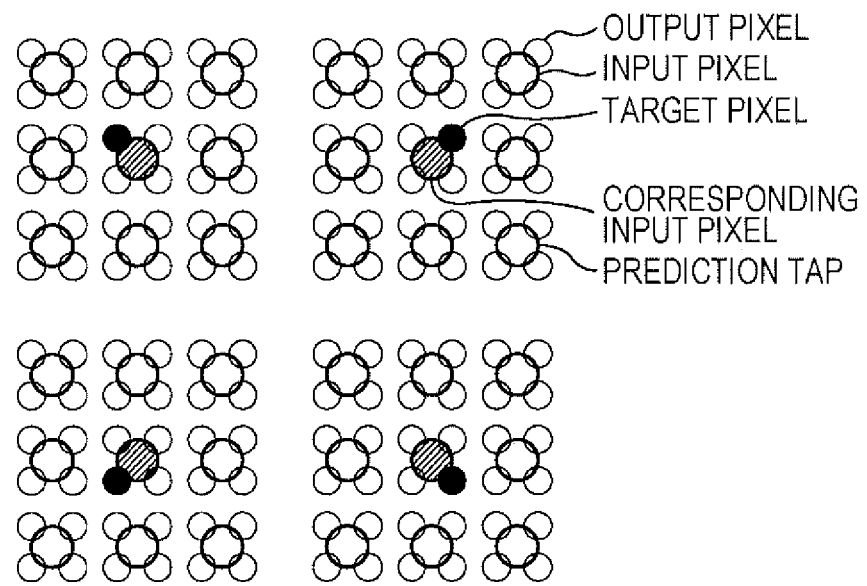
FIGS. 11A and 11B are diagrams showing configuration examples of prediction taps selected by a tap selection unit.
Figure 11B:
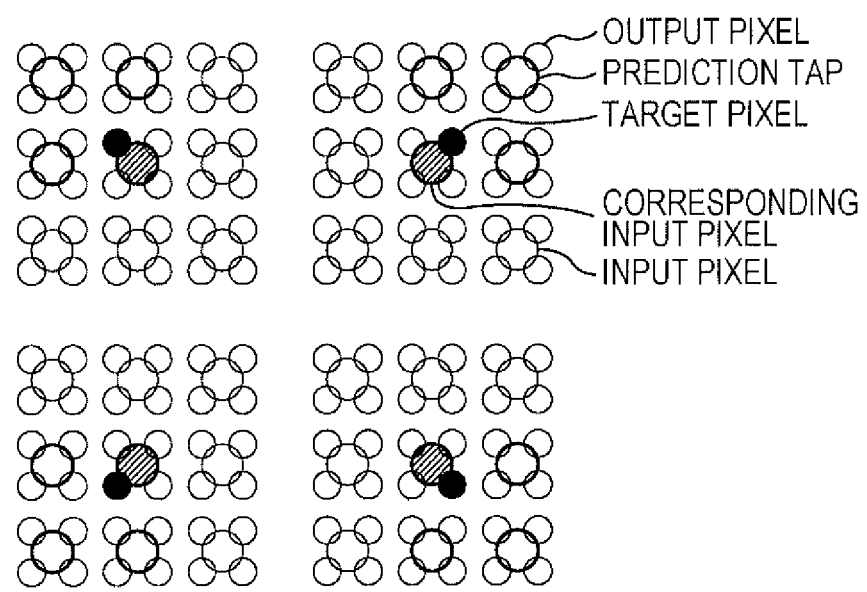

FIGS. 11A and 11B are diagrams showing configuration examples of prediction taps selected by the tap selection unit 62 of FIG. 8.

In FIGS. 11A and 11B, large circles indicate the input pixels which are pixels of the input image and small circles indicate output pixels which are pixels of the output image. In FIGS. 11A and 11B, the output pixels exist in four positions of upper left, upper right, lower left, and lower right sides of one input pixel, and accordingly in the image conversion device 60 of FIG. 8, the input image is converted into the output images having double the number of each of horizontal and vertical pixels of the input image.

In FIGS. 11A and 11B, small circles filled in black indicate output pixels which are set to the target pixels. In addition, in FIGS. 11A and 11B, bold large circles indicate input pixels which are set to the prediction taps.

The tap selection unit 62 (FIG. 8), for example, selects the input pixels which are set to the prediction taps for the target pixels, using the input pixel (hereinafter, also referred to as corresponding input pixel) which is closest to (the position of the input image corresponding to) the target pixels as a reference.

FIG. 11A shows a configuration example of the prediction taps in a normal mode.

Herein, in the embodiment, there are the normal mode and a large dynamic range mode, as selection modes of the prediction taps.

In a case where the dynamic range information from the dynamic range detection unit 61 shows that the size of the local dynamic range (simple dynamic range or normalized dynamic range) for the target pixel is not large, the tap selection unit 62 sets the selection mode of the prediction taps to the normal mode and selects (the input pixels which are set to) the prediction taps.

In a case where the size of the dynamic range information from the dynamic range detection unit 61 shows that the local dynamic range for target pixel is large, the tap selection unit 62 sets the selection mode of the prediction taps to the large dynamic range mode and selects the prediction taps.

In the normal mode, the tap selection unit 62 selects the input pixel which is the prediction tap in the normal mode.

That is, in the normal mode, for example, as shown in FIG. 11A, the input pixels, of which there are 9 pixels in total with 3×3 (horizontal and vertical) pixels having the corresponding input pixel in the center, can be selected as the prediction taps.

FIG. 11B shows a configuration example of the prediction taps in the large dynamic range mode.

In the large dynamic range mode, the tap selection unit 62 changes the number of taps of the prediction taps to be smaller than the case of the normal mode, and selects the input pixels which are set to the prediction taps in the large dynamic range mode.

In FIG. 11B, the number of prediction taps in the large dynamic range mode is, for example, 4 pixels, which is less than 9 pixels, which is the number of prediction taps in the normal mode.

That is, in the large dynamic range mode, as shown in FIG. 11B, using the corresponding input pixel for the target pixel as a reference, the input pixels which are 4 pixels in total with 2×2 pixels containing the corresponding input pixel, can be selected as the prediction taps.

In detail, in a case where the upper left position of the corresponding input pixel is (a position of) the target pixel, the input pixels which contain the corresponding input pixel and are 2×2 pixels on the upper left side of the corresponding input pixel, are selected as the prediction taps.

In a case where the lower left position of the corresponding input pixel is the target pixel, the input pixels which contain the corresponding input pixel and are 2×2 pixels on the lower left side of the corresponding input pixel, are selected as the prediction taps.

In a case where the upper right position of the corresponding input pixel is the target pixel, the input pixels which contain the corresponding input pixel and are 2×2 pixels on the upper right side of the corresponding input pixel, are selected as the prediction taps.

In a case where the lower right position of the corresponding input pixel is the target pixel, the input pixels which contain the corresponding input pixel and are 2×2 pixels on the lower right side of the corresponding input pixel, are selected as the prediction taps.

As described above, in a case where the size of the local dynamic range for the target pixel is not large, there is no consideration of occurrence of the ringing, and accordingly (the pixel value of) the output pixel (target pixel) having an emphasized high frequency and sharpness can be obtained by selecting the certain number of input pixels which are 3×3 pixels having the corresponding input pixel in center, as the prediction taps in the normal mode.

In contrast, in a case where the size of the local dynamic range for the target pixel is large, there is consideration of the occurrence of the ringing, and accordingly, the output pixel in which the extent of emphasis of the high frequency is weakened and the ringing does not occur, can be obtained by selecting the number (number of taps) of input pixels smaller than the case of the normal mode which are 2×2 pixels having the corresponding input pixel as a reference, for the prediction taps in the large dynamic range mode.

Accordingly, it is possible to prevent occurrence of degradation of image quality due to occurrence of ringing in the output pixels.

In FIGS. 11A and 11B, the number of prediction taps is changed in two stages which are 4 pixels and 9 pixels, depending on the size of the local dynamic range for the target pixel, but the number of prediction taps can be changed in three or more stages to set the number of prediction taps to be small, as the size of dynamic range is large.

Configuration Example of Class Tap

Figure 12A:
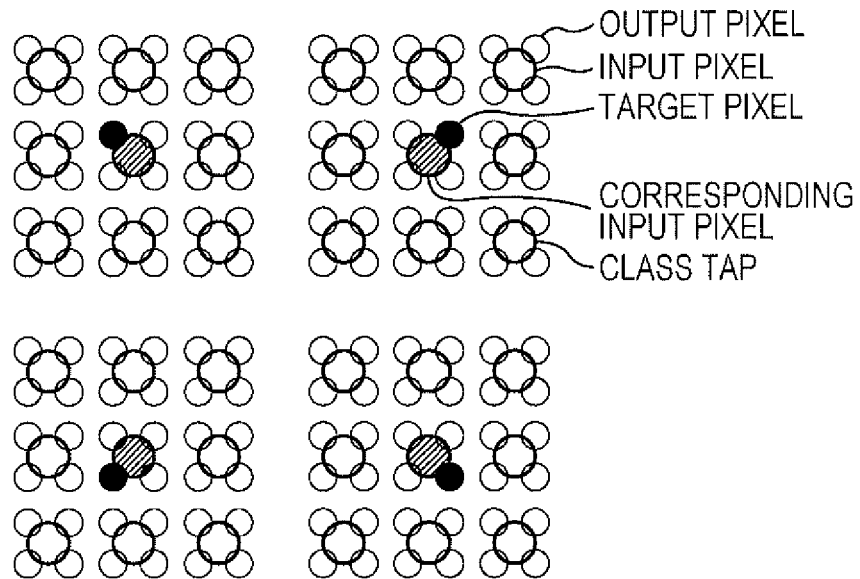
FIGS. 12A and 12B are diagrams showing configuration examples of class taps selected by a tap selection unit.
Figure 12B:
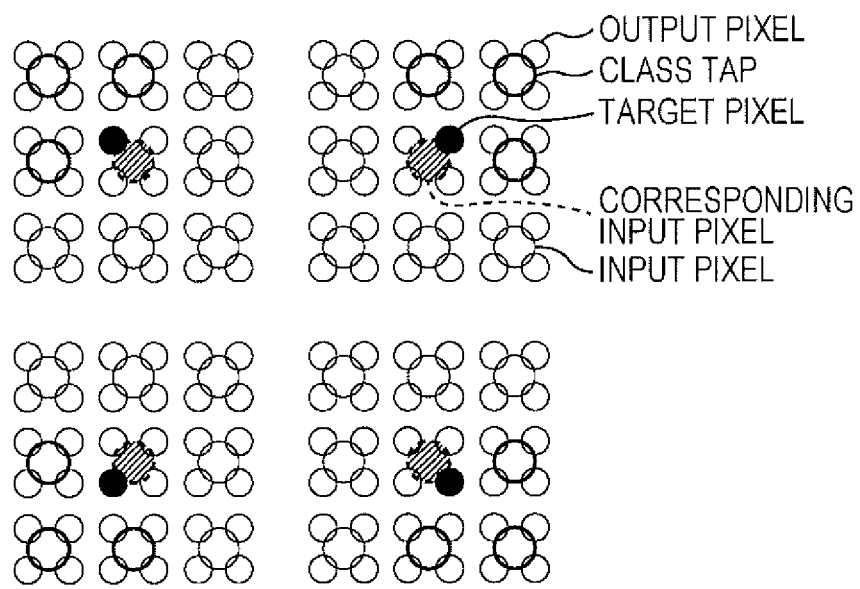

FIGS. 12A and 12B are diagrams showing configuration examples of the class taps selected by the tap selection unit 63 of FIG. 8.

In FIGS. 12A and 12B, in the same manner as in FIGS. 11A and 11B, large circles indicate the input pixels, small circles indicate output pixels, and small circles filled in black indicate output pixels which are set to the target pixels, respectively. In addition, in FIGS. 12A and 12B, bold large circles indicate input pixels which are set to the class taps.

In the same manner as in the case of the prediction taps described in FIGS. 11A and 11B, the tap selection unit 63 (FIG. 8), for example, selects the input pixels which are set to the class taps for the target pixels, using the corresponding input pixels for the target pixels as a reference.

That is, in the same manner as the case of the prediction taps described in FIGS. 11A and 11B, the tap selection unit 63 sets the selection mode of the class taps to the normal mode or the large dynamic range mode based on the dynamic range information from the dynamic range detection unit 61, and selects the class taps.

FIG. 12A shows a configuration example of the class taps in the normal mode.

In the normal mode, for example, as shown in FIG. 12A, in the same manner as the case of the prediction taps of FIG. 11A, the input pixels which are 9 pixels in total with 3×3 pixels having the corresponding input pixel in center, can be selected as the class taps.

FIG. 12B shows a configuration example of the class taps in the large dynamic range mode.

In the large dynamic range mode, as shown in FIG. 12B, in the same manner as the case of the prediction taps of FIG. 11B, using the corresponding input pixel as a reference, the input pixels which are 4 pixels with 2×2 pixels containing the corresponding input pixel, which is less than 9 pixels in a case of the normal mode, can be selected as the prediction taps.

For the class taps, the class taps in the normal mode can be constantly employed regardless of the size of the local dynamic range for the target pixel.

Configuration Example of Classification Unit 64

Figure 13:
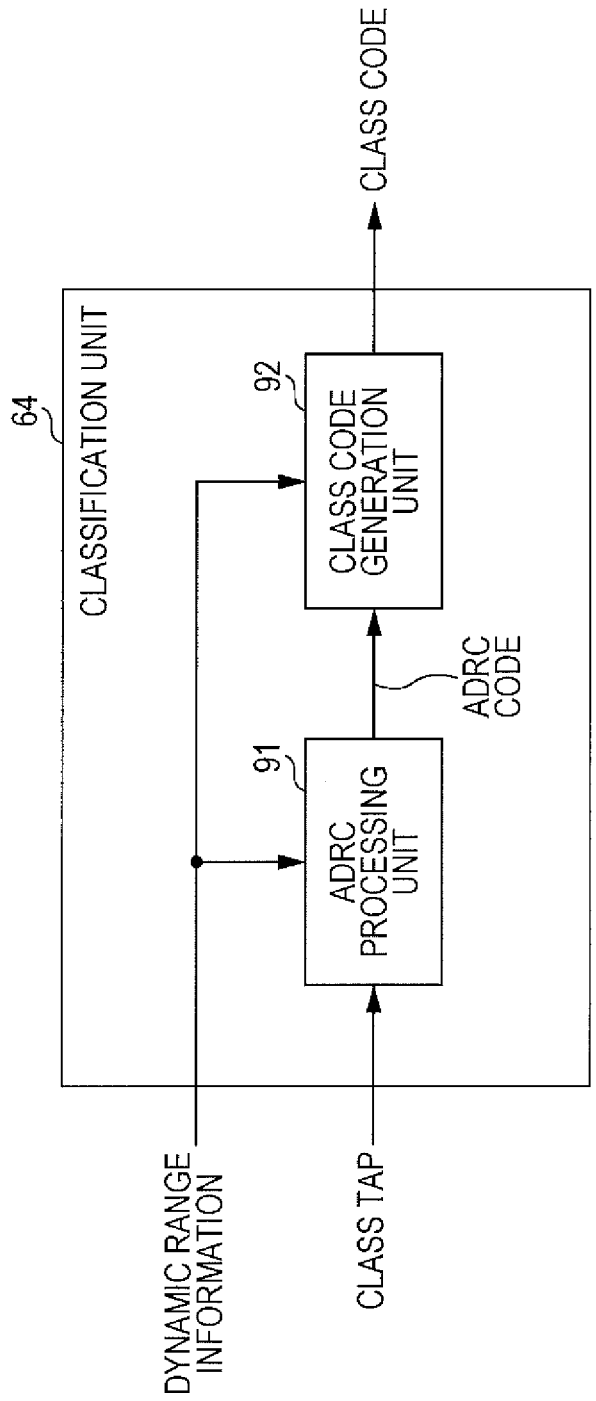
FIG. 13 is a block diagram showing a configuration example of a classification unit.

FIG. 13 is a block diagram showing a configuration example of the classification unit 64 of FIG. 8.

In FIG. 13, the classification unit 64 includes an ADRC processing unit 91 and a class code generation unit 92.

The dynamic range information is supplied to the ADRC processing unit 91 from the dynamic range detection unit 61 (FIG. 8) and the class taps are supplied thereto from the tap selection unit 63.

The ADRC processing unit 91 performs ADRC of (the pixel values of) the input pixels configuring the class taps from the tap selection unit 63, and accordingly quantizes each input pixel configuring the class tap to a predetermined L-bit and supplies the code obtained by arranging the L-bit of each input pixel in predetermined order, to the class code generation unit 92 as the ADRC code.

The ADRC processing unit 91 changes the regulation of the ADRC and the regulation of the classification, based on the dynamic range information from the dynamic range detection unit 61.

That is, the ADRC processing unit 91 changes the number of bits of the ADRC, for example, based on the dynamic range information.

In detail, in a case where the dynamic range information shows that the local dynamic range for the target pixel is not large, the ADRC processing unit 91 sets the classification (ADRC) mode to the normal mode and performs 1-bit ADRC in which the number of bits of the ADRC (quantization) is, for example, 1 bit.

In a case where the dynamic range information shows that the local dynamic range for the target pixel is large, the ADRC processing unit 91 sets the classification mode to the large dynamic range mode and performs 4-bit ADRC in which the number of bits of the ADRC is, for example, 4 bits, which is larger than that in the normal mode.

In addition to the ADRC code supplied from the ADRC processing unit 91, the dynamic range information is also supplied to the class code generation unit 92 from the dynamic range detection unit 61 (FIG. 8).

The class code generation unit 92 generates a code obtained by adding the dynamic range information from the dynamic range detection unit 61 to the ADRC code from the ADRC processing unit 91, as the class code showing the class of the target pixel, and supplies the code to the coefficient output unit 65 (FIG. 8).

Figure 14B:
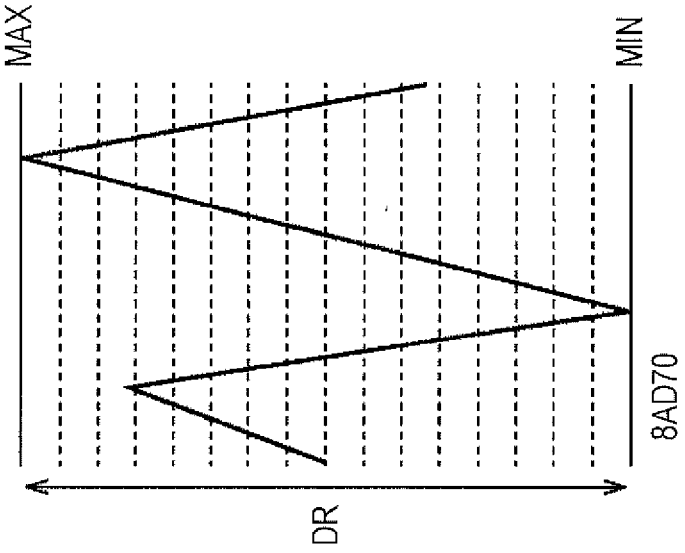
FIGS. 14A and 14B are diagrams illustrating examples of ADRC performed by an ADRC processing unit.
Figure 14A:
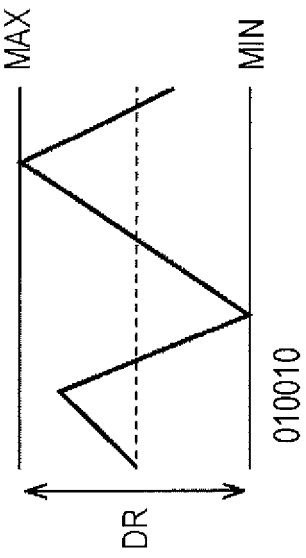

FIGS. 14A and 14B are diagrams illustrating examples of the ADRC performed by the ADRC processing unit 91 of FIG. 13.

In FIGS. 14A and 14B, horizontal axes represent the order (or position) of the input pixels configuring the class taps and vertical axes represent the pixel values of the input pixels configuring the class taps.

FIG. 14A is a diagram illustrating an example of the 1-bit ADRC performed in the classification in the normal mode.

In the 1-bit ADRC, a simple dynamic range DR is acquired by subtracting a minimum pixel value Min from a maximum pixel value Max from the pixel values of the input pixels configuring the class taps. Then, a level obtained by having $2(=2^1)$ the simple dynamic range DR is set as a threshold value, and the pixel value of each input pixel configuring the class tap is binarized (quantized to any binarized values) and converted into a 1-bit code.

FIG. 14B is a diagram illustrating an example of the 4-bit ADRC performed in the classification in the large dynamic range mode.

In the 4-bit ADRC, the simple dynamic range DR is acquired, in the same manner as in the 1-bit ADRC. Then, a level obtained by equally dividing the simple dynamic range DR into 16 parts $(=2^4)$ is set as a threshold value, and the pixel value of each input pixel configuring the class tap is quantized to any value of the 16 values and converted into a 4-bit code.

As described above, in the classification unit 64, in a case where the local dynamic range for the target pixel is not large, the 1-bit ADRC is performed as the classification of the normal mode, and the pixel value of each input pixel configuring the class tap is converted into the 1-bit code.

In contrast, in a case where the local dynamic range for the target pixel is large, the 4-bit ADRC for performing quantizing to 4 bits which is larger than the 1-bit ADRC is performed as the classification of the large dynamic range mode, and the pixel value of each input pixel configuring the class tap is converted into the 4-bit code.

In a case where the local dynamic range for the target pixel is large, by performing the ADRC with a greater number of bits than the case where the local dynamic range for the target pixel is not large, it is possible to improve prediction precision of the pixel value of the target pixel acquired by the prediction operation by the prediction operation unit 16 (FIG. 8), for the target pixel in the area having large change in the pixel values.

In FIG. 13 and FIGS. 14A and 14B, the number of bits of the ADRC as the regulation of the classification is changed in two stages which are 1 bit and 4 bits, depending on the size of the local dynamic range for the target pixel, but the number of bits of the ADRC can be changed in three or more stages to set the number of bits of the ADRC to be large, as the size of dynamic range is large.

As described in FIGS. 12A and 12B, in a case of changing the number of class taps to 4 pixels or 9 pixels based on the dynamic range information, the ADRC is performed for the class taps with 9 pixels as a target at the time of the normal mode, and the ADRC is performed for the class tap with 4 pixels, which is less than those in the normal mode, as a target at the time of the large dynamic range mode. However, in a case where the ADRC is performed for the class taps with 4 pixels, which is less than those in the normal mode, as a target at the time of the large dynamic range mode, in the ADRC performed for the class taps with 4 pixels as a target at the time of the large dynamic range mode, the number of bits of the ADRC can be set so as to obtain the ADRC code having the same number of bits as the ADRC performed for the class tap with 9 pixels as a target at the time of the normal mode.

That is, as described above, in a case where the 1-bit ADRC is performed for the class tap with 9 pixels as a target in the normal mode as a target, the ADRC code having 9 bits is obtained.

As described above, in a case where the ADRC code having 9 bits is obtained, in the ADRC performed for the class tap with 4 pixels as a target in the large dynamic range mode as a target, 3-bit ADRC is performed for the corresponding input pixel among the input pixels as the class taps with 4 pixels shown in FIG. 12B, for example, and 2-bit ADRC can be performed for the remaining input pixels with 3 pixels.

In this case, even in the large dynamic range mode, since the ADRC code having 9 bits (=3+2+2+2 bits) can be obtained in the same manner as in the normal mode, a memory space for storing the tap coefficients used in the normal mode and a memory space for storing the tap coefficients used in the large dynamic range mode coincide with each other, and as a result, the tap coefficients can be stored in the coefficient output unit 65 without wasting storage capacity of the memory.

Image Conversion Process Performed by Image Conversion Device 60

Figure 15:
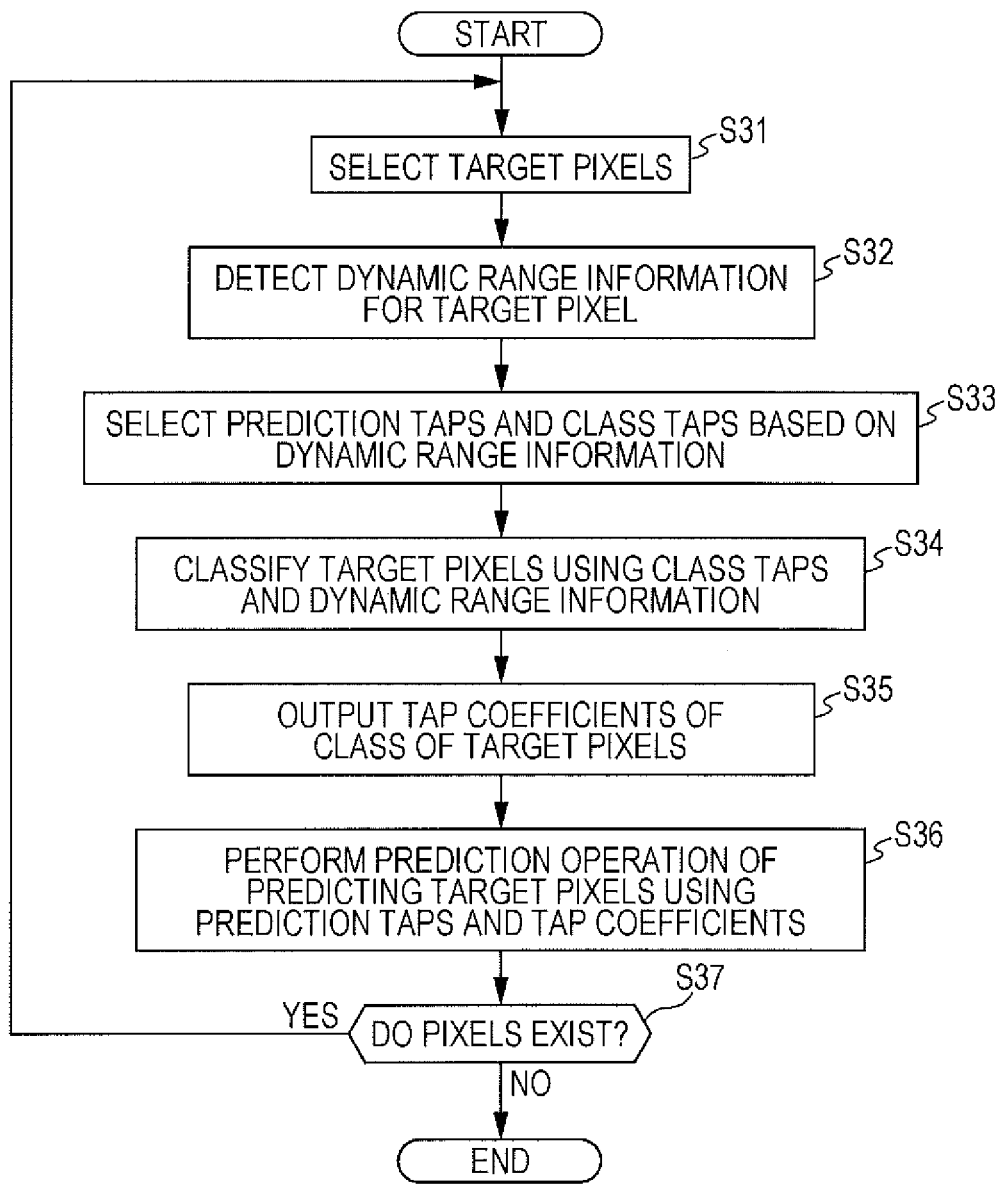
FIG. 15 is a flowchart illustrating an example of an image conversion process performed by an image conversion device.

FIG. 15 is a flowchart illustrating an example of the image conversion process performed by the image conversion device 60 of FIG. 8.

In Step S31, the target pixel selection unit 11 selects one pixel which is not yet a target pixel, from the pixels (output pixels) configuring the output image with respect to the input image input to the image conversion device 60, as a target pixel, and the process proceeds to Step S32. That is, in the target pixel selection unit 11, a pixel which is not yet a target pixel, in raster scan order, from the pixels configuring the output image is selected as the target pixel, for example.

In Step S32, the dynamic range detection unit 61 detects the dynamic range information for the target pixel as described in FIGS. 9 and 10, using the input image input thereto, and supplies the dynamic range information to the tap selection units 62 and 63 and the classification unit 64, and the process proceeds to Step S33.

In Step S33, the tap selection unit 62 selects the pixel which is the prediction tap for the target pixel, from the input image supplied thereto based on the dynamic range information from the dynamic range detection unit 61, as described in FIGS. 11A and 11B, and supplies the pixel to the prediction operation unit 16.

In addition, in Step S33, the tap selection unit 63 selects the pixel which is the class tap for the target pixel, from the input image supplied thereto based on the dynamic range information from the dynamic range detection unit 61, as described in FIGS. 12A and 12B, and supplies the pixel to the classification unit 64, and the process proceeds to Step S34.

In Step S34, the classification unit 64 classifies the target pixel using the dynamic range information and the class tap from the tap selection unit 63, based on the dynamic range information from the dynamic range detection unit 61, as described in FIG. 13 and FIGS. 14A and 14B. In addition, the classification unit 64 outputs the class code showing the class of the target pixel obtained as a result of the classification thereof to the coefficient output unit 65, and the process proceeds from Step S34 to Step S35.

In Step S35, the coefficient output unit 65 acquires and outputs the tap coefficient stored in the address corresponding to the class code from the classification unit 64. In addition, in Step S35, the prediction operation unit 16 acquires the tap coefficient output by the coefficient output unit 65, and the process proceeds to Step S36.

In Step S36, the prediction operation unit 16 performs prediction operation of the formula (1) using the prediction tap output by the tap selection unit 62 and the tap coefficient acquired from the coefficient output unit 65. Accordingly, the prediction operation unit 16 acquires and outputs the pixel value of the target pixel, and the process proceeds to Step S37.

In Step S37, the target pixel selection unit 11 determines whether or not there is the output image with the pixel which is not yet the target pixel. In a case where it is determined that there is the output pixel which is not yet the target pixel, in the Step S37, the process returns to Step S31, and then the processes subsequent thereto are repeated in the same manner as described above.

In a case where it is determined there is no output pixel which is not yet the target pixel, in the Step S37, the process ends.

Configuration Example of Learning Device

Figure 16:
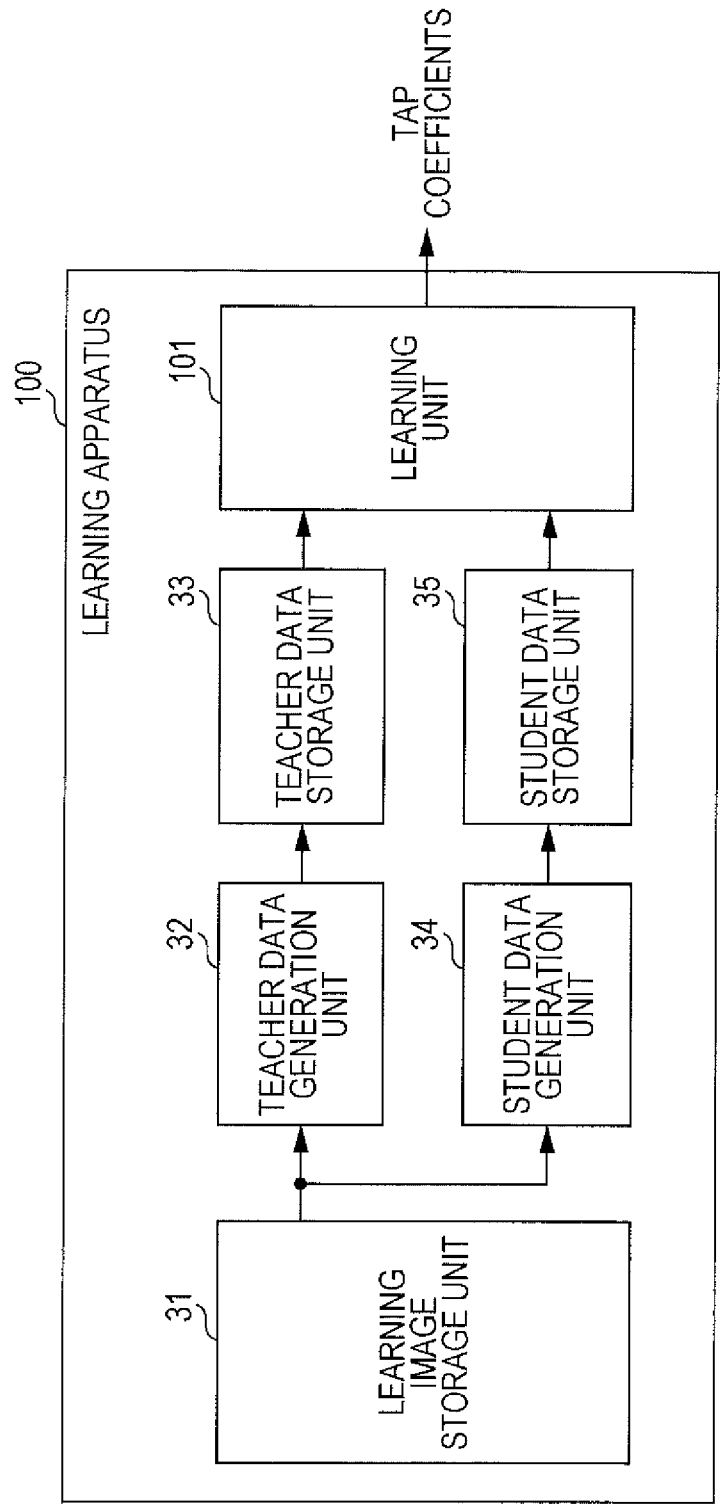
FIG. 16 is a block diagram showing a configuration example of a learning device which performs learning for acquiring a tap coefficient to be stored in a coefficient output unit.

FIG. 16 is a block diagram showing a configuration example of a learning device which performs learning for acquiring the tap coefficients stored in the coefficient output unit 65 of FIG. 8.

In a learning device 100 of FIG. 16, the parts corresponding to the learning device 21 of FIG. 3 are denoted with the same reference numerals, and the description thereof will be appropriately omitted hereinafter.

The learning device 100 of FIG. 16 includes the learning image storage unit 31 to the student data storage unit 35, in common with the learning device 21 of FIG. 3. However, the learning device 100 of FIG. 16 is different from the learning device 21 of FIG. 3, in a point of including a learning unit 101 instead of the learning unit 36.

In FIG. 16, the learning image storage unit 31 stores a high quality image having high resolution corresponding to the output image obtained by the image conversion device 60 of FIG. 8, for example.

The teacher data generation unit 32 supplies the image for learning stored in the learning image storage unit 31, to the teacher data storage unit 33 as the teacher data (teacher image) as it is, to be stored therein.

The student data generation unit 34 generates the input image, that is, student data (student image) having lower resolution and sharpness than those of the teacher data, corresponding to the image obtained by the image sensor 52, in the embodiment, by thinning and filtering the image for learning stored in the learning image storage unit 31, and supplies the student data to the student data storage unit 35 to be stored therein.

The learning unit 101 acquires the tap coefficient for each class by formulating and solving the normal equation of the formula (8) for each class, using the teacher data and the student data described above.

Configuration Example of Learning Unit 101

Figure 17:
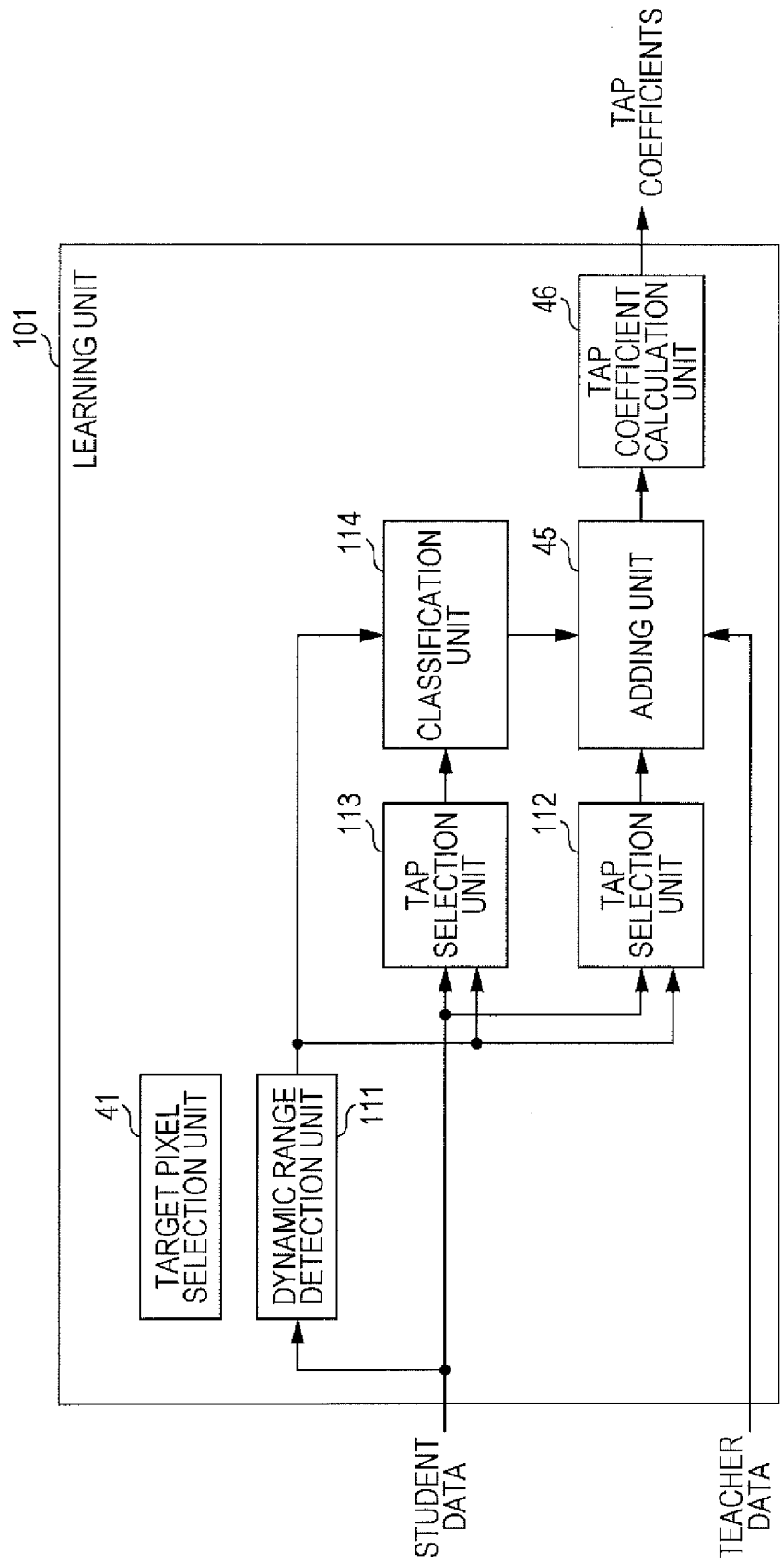
FIG. 17 is a block diagram showing a configuration example of a learning unit.

FIG. 17 is a block diagram showing a configuration example of the learning unit 101 of FIG. 16.

In the drawing, the parts corresponding to the learning unit 36 of FIG. 4 are denoted with the same reference numerals, and the description thereof will be appropriately omitted hereinafter.

The learning unit 101 of FIG. 17 includes the target pixel selection unit 41, the adding unit 45, and the tap coefficient calculation unit 46, in common with the learning unit 36 of FIG. 4. However, the learning unit 101 of FIG. 17 is different from the learning unit 36 of FIG. 4, in a point that a dynamic range detection unit 111 is newly provided, and tap selection units 112 and 113 and a classification unit 114 are provided instead of the tap selection units 42 and 43 and the classification unit 44.

In FIG. 17, the teacher data (hereinafter, also referred to as teacher image) stored in the teacher data storage unit 33 (FIG. 16) is supplied to the adding unit 45. In addition, the student data (hereinafter, also referred to as student image) stored in the student data storage unit 35 (FIG. 16) is supplied to the dynamic range detection unit 111 and the tap selection units 112 and 113.

In the same manner as that of the dynamic range detection unit 61 of FIG. 8, the dynamic range detection unit 111 detects the dynamic range information showing the local dynamic range in the position of the student image corresponding to the target pixel selected from the pixels of the teacher image in the target pixel selection unit 41, and supplies the dynamic range information to the tap selection units 112 and 113 and the classification unit 114.

In the same manner as the tap selection unit 62 of FIG. 8, the tap selection unit 112 selects (the pixel value of) the pixel which is set to the prediction tap from the student image for the target pixel, and supplies the pixel to the prediction operation unit 16.

That is, the tap selection unit 112, for example, selects the pixel which is the prediction tap having the same configuration as the prediction tap obtained by the tap selection unit 62 of FIG. 8, from the student image.

In the same manner as the tap selection unit 62 of FIG. 8, the tap selection unit 112 changes the number of taps which is the number of pixels which are set to the prediction taps, based on the dynamic range information from the dynamic range detection unit 111.

In the same manner as the tap selection unit 63 of FIG. 8, the tap selection unit 113 selects (the pixel value) of the pixel which is the class tap from the student image for the target pixel and supplies the pixel to the classification unit 114.

That is, the tap selection unit 113, for example, selects the pixel which is the class tap having the same configuration as the class tap obtained by the tap selection unit 63 of FIG. 8, from the student image.

In the same manner as the tap selection unit 63 of FIG. 8, the tap selection unit 113 can change the number of taps which is the number of pixels which are set to the class taps, based on the dynamic range information from the dynamic range detection unit 111. However, in the tap selection unit 63 of FIG. 8, the number of class taps is fixed to a constant value regardless of the dynamic range information. In the same manner as the tap selection unit 63, the number of class taps is also fixed to a constant value regardless of the dynamic range information in the tap selection unit 113.

The classification unit 114 performs the same classification as the classification unit 64 of FIG. 8, for the target pixel using the dynamic range information from the dynamic range detection unit 111 and the class tap from the tap selection unit 113, and supplies the class code corresponding to the class of the target pixel obtained as a result thereof to the adding unit 45.

In the same manner as that of the classification unit 64 of FIG. 8, the classification unit 114 changes the predetermined regulation employed for the classification, based on the dynamic range information from the dynamic range detection unit 111.

Learning Process of Learning Device 100

Figure 18:
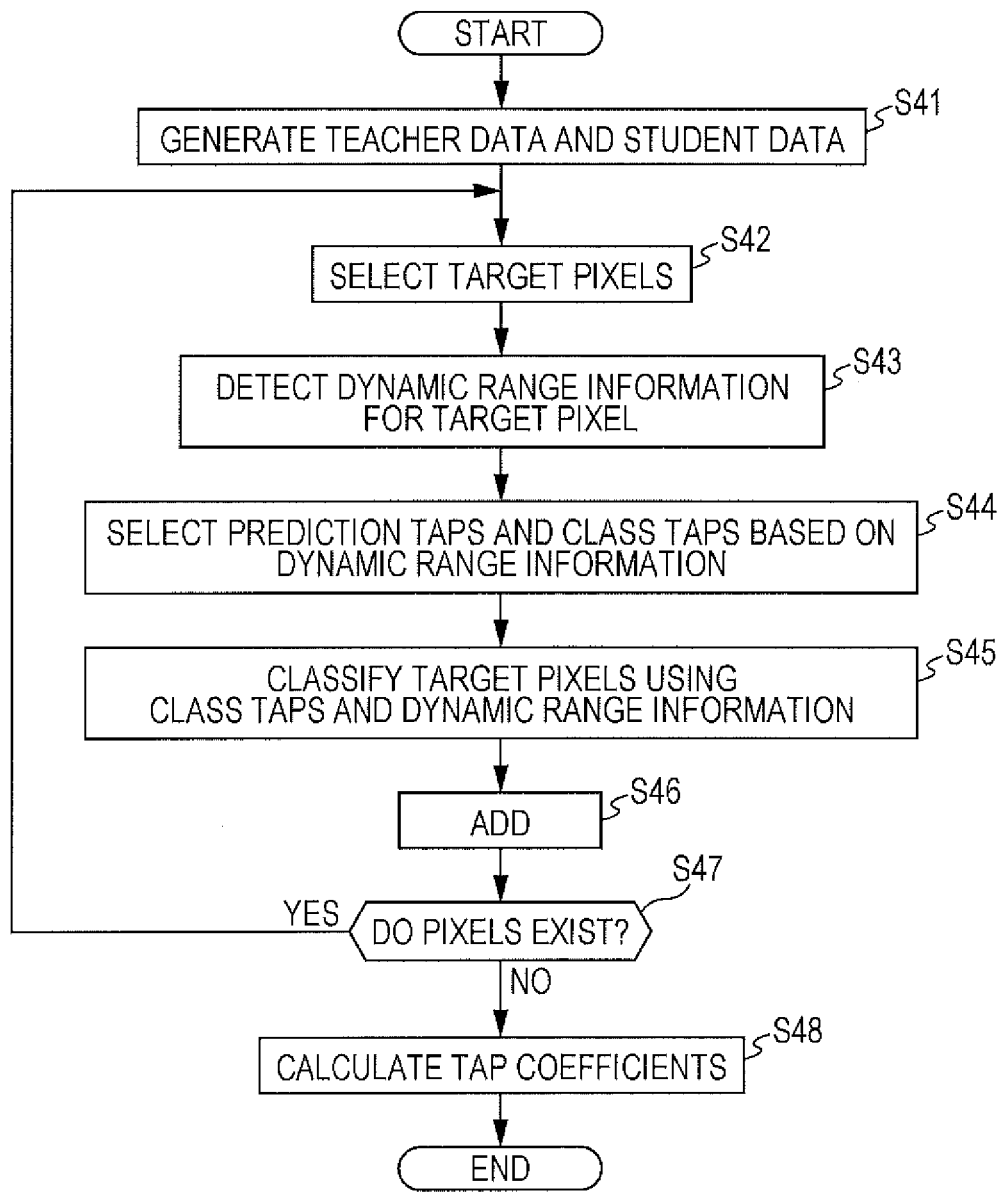
FIG. 18 is a flowchart illustrating a process (learning process) of a learning device.

FIG. 18 is a flowchart illustrating a process (learning process) of the learning device 100 of FIG. 16.

First, in Step S41, the teacher data generation unit 32 and the student data generation unit 34 generate a teacher image (teacher data) and a student image (student data) from the image for learning which is stored in the learning image storage unit 31, and supplies the images to the teacher data storage unit 33 and the student data storage unit 35, respectively, to be stored therein.

After that, the process proceeds to Step S42. In the learning unit 101 (FIG. 17), the target pixel selection unit 41 selects the pixel which is not yet set as the target pixel, as the target pixel, from the pixels of the teacher image stored in the teacher data storage unit 33, and the process proceeds to Step S43.

In Step S43, the dynamic range detection unit 111 detects the dynamic range information for the target pixel, in the same manner as the dynamic range detection unit 61 of FIG. 8, using the student image stored in the student data storage unit 35, and supplies the dynamic range information to the tap selection units 112 and 113 and the classification unit 114, and the process proceeds to Step S44.

In Step S44, in the same manner as the tap selection unit 62 of FIG. 8, the tap selection unit 112 selects the pixel which is the prediction tap for the target pixel, from the student image stored in the student data storage unit 35, based on the dynamic range information from the dynamic range detection unit 111, and supplies the pixel to the adding unit 45.

In addition, in Step S44, in the same manner as the tap selection unit 63 of FIG. 8, the tap selection unit 113 selects the pixel which is the class tap for the target pixel, from the student image stored in the student data storage unit 35, based on the dynamic range information from the dynamic range detection unit 111, and supplies the pixel to the classification unit 114, and the process proceeds to Step S45.

In Step S45, in the same manner as the classification unit 64 of FIG. 8, the classification unit 114 classifies the target pixel using the dynamic range information and the class tap from the tap selection unit 113, based on the dynamic range information from the dynamic range detection unit 111. In addition, the classification unit 114 supplies the class code showing the class of the target pixel obtained as a result of the classification thereof to the adding unit 45, and the process proceeds from Step S45 to Step S46.

In Step S46, the adding unit 45 performs adding of the formula (8) with the pixel of the teacher image as the target pixel stored in the teacher data storage unit 33 and the pixel of the student image as the prediction tap selected for the target pixel supplied from the tap selection unit 112 as targets, for each class code supplied from the classification unit 114, and the process proceeds to Step S47.

In Step S47, the target pixel selection unit 41 determines whether or not the pixel of the teacher image which is not yet set as the target pixel is stored in the teacher data storage unit 33 (FIG. 16). In a case where it is determined that the pixel of the teacher image which is not yet set as the target pixel is stored in the teacher data storage unit 33 in Step S47, the process returns to Step S42, and then the processes subsequent thereto are repeated in the same manner as described above.

In a case where it is determined that the pixel of the teacher image which is not yet set as the target pixel is not stored in the teacher data storage unit 33 in Step S47, the adding unit 45 supplies the matrix on the left side and the vector on the right side of the formula (8) for each class obtained by the processes from Steps S42 to S47 to the tap coefficient calculation unit 46, and the process proceeds to Step S48.

In Step S48, the tap coefficient calculation unit 46 acquires and outputs the tap coefficient for each class, by solving the normal equation for each class configured by the matrix on the left side and the vector on the right side of the formula (8) for each class supplied from the adding unit 45, and the process ends.

As described above, in a case where the local dynamic range for the target pixel is not large and the ringing does not occur, by changing the number of taps which is the number of pixels which is the prediction tap, based on the dynamic range information, it is possible to obtain the tap coefficient for emphasizing the high frequency, and in a case where the local dynamic range for the target pixel is large and the ringing may occur, it is possible to obtain the tap coefficient for suppressing the occurrence of the ringing.

As a result, in the image conversion process performed by the image conversion device 60 of FIG. 8, it is possible to prevent degradation of the image quality due to the occurrence of ringing and to obtain the output image having sharpness.

In addition to changing the number of taps which is the number of pixels which are the prediction taps based on the dynamic range information, the image conversion device 60 of FIG. 8 and the learning unit 101 of FIG. 17, as described above, can change the predetermined regulation of the classification based on the dynamic range information or can employ the simple dynamic range or the normalized dynamic range as the local dynamic range based on the grayscale property of the input image (student image).

In this case, it is possible to more strongly prevent degradation of the image quality due to the occurrence of ringing and to obtain the output image having sharpness.

Simulation Result

Figure 19:
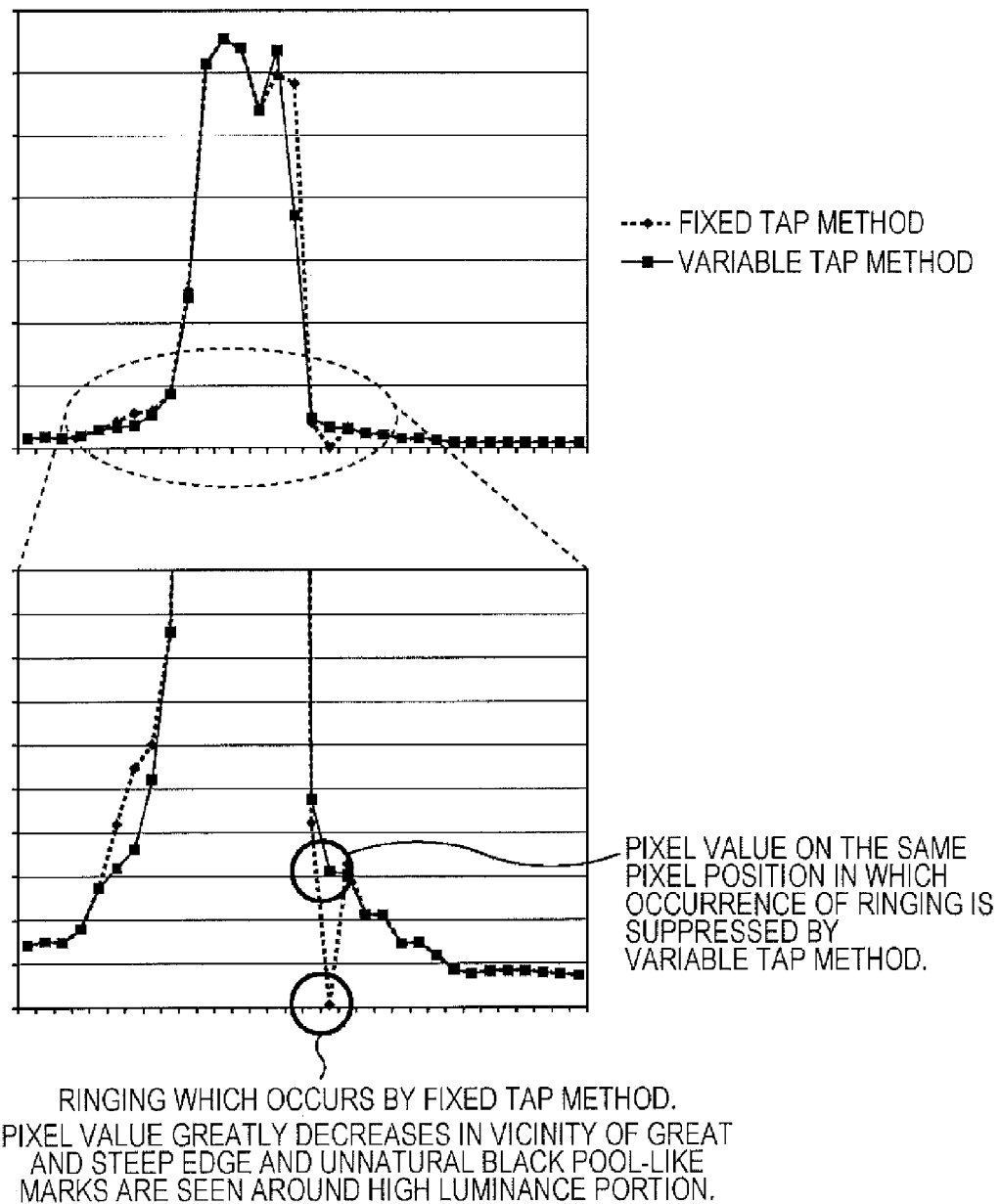
FIG. 19 is a diagram showing a result of simulation.

FIG. 19 is a diagram showing a result of simulation performed by the inventor.

In FIG. 19, a horizontal axis represents a position of a pixel and a vertical axis represents a pixel value.

In FIG. 19, a solid line represents the pixel value of the output image obtained by the image conversion process performed by employing a variable tap method of changing the number of prediction taps based on the dynamic range information, as the image conversion device 60 of FIG. 8. In FIG. 19, a dotted line represents the pixel value of the output image obtained by the image conversion process as the classification adaptive process performed by employing a fixed tap method of fixing the number of prediction taps regardless of the dynamic range information.

As shown in FIG. 19, in the fixed tap method, the pixel value of the output image greatly decreases in a vicinity of a sharp edge and ringing which generates black pool-like marks occurs in a vicinity of a high luminance portion of the output image.

Meanwhile, as shown in FIG. 19, in the variable tap method, the great decrease of the pixel value of the output image is prevented in the vicinity of the sharp edge and the ringing does not occur. Accordingly, it is possible to prevent the degradation of the image quality of the output image.

Another Configuration Example of Image Conversion Device which Performs Sharpness Improvement Process by Signal Processing Unit 54

Figure 20:
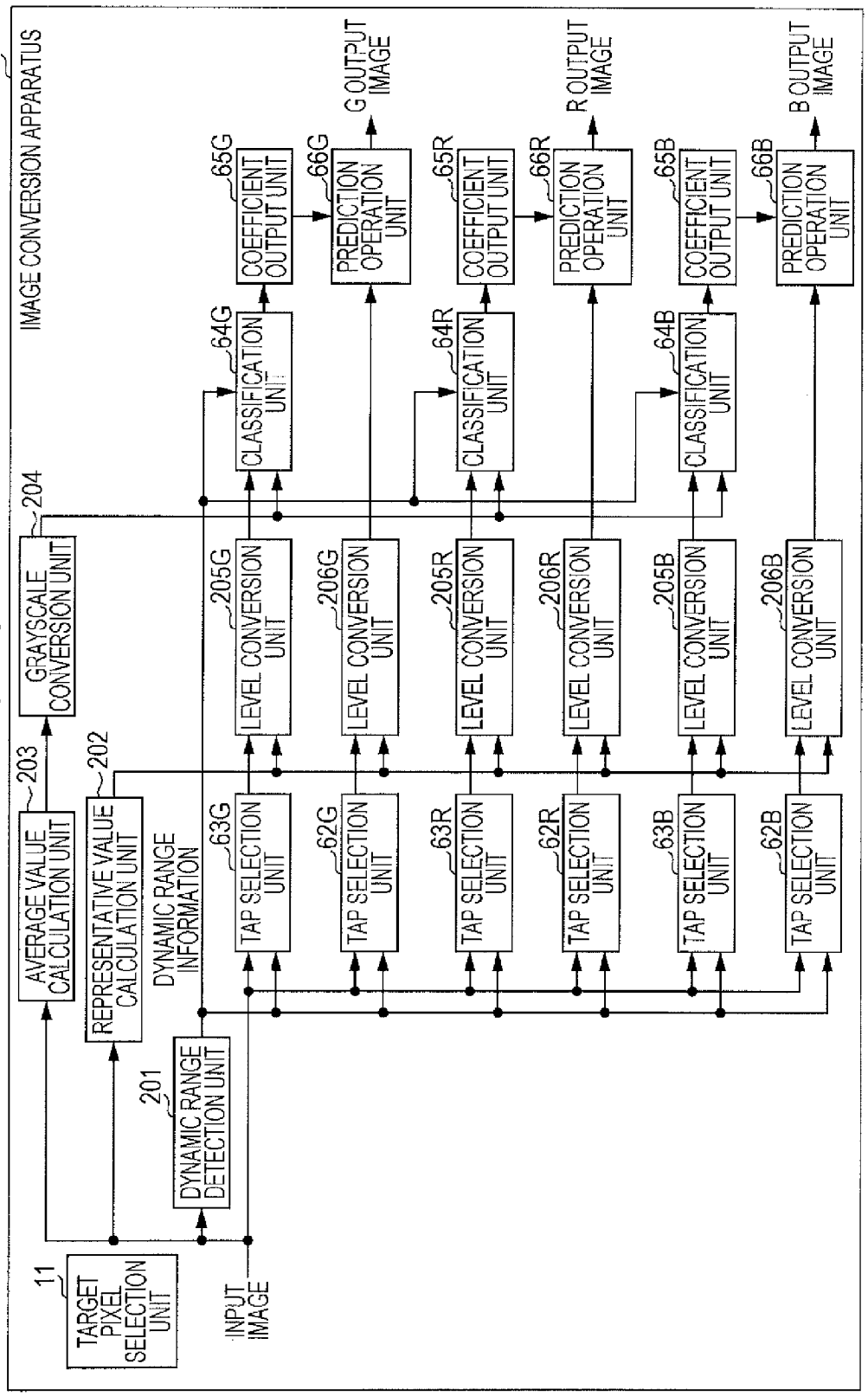
FIG. 20 is a block diagram showing another configuration of an image conversion device which performs a sharpness improvement process performed by a signal processing unit.

FIG. 20 is a block diagram showing another configuration example of an image conversion device which performs a sharpness improvement process performed by the signal processing unit 54 of FIG. 7.

In an image conversion device 200 of FIG. 20, parts corresponding to the image conversion device 60 of FIG. 8 are denoted with the same reference numerals and the description thereof will be appropriately omitted hereinafter.

Herein, in FIG. 8, the input image has the luminance as the pixel value, but in FIG. 20, the input image is an image having one color component among a plurality of color components, for example, red, green, and blue (RGB), as the pixel value, for each pixel (input pixel).

In FIG. 20, as the output image, an image in which each pixel (output pixel) has all of the plurality of color components such as RGB as the pixel value is employed.

In this case, in the image conversion device 200 of FIG. 20, for example, a demosaic process of converting the input image having one color component among the RGB color components as a pixel value for each pixel, into the output image in which each pixel has all of the RGB color components as the pixel value, is performed as the image conversion process, with the sharpness improvement process.

That is, herein, when the output image in which each pixel only has the R color component (hereinafter, also referred to as an R component) as the pixel value is referred to as an R output image, the output image in which each pixel only has the G color component (hereinafter, also referred to as a G component) as the pixel value is referred to as a G output image, and the output image in which each pixel only has the B color component (hereinafter, also referred to as a B component) as the pixel value is referred to as a B output image, in the image conversion device 200, each of the R output image, the G output image, and the B output image are respectively predicted from the input image (the input image is converted into the R output image, the G output image, and the B output image, respectively).

In FIG. 20, the input image is supplied to tap selection units 62G, 62R, and 62B, tap selection units 63G, 63R, and 63B, a dynamic range detection unit 201, a representative value calculation unit 202, and an average value calculation unit 203, from the memory 53 (FIG. 7).

In addition, the dynamic range information for the target pixel is supplied to the tap selection units 62G, 62R, and 62B from the dynamic range detection unit 201, in addition to the input image supplied thereto from the memory 53.

The tap selection units 62G, 62R, and 62B correspond to the tap selection unit 62 of FIG. 8.

In the same manner as the tap selection unit 62 of FIG. 8, the tap selection units 62G, 62R, and 62B select (the pixel values of) the pixels which are the prediction taps for predicting the G component, the R component, and the B component for the target pixel from the input image, and supply each of them to level conversion units 206G, 206R, and 206B.

In the same manner as the tap selection unit 62 of FIG. 8, the tap selection units 62G, 62R, and 62B change the number of prediction taps based on the dynamic range information from the dynamic range detection unit 201.

The dynamic range information for the target pixel is supplied to the tap selection units 63G, 63R, and 63B from the dynamic range detection unit 201, in addition to the input image supplied thereto from the memory 53.

The tap selection units 63G, 63R, and 63B correspond to the tap selection unit 63 of FIG. 8.

In the same manner as the tap selection unit 63 of FIG. 8, the tap selection units 63G, 63R, and 63B select (the pixel values of) the pixels which are the class taps used for classification at the time of predicting the G component, the R component, and the B component for the target pixel from the input image, and supply each of them to level conversion units 205G, 205R, and 205B.

In addition, in the same manner as the tap selection unit 63 of FIG. 8, the tap selection units 63G, 63R, and 63B can change the number of class taps based on the dynamic range information from the dynamic range detection unit 201. In the same manner as the tap selection unit 63 of FIG. 8, in the tap selection units 63G, 63R, and 63B, the number of class taps can be fixed to a constant value regardless of the dynamic range information from the dynamic range detection unit 201.

The dynamic range information, a grayscale conversion value which will be described later, and the class taps (after level conversion) are supplied to classification units 64G, 64R, and 64B, respectively, from the dynamic range detection unit 201, a grayscale conversion unit 204, and each of the level conversion units 205G, 205R, and 205B.

The classification units 64G, 64R, and 64B correspond to the classification unit 64 of FIG. 8.

The classification units 64G, 64R, and 64B classify the target pixel according to a predetermined regulation, for example, by the ADRC or the like, based on the dynamic range information from the dynamic range detection unit 201, the grayscale conversion value from the grayscale conversion unit 204, and the class taps from each of the level conversion units 205G, 205R, and 205B, and supply the class code corresponding to the class of the target pixel obtained as a result thereof to coefficient output units 65G, 65R, and 65B, respectively.

In the same manner as the classification unit 64 of FIG. 8, the classification units 64G, 64R, and 64B change the predetermined regulation employed for the classification, based on the dynamic range information from the dynamic range detection unit 201.

The coefficient output units 65G, 65R, and 65B correspond to the coefficient output unit 65 of FIG. 8, and store the tap coefficients for each class acquired by the learning which will be described later in the embedded memory (not shown).

The coefficient output units 65G, 65R, and 65B read out and acquire the tap coefficients stored in the address corresponding to the class code supplied from the classification units 64G, 64R, and 64B, from the tap coefficients stored in the embedded memory, and supply the tap coefficients to prediction operation units 66G, 66R, and 66B.

The prediction operation units 66G, 66R, and 66B correspond to the prediction operation unit 16 of FIG. 8.

The prediction operation units 66G, 66R, and 66B acquire each of the prediction taps (after the level conversion) supplied from the level conversion units 206G, 206R, and 206B and each of the tap coefficients output by the coefficient output units 65G, 65R, and 65B, and perform the prediction operation of the formula (1) for acquiring the prediction value of (the true value) of the G component, the R component, and the B component, respectively, as the pixel value of the target pixel, using the prediction taps and the tap coefficients.

The prediction operation units 66G, 66R, and 66B output the G component, the R component, and the B component as the pixel value of the target pixel obtained as a result of the prediction operation, that is, the G component, the R component, and the B component as the pixel value of the output image (the pixel value of the G output image, the pixel value of the R output image, and the pixel value of the B output image).

If the tap selection unit 62 to the coefficient output unit 65, and the prediction operation unit 16 of FIG. 8 are referred to as a prediction block for predicting the output image, in FIG. 20, the tap selection unit 62G to the prediction operation unit 66G configure a prediction block (prediction block for G output image) for predicting the G output image.

In the same manner as described above, the tap selection unit 62R to the prediction operation unit 66R configure a prediction block (prediction block for R output image) for predicting the R output image, and the tap selection unit 62B to the prediction operation unit 66B configure a prediction block (prediction block for B output image) for predicting the B output image.

The dynamic range detection unit 201 corresponds to the dynamic range detection unit 61 of FIG. 8.

In the same manner as the dynamic range detection unit 61 of FIG. 8, the dynamic range detection unit 201 detects the dynamic range information showing the local dynamic range for the target pixel selected from the pixels of the output image (second image) in the target pixel selection unit 11, and supplies the dynamic range information to the tap selection units 62G, 62R, and 62B, the tap selection units 63G, 63R, and 63B, and the classification units 64G, 64R, and 64B.

However, the dynamic range detection unit 201 separately acquires the local dynamic range for each of the G component, the R component, and the B component as a target, and detects the dynamic range information of each of the G component, the R component, and the B component showing the local dynamic range of the G component, the R component, and the B component.

The dynamic range information of the G component is detected by only using the G component among the pixel values of the input pixel selected for the detection tap (FIG. 9) used for the detection of the local dynamic range.

In the same manner as described above, the dynamic range information of the R component is detected by only using the R component among the pixel values of the input pixel selected for the detection tap, and the dynamic range information of the B component is detected by only using the B component among the pixel values of the input pixel selected for the detection tap.

The dynamic range information of the G component is supplied to the tap selection units 62G and 63G and the classification unit 64G configuring the prediction block for the G output image, from the dynamic range detection unit 201.

The dynamic range information of the R component is supplied to the tap selection units 62R and 63R and the classification unit 64R configuring the prediction block for the R output image, from the dynamic range detection unit 201. The dynamic range information of the B component is supplied to the tap selection units 62B and 63B and the classification unit 64B configuring the prediction block for the B output image, from the dynamic range detection unit 201.

The representative value calculation unit 202 calculates each representative value of the G component, the R component, and the B component (hereinafter, also referred to as a G representative value, an R representative value, and a B representative value, respectively) for the target pixel.

The representative value calculation unit 202 supplies the G representative value, the R representative value, and the B representative value to the level conversion units 205G, 205R, and 205B and the level conversion units 206G, 206R, and 206B.

Herein, by setting the predetermined area containing the input pixels as the prediction taps or the class taps for the target pixels, to a representative value calculation area for calculating the representative value, the representative value calculation unit 202 calculates the G representative value, the R representative value, and the B representative value using the input pixels in the representative value calculation area.

The average value calculation unit 203 acquires an average value, for example, of the pixel values of the plurality of input pixels which are close to the position of the input image corresponding to the target pixel, as a pixel value (hereinafter, also referred to as corresponding position pixel value) in the position of the input image corresponding to the target pixel, and supplies the average value to the grayscale conversion unit 204.

Herein, for example, by setting the representative value calculation area described above as a corresponding position pixel value calculation area for calculating the corresponding position pixel value, the average value calculation unit 203 can calculate the corresponding position pixel value using the input pixels in the corresponding position pixel value calculation area.

As the corresponding position pixel value, an average value of only the G component having high visual sensitivity by a human, for example, among the pixel values of the input pixels in the corresponding position pixel value calculation area can be employed.

The grayscale conversion unit 204 performs grayscale conversion of the input image, and supplies a grayscale conversion value obtained as a result thereof to the classification units 64G, 64R, and 64B.

That is, the grayscale conversion unit 204 performs, for example, a logarithm operation of the pixel value (corresponding position pixel value) in the position of the input image corresponding to the target pixel from the average value calculation unit 203, as the grayscale conversion of the input image, and supplies a grayscale conversion value obtained as a result thereof to the classification units 64G, 64R, and 64B.

The grayscale conversion performed by the grayscale conversion unit 204 can be performed by an operation other than the logarithm operation.

In a case where the input pixel having the R component or the B component which is a component other than the G component, as a pixel value, is included in the input pixels configuring the class tap from the tap selection unit 63G, the level conversion unit 205G performs level conversion for matching the level (value) of the R component or the B component to the level of the G component by using the G representative value, the R representative value, and the B representative value from the representative value calculation unit 202 as appropriate.

That is, the G representative value, the R representative value, and the B representative value are represented as Dg, Dr, and Db, respectively, and the input pixel having the G component, the R component, or the B component as the pixel value is referred to as a G input pixel, an R input pixel, or a B input pixel, respectively.

In addition, the G component, the R component, and the B component which are pixel values of the G input pixel, the R input pixel, and the B input pixel are represented as Xg, Xr, and Xb, respectively.

The level conversion unit 205G performs the level conversion for converting the R component Xr which is the pixel value of the R input pixel of the class tap into an R component Xr' in a level close to the G representative value Dg, based on an equation $Xr'=Xr-(Dr-Dg)$.

The level conversion unit 205G performs the level conversion for converting the B component Xb which is the pixel value of the B input pixel of the class tap into a B component Xb' in the level close to the G representative value Dg, based on an equation $Xb'=Xb-(Db-Dg)$.

As described above, in the level conversion performed by the level conversion unit 205G, the R component Xr and the B component Xb which are the components other than the G component Xg of the class tap, are offset to the level close to the G representative value Dg.

The class tap after the level conversion performed by the level conversion unit 205G is supplied to the classification unit 64G.

In a case where the input pixel having the G component or the B component which is a component other than the R component, as a pixel value, is included in the input pixels configuring the class tap from the tap selection unit 63R, the level conversion unit 205R performs level conversion for matching the level (value) of the G component or the B component to the level of the R component by using the R representative value, the G representative value, and the B representative value from the representative value calculation unit 202 as appropriate.

That is, the level conversion unit 205R performs the level conversion for converting the G component Xg of the pixel value of the G input pixel of the class tap into a G component Xg' in a level close to the R representative value Dr, based on an equation $Xg'=Xg-(Dg-Dr)$.

That is, the level conversion unit 205R performs the level conversion for converting the B component Xb of the pixel value of the B input pixel of the class tap into a B component Xb' in a level close to the R representative value Dr, based on an equation $Xb'=Xb-(Db-Dr)$.

As described above, in the level conversion performed by the level conversion unit 205R, the G component Xg and the B component Xb which are the components other than the R component Xr of the class tap, are offset to the level close to the R representative value Dr.

The class tap after the level conversion performed by the level conversion unit 205R is supplied to the classification unit 64R.

In a case where the input pixel having the G component or the R component which is a component other than the B component, as a pixel value, is included in the input pixels configuring the class tap from the tap selection unit 63B, the level conversion unit 205B performs level conversion for matching the level (value) of the G component or the R component to the level of the B component by using the B representative value, the G representative value, and the R representative value from the representative value calculation unit 202 as appropriate.

That is, the level conversion unit 205B performs the level conversion for converting the G component Xg of the pixel value of the G input pixel of the class tap into a G component Xg' in a level close to the B representative value Db, based on an equation $Xg'=Xg-(Dg-Db)$.

That is, the level conversion unit 205B performs the level conversion for converting the R component Xr of the pixel value of the R input pixel of the class tap into an R component Xr' in a level close to the B representative value Db, based on an equation $Xr'=Xr-(Dr-Db)$.

As described above, in the level conversion performed by the level conversion unit 205B, the G component Xg and the R component Xr which are the components other than the B component Xb of the class tap, are offset to the level close to the B representative value Db.

The class tap after the level conversion performed by the level conversion unit 205B is supplied to the classification unit 64B.

In a case where the input pixel having the R component or the B component which is a component other than the G component, as a pixel value, is included in the input pixels configuring the prediction tap from the tap selection unit 62G, the level conversion unit 206G performs level conversion for matching the level (value) of the R component or the B component to the level of the G component by using the G representative value, the R representative value, and the B representative value from the representative value calculation unit 202 as appropriate.

That is, the level conversion unit 206G performs the level conversion for converting the R component Xr which is the pixel value of the R input pixel of the prediction tap into an R component Xr' in a level close to the G representative value Dg, based on an equation $Xr'=Xr-(Dr-Dg)$.

The level conversion unit 206G performs the level conversion for converting the B component Xb which is the pixel value of the B input pixel of the prediction tap into a B component Xb' in a level close to the G representative value Dg, based on an equation Xb'=Xb−(Db−Dg).

As described above, in the level conversion performed by the level conversion unit 206G, the R component Xr and the B component Xb which are the components other than the G component Xg of the prediction tap, are offset to the level close to the G representative value Dg.

The prediction tap after the level conversion performed by the level conversion unit 206G is supplied to the prediction operation unit 66G.

In a case where the input pixel having the G component or the B component which is a component other than the R component, as a pixel value, is included in the input pixels configuring the prediction tap from the tap selection unit 62R, the level conversion unit 206R performs level conversion for matching the level (value) of the G component or the B component to the level of the R component by using the R representative value, the G representative value, and the B representative value from the representative value calculation unit 202 as appropriate.

That is, the level conversion unit 206R performs the level conversion for converting the G component Xg of the pixel value of the G input pixel of the prediction tap into a G component Xg' in a level close to the R representative value Dr, based on an equation Xg'=Xg−(Dg−Dr).

That is, the level conversion unit 206R performs the level conversion for converting the B component Xb of the pixel value of the B input pixel of the prediction tap into a B component Xb' in a level close to the R representative value Dr, based on an equation Xb'=Xb−(Db−Dr).

As described above, in the level conversion performed by the level conversion unit 206R, the G component Xg and the B component Xb which are the components other than the R component Xr of the prediction tap, are offset to the level close to the R representative value Dr.

The prediction tap after the level conversion performed by the level conversion unit 206R is supplied to the prediction operation unit 66R.

In a case where the input pixel having the G component or the R component which is a component other than the B component, as a pixel value, is included in the input pixels configuring the prediction tap from the tap selection unit 62B, the level conversion unit 206B performs level conversion for matching the level (value) of the G component or the R component to the level of the B component by using the B representative value, the G representative value, and the R representative value from the representative value calculation unit 202 as appropriate.

That is, the level conversion unit 206B performs the level conversion for converting the G component Xg of the pixel value of the G input pixel of the prediction tap into a G component Xg' in a level close to the B representative value Db, based on an equation Xg'=Xg−(Dg−Db).

The level conversion unit 206B performs the level conversion for converting the R component Xr of the pixel value of the R input pixel of the prediction tap into an R component Xr' in a level close to the B representative value Db, based on an equation Xr'=Xr−(Dr−Db).

As described above, in the level conversion performed by the level conversion unit 206B, the G component Xg and the R component Xr which are the components other than the B component Xb of the prediction tap, are offset to the level close to the B representative value Db.

The prediction tap after the level conversion performed by the level conversion unit 206B is supplied to the prediction operation unit 66B.

In the tap selection unit 62G, in a case where both the R input pixel and the B input pixel which are the input pixels other than the G input pixel, are not included in the prediction tap, it is not necessary to provide the level conversion unit 206G on the subsequent stage.

In the same manner as described above, in the tap selection unit 62R, in a case where both the G input pixel and the B input pixel which are the input pixels other than the R input pixel, are not included in the prediction tap, it is not necessary to provide the level conversion unit 206R on the subsequent stage, and in the tap selection unit 62B, in a case where both the R input pixel and the G input pixel which are the input pixels other than the B input pixel, are not included in the prediction tap, it is not necessary to provide the level conversion unit 206B on the subsequent stage.

In the tap selection unit 63G, in a case where both the R input pixel and the B input pixel which are the input pixels other than the G input pixel, are not included in the class tap, it is not necessary to provide the level conversion unit 205G on the subsequent stage.

In the same manner as described above, in the tap selection unit 63R, in a case where both the G input pixel and the B input pixel which are the input pixels other than the R input pixel, are not included in the class tap, it is not necessary to provide the level conversion unit 205R on the subsequent stage, and in the tap selection unit 63B, in a case where both the R input pixel and the G input pixel which are the input pixels other than the B input pixel, are not included in the class tap, it is not necessary to provide the level conversion unit 205B on the subsequent stage.

Example of Input Image

Figure 21A:
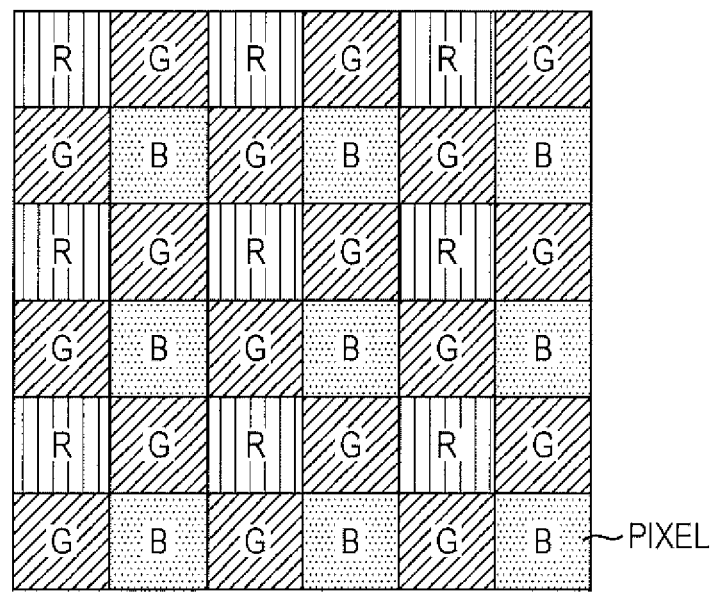
FIGS. 21A and 21B are diagrams showing examples of input images which are targets of an image conversion process performed by an image conversion device.
Figure 21B:
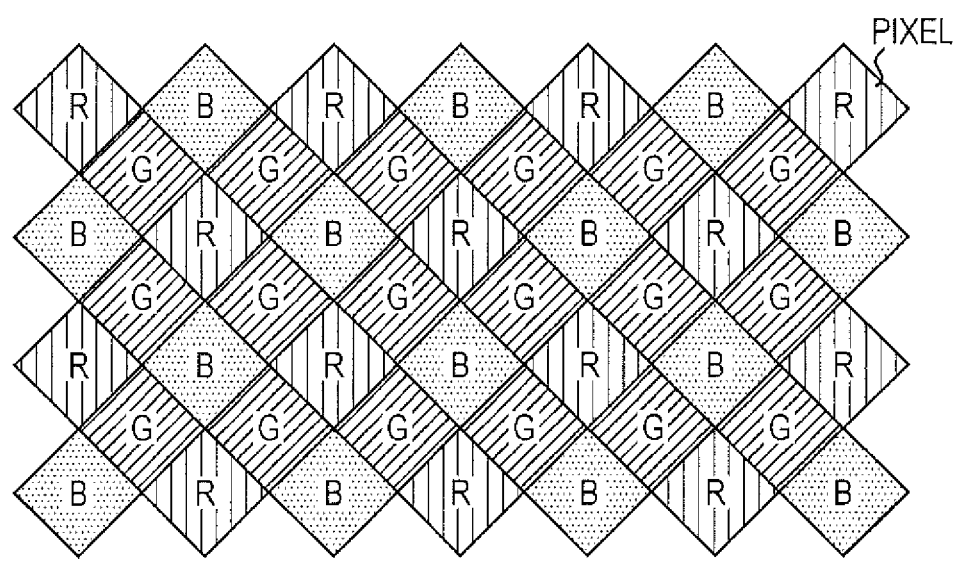

FIGS. 21A and 21B are diagrams showing examples of input images which are targets of the image conversion process performed by the image conversion device 200 of FIG.

As described in FIG. 20, the image conversion device 200 performs the image conversion process using the image having one color component from the three color components which are the R component, the G component, and the B component as a pixel value for each pixel, as the input image.

The input image described above is obtained in a case where the image sensor 52 is a single plate-type image sensor.

An image which is obtained by the single plate-type image sensor 52 and has one color component from the three color components which are the R component, the G component, and the B component as a pixel value for each pixel, is also referred to as a single plate-type image, hereinafter.

FIG. 21A shows an example of the single plate-type image.

An array of the colors (components) of the single plate-type image of FIG. 21A is an array called Bayer array, and in the Bayer array, for example, 2×2 (horizontal×vertical) pixels in which the R component (pixel having the R component as the pixel value) is arranged on an upper left pixel, the B component is arranged on a lower right pixel, and the G components are respectively arranged on lower left and upper right pixels, are set as a basic unit, and this basic unit is repeatedly arranged horizontally and vertically.

Since the G component has high visual sensitivity by a human, compared to the R component and the B component, in the Bayer array, the G components (pixel having the G components as the pixel value) are arranged to be larger than the R components and the B components.

FIG. 21B shows another example of the single plate-type image.

An array of the colors (components) of the single plate-type image of FIG. 21B is an array obtained by inclining the Bayer array of FIG. 21A by 45 degrees.

Accordingly, in the single plate-type image of FIG. 21B, a basic unit of the Bayer array of FIG. 21A obtained by inclining by 45 degrees is repeatedly arranged in a direction of the angle of 45 degrees.

Herein, the array of colors of the single plate-type image of FIG. 21A is also called a single Bayer array, and the array of colors of the single plate-type image of FIG. 21B is also called a double Bayer array. In a case where a gap between the pixels adjacent to each other can be set to a constant value in a horizontal direction and a vertical direction, the doubled number of pixels of the case of the single Bayer array can be disposed in the double Bayer array with respect to the same area.

As the input image which is a target of the image conversion process performed by the image conversion device 200 of FIG. 20, a single plate-type image with an array other than the single Bayer array or the double Bayer array described above can be employed, for example.

Hereinafter, as the input image, the single plate-type image with the double Bayer array of FIG. 21B is employed, for example.

Figure 22:
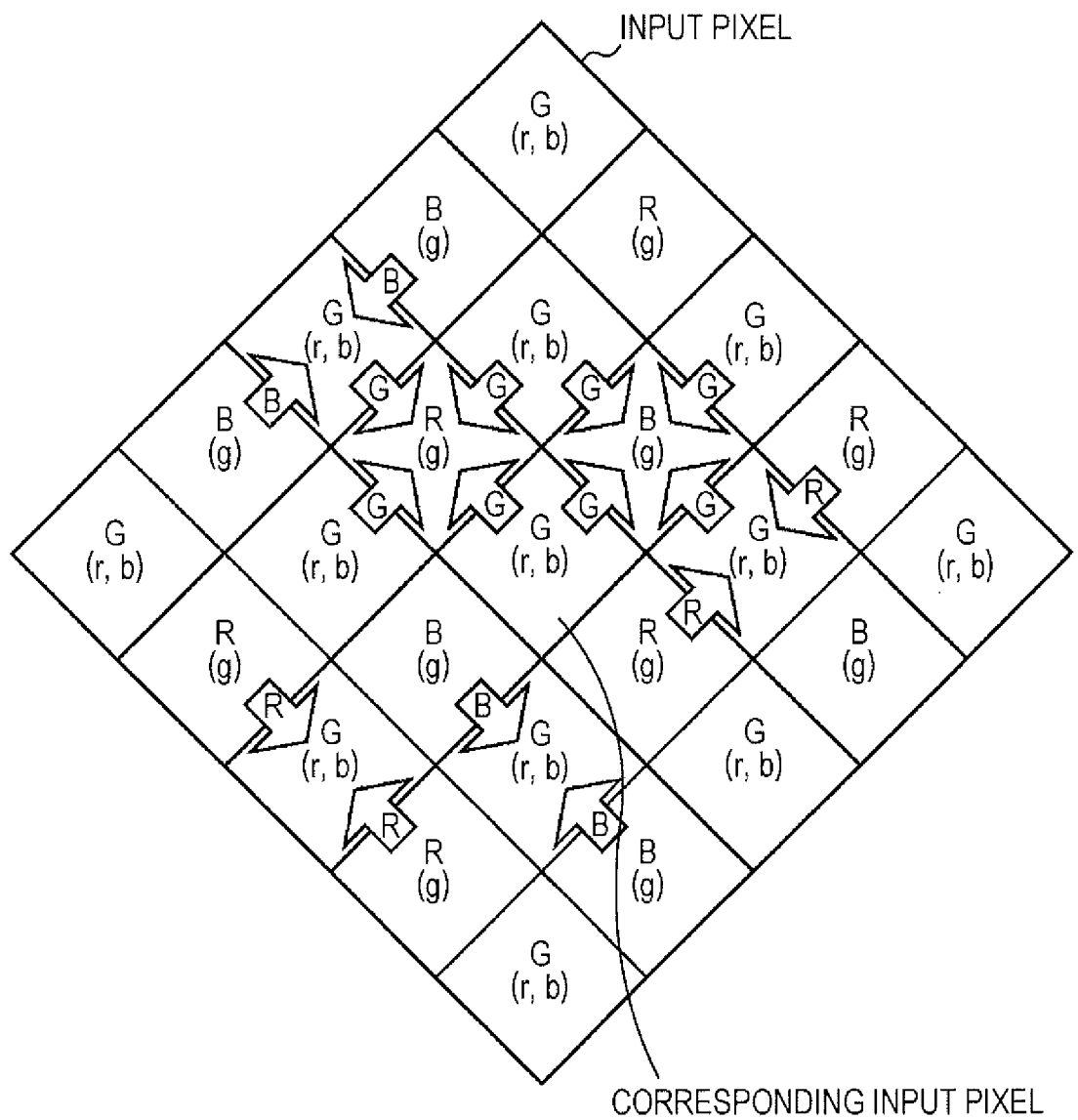
FIG. 22 is a diagram showing an example of a method of calculating a G representative value, an R representative value, and a B representative value performed by a representative value calculation unit.

Calculation of G Representative Value Dg, R Representative Value Dr, and B Representative Value Db FIG. 22 is a diagram showing an example of a method of calculating the G representative value Dg, the R representative value Dr, and the B representative value Db performed by the representative value calculation unit 202 of FIG. 20.

As described in FIG. 20, by setting the predetermined area containing the pixels as the prediction taps or the class taps for the target pixels, to the representative value calculation area for calculating the representative value, the representative value calculation unit 202 calculates the G representative value Dg, the R representative value Dr, and the B representative value Db using the input pixels in the representative value calculation area.

FIG. 22 shows an example of the representative value calculation area of the input image with the double Bayer array.

In FIG. 22, R, G, and B each represent the R input pixel, the G input pixel, and the B input pixel.

Herein, a direction of the angle of 45 degrees from the upper left portion to the lower right portion is called a lower right oblique direction, and a direction of the angle of 45 degrees from the lower left portion to the upper right portion is called an upper right oblique direction.

In FIG. 22, an area of the input image in which the lower right oblique direction x the upper right oblique direction is 5×5 pixels around the corresponding input pixel (G input pixel in FIG. 22) which is the input pixel closest to the target pixel, is the representative value calculation area for the target pixel.

As shown with outline arrows in FIG. 22, for the G input pixel in the representative value calculation area, the representative value calculation unit 202 acquires an average value of the R components as the pixel values of two R input pixels positioned on the upper left portion and the lower right portion of the G input pixel or two R input pixels positioned on the lower left portion and the upper right portion of the G input pixel, as an interpolated value r of the R component of the G input pixel.

For the G input pixel in the representative value calculation area, the representative value calculation unit 202 acquires an average value of the B components as the pixel values of two B input pixels positioned on the upper left portion and the lower right portion of the G input pixel or two B input pixels positioned on the lower left portion and the upper right portion of the G input pixel, as an interpolated value b of the B component of the G input pixel.

As shown with outline arrows in FIG. 22, for the R input pixel in the representative value calculation area, the representative value calculation unit 202 acquires an average value of the G components as the pixel values of four G input pixels positioned on the upper left portion, the upper right portion, the lower left portion, and the lower right portion of the R input pixel, as an interpolated value g of the G component of the R input pixel.

As shown with outline arrows in FIG. 22, for the B input pixel in the representative value calculation area, the representative value calculation unit 202 acquires an average value of the G components as the pixel values of four G input pixels positioned on the upper left portion, the upper right portion, the lower left portion, and the lower right portion of the B input pixel, as an interpolated value g of the G component of the B input pixel.

As described above, after acquiring the interpolated value r of the R component and the interpolated value b of the B component for the G input pixel, and acquiring the interpolated value g of the G component for the R input pixel and the B input pixel, the representative value calculation unit 202 acquires an average value of all of the R components of the G input pixels and the interpolated values g of the G components of the R input pixels and the B input pixels in the representative value calculation area, as the G representative value Dg.

In addition, the representative value calculation unit 202 acquires a difference r−G between the interpolated value r and the G component for all G input pixels in the representative value calculation area, and a difference R−g of the R component and the interpolated value g for all R input pixels in the representative value calculation area.

The representative value calculation unit 202 acquires an average value ave (r−G, R−g) of all differences r−G and the differences R−g acquired from the representative value calculation area, and acquires an added value ave (r−G, R−g)+Dg obtained by adding the G representative value Dg to the average value ave (r−G, R−g), as the R representative value Dr.

In the same manner as described above, the representative value calculation unit 202 acquires a difference b−G between the interpolated value b and the G component for all G input pixels in the representative value calculation area, and a difference B−g of the B component and the interpolated value g for all B input pixels in the representative value calculation area.

The representative value calculation unit 202 acquires an average value ave (b−G, B−g) of all differences b−G and the differences B−g acquired from the representative value calculation area, and acquires an added value ave (b−G, B−g)+Dg obtained by adding the G representative value Dg to the average value ave (b−G, B−g), as the B representative value Db.

The G representative value Dg acquired as described above represents an approximate level (value) of the G component in the representative value calculation area. In the same manner as described above, the R representative value Dr represents an approximate level (value) of the R component in the representative value calculation area, and the B representative value Db represents an approximate level (value) of the B component in the representative value calculation area.

Configuration Examples of Prediction Tap and Class Tap

Figure 23A:
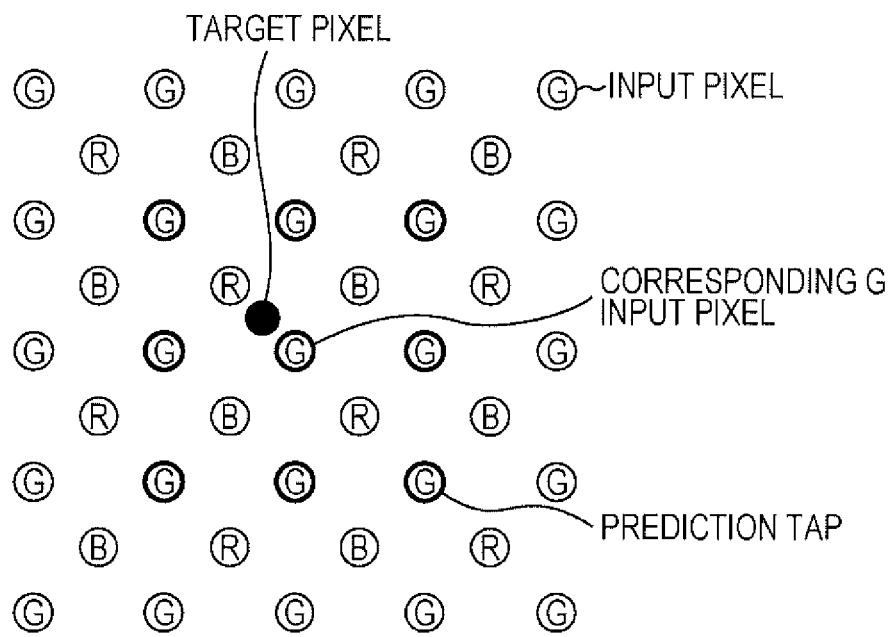
FIGS. 23A and 23B are diagrams showing configuration examples of prediction taps (prediction taps for G) selected by a tap selection unit.
Figure 23B:
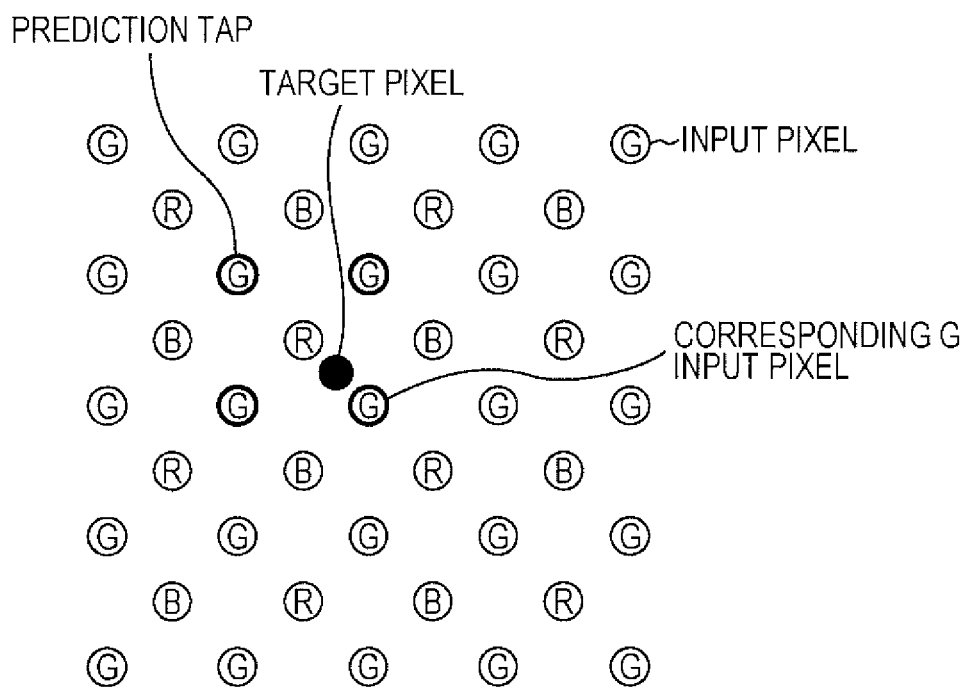

FIGS. 23A and 23B are diagrams showing configuration examples of the prediction tap (hereinafter, also referred to as prediction tap for G) selected by the tap selection unit 62G of FIG. 20.

In FIGS. 23A and 23B (same in the drawings which will be described later), white marks other than a black circle represent the input pixels which are the pixels of the input image, and bold white marks among the white marks other than the black circle represent input pixels which are the prediction taps or the class taps.

The black circle represents the target pixel among the output pixels which are the pixels of the output image.

Hereinafter, the output image is an image in which the output pixels exist in the position of the input pixel, in the position on a line of the input pixels adjacent to each other in the lower right oblique direction, and in the position on a line of the input pixels adjacent to each other in the upper right oblique direction.

In this case, in the image conversion device 200 of FIG. 20, the input image is converted into the output image in which the number of pixels in the lower right oblique direction and the upper right oblique direction is double of that of the input image.

The tap selection unit 62G (FIG. 20), for example, selects the input pixels which are set to the prediction taps for G for the target pixels, using the G input pixel (hereinafter, also referred to as corresponding G input pixel) which is closest to (the position of the input image corresponding to) the target pixels as a reference.

FIG. 23A shows a configuration example of the prediction taps for G in the normal mode.

Herein, in the same manner as in the image conversion device 60 of FIG. 8, in the image conversion device 200 of FIG. 20, there are the normal mode and the large dynamic range mode, as selection modes of the prediction taps.

In a case where the dynamic range information of the G component from the dynamic range detection unit 201 shows that the size of the local dynamic range of the G component (simple dynamic range of the G component or normalized dynamic range of the G component) for the target pixel is not large, the tap selection unit 62G sets the selection mode of the prediction taps to the normal mode and selects (the input pixels which are set to) the prediction taps.

In a case where the dynamic range information of the G component from the dynamic range detection unit 201 shows that the size of the local dynamic range of the G component for the target pixel is large, the tap selection unit 62G sets the selection mode of the prediction taps to the large dynamic range mode and selects the prediction taps.

In the normal mode, the tap selection unit 62G selects the input pixel which is the prediction tap in the normal mode.

That is, in the normal mode, for example, as shown in FIG. 23A, the G input pixels which are 9 pixels in total with 3×3 (horizontal×vertical) pixels having the corresponding G input pixel in center, can be selected as the prediction taps for G.

FIG. 23B shows a configuration example of the prediction taps for G in the large dynamic range mode.

In the large dynamic range mode, the tap selection unit 62G changes the number of the prediction taps to be smaller than the case of the normal mode, and selects the input pixels which are set to the prediction taps in the large dynamic range mode.

In FIG. 23B, the number of prediction taps for G in the large dynamic range mode is, for example, 4 pixels, which is less than 9 pixels, which is the number of prediction taps for G in the normal mode.

In the large dynamic range mode, as shown in FIG. 23B, using the corresponding G input pixel for the target pixel as a reference, the G input pixels with 2×2 (horizontal and vertical) pixels containing the G input pixels adjacent to the upper left, upper, and left portions of the corresponding G input pixel and the corresponding G input pixel, can be selected as the prediction taps for G.

As described above, in the case where the local dynamic range of the G component for the target pixel is not large, a certain number of G input pixels with 3×3 pixels around the corresponding G input pixel, for example, are selected as the prediction taps for G in the normal mode, and in the case where the local dynamic range of the G component for the target pixel is large, the number (number of taps) of G input pixels (having the area narrower and close to the corresponding G input pixel) smaller than the case of the normal mode, with 2×2 pixels around the corresponding G input pixel, are selected as the prediction taps for G in the large dynamic mode, and accordingly, it is possible to prevent degradation of the image quality due to the occurrence of ringing and to obtain the G output image having sharpness, in the same manner as that of the image conversion device 60 of FIG. 8.

Figure 24A:
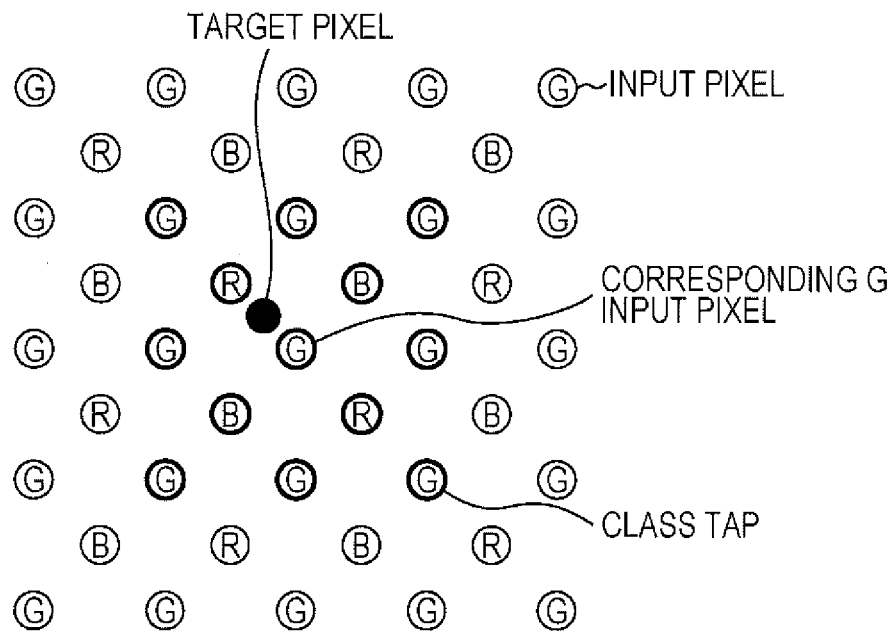
FIGS. 24A and 24B are diagrams showing configuration examples of class taps (prediction taps for G) selected by a tap selection unit.
Figure 24B:
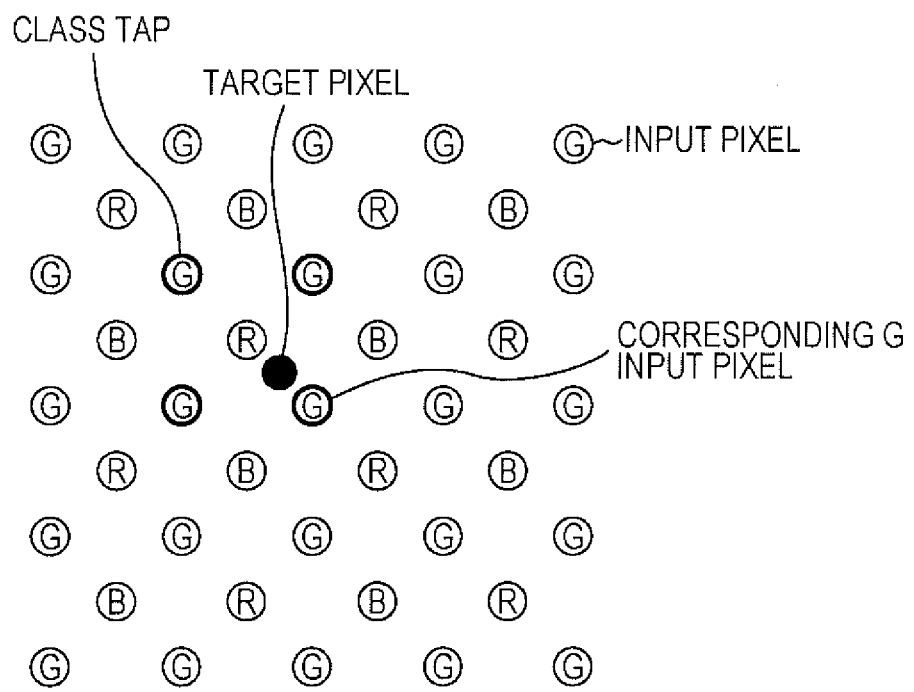

FIGS. 24A and 24B are diagrams showing configuration examples of the class taps (hereinafter, also referred to as class taps for G) selected by the tap selection unit 63G of FIG. 20.

In the same manner as the case of the tap selection unit 62G described in FIGS. 23A and 23B, the tap selection unit 63G sets the selection mode of the class taps to the normal mode or the large dynamic range mode based on the dynamic range information of the G component from the dynamic range detection unit 201, and selects the class taps.

FIG. 24A shows a configuration example of the class taps for G in the normal mode.

In the normal mode, for example, as shown in FIG. 24A, 13 input pixels in total with the G input pixels with 3×3 (horizontal×vertical) pixels having the corresponding G input pixel in center, and two R input pixels and two B input pixels existing in the area of the G input pixels with 3×3 pixels, can be selected as the class taps for G.

FIG. 24B shows a configuration example of the class taps for G in the large dynamic range mode.

In the large dynamic range mode, as shown in FIG. 24B, in the same manner as the case of the prediction taps for G of FIG. 23B, using the corresponding G input pixel as a reference, the G input pixels which are 4 pixels with 2×2 pixels containing the corresponding G input pixel and which are less than 13 pixels in a case of the normal mode, can be selected as the class taps for G.

Figure 25A:
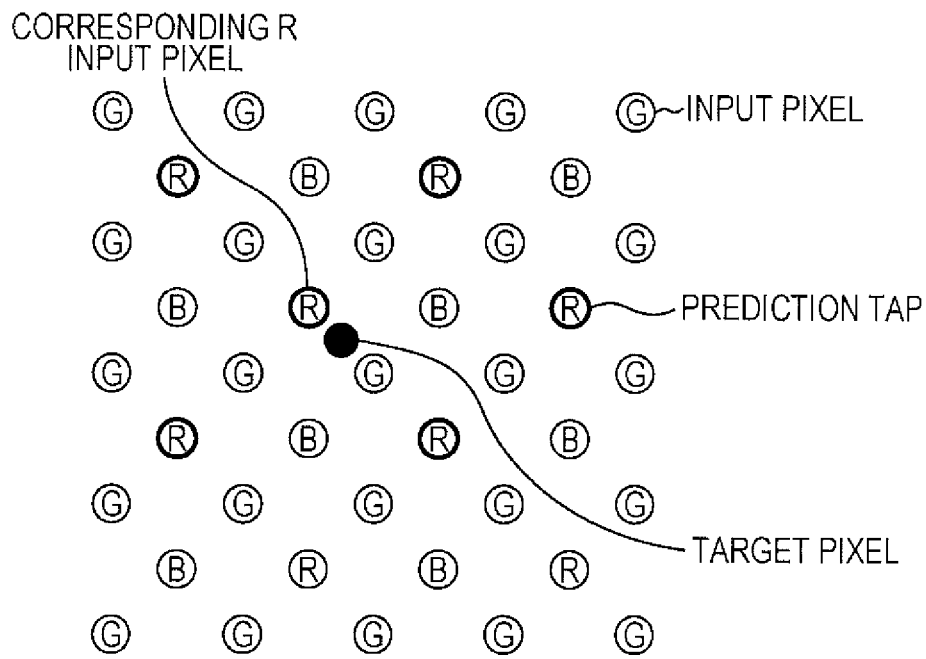
FIGS. 25A and 25B are diagrams showing configuration examples of prediction taps (prediction taps for R) selected by a tap selection unit.
Figure 25B:
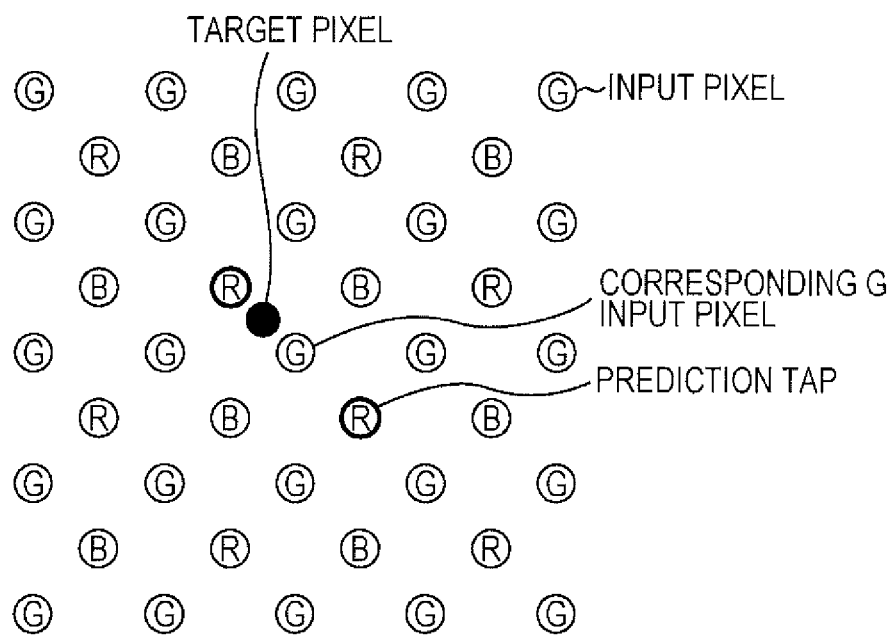

FIGS. 25A and 25B are diagrams showing configuration examples of the prediction tap (hereinafter, also referred to as prediction tap for R) selected by the tap selection unit 62R of FIG. 20.

The tap selection unit 62R (FIG. 20), for example, selects the input pixels which are set to the prediction taps for R for the target pixels, using the R input pixel (hereinafter, also referred to as corresponding R input pixel) which is closest to (the position of the input image corresponding to) the target pixels or the corresponding G input pixel, as a reference.

FIG. 25A shows a configuration example of the prediction taps for R in the normal mode.

In a case where the dynamic range information of the R component from the dynamic range detection unit 201 shows that the size of the local dynamic range of the R component (simple dynamic range of the R component or normalized dynamic range of the R component) for target pixel is not large, the tap selection unit 62R sets the selection mode of the prediction taps to the normal mode and selects (the input pixels which are set to) the prediction taps.

In a case where the dynamic range information of the R component from the dynamic range detection unit 201 shows that the size of the local dynamic range of the R component for target pixel is large, the tap selection unit 62R sets the selection mode of the prediction taps to the large dynamic range mode and selects the prediction taps.

In the normal mode, the tap selection unit 62R selects the input pixel which is the prediction tap in the normal mode.

That is, in the normal mode, for example, as shown in FIG. 25A, the 5 R input pixels in total containing 4 R input pixels adjacent to upper left, upper right, lower left, and lower right portions of the corresponding R input pixel and 1 R input pixel adjacent to the right portion of the corresponding R input pixel, can be selected as the prediction taps for R.

FIG. 25B shows a configuration example of the prediction taps for R in the large dynamic range mode.

In the large dynamic range mode, the tap selection unit 62R changes the number of the prediction taps to be smaller than the case of the normal mode, and selects the input pixels which are set to the prediction taps in the large dynamic range mode.

In FIG. 25B, the number of prediction taps for R in the large dynamic range mode is, for example, 2 pixels, which is less than 5 pixels, which is the number of prediction taps for R in the normal mode.

That is, in the large dynamic range mode, as shown in FIG. 25B, for example, using the corresponding G input pixel for the target pixel as a reference, the R input pixels adjacent to the upper left and lower right portions of the corresponding G input pixel can be selected as the prediction taps for R.

As described above, in the case where the local dynamic range of the R component for the target pixel is not large, a certain number of R input pixels with 5 pixels around the corresponding R input pixel, for example, are selected as the prediction taps for R in the normal mode, and in the case where the local dynamic range of the R component for the target pixel is large, the number (number of taps) of R input pixels (having the area narrower and close to the corresponding G input pixel) smaller than the case of the normal mode, with 2 pixels around the corresponding G input pixel, are selected as the prediction taps for R in the large dynamic range mode, and accordingly, it is possible to prevent degradation of the image quality due to the occurrence of ringing and to obtain the R output image having sharpness, in the same manner as the image conversion device 60 of FIG. 8.

Figure 26A:
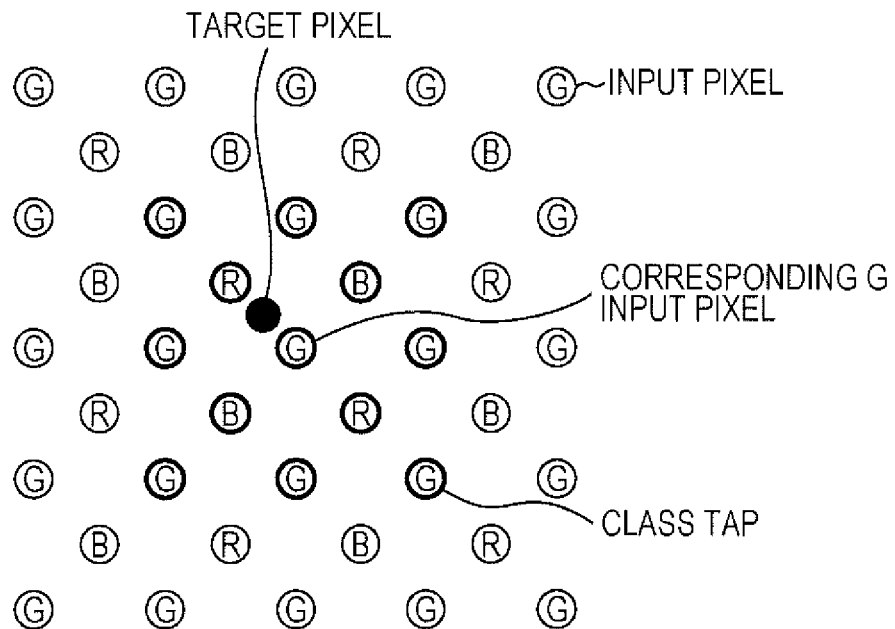
FIGS. 26A and 26B are diagrams showing configuration examples of class taps (prediction taps for R) selected by a tap selection unit.
Figure 26B:
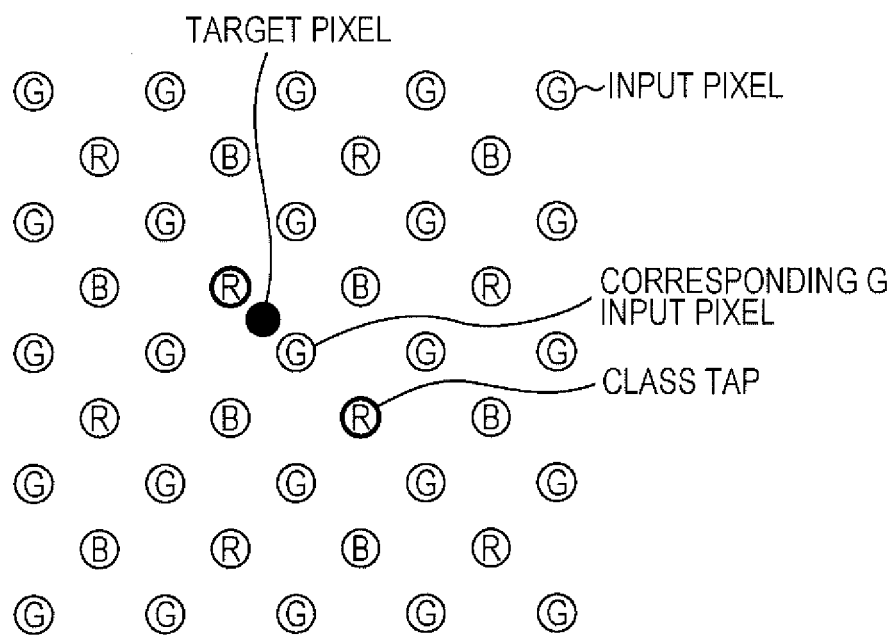

FIGS. 26A and 26B are diagrams showing configuration examples of the class taps (hereinafter, also referred to as class taps for R) selected by the tap selection unit 63R of FIG. 20.

In the same manner as the case of the tap selection unit 62R described in FIGS. 25A and 25B, the tap selection unit 63R sets the selection mode of the class taps to the normal mode or the large dynamic range mode based on the dynamic range information of the R component from the dynamic range detection unit 201, and selects the class taps.

FIG. 26A shows a configuration example of the class taps for R in the normal mode.

In the normal mode, for example, as shown in FIG. 26A, 13 input pixels in total with the G input pixels with 3×3 pixels (horizontal×vertical) having the corresponding G input pixel in center, and two R input pixels and two B input pixels existing in the area of the G input pixels with 3×3 pixels, can be selected as the class taps for R.

FIG. 26B shows a configuration example of the class taps for R in the large dynamic range mode.

In the large dynamic range mode, as shown in FIG. 26B, in the same manner as the case of the prediction taps for R of FIG. 25B, using the corresponding G input pixel as a reference, the R input pixels with 2 pixels adjacent to the upper left and lower right portions of the corresponding G input pixel, which are less than 13 pixels in a case of the normal mode, can be selected as the class taps for R.

Figure 27A:
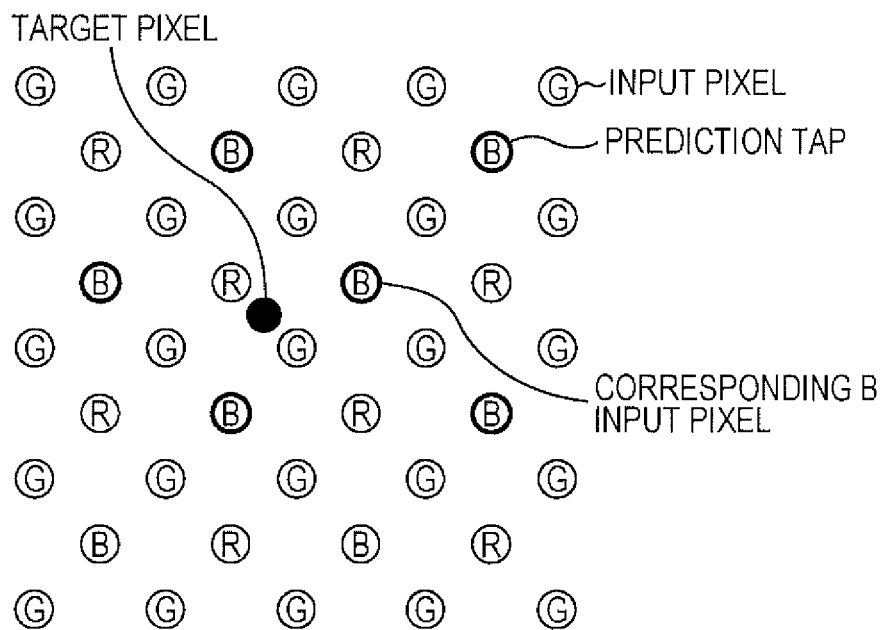
FIGS. 27A and 27B are diagrams showing configuration examples of prediction taps (prediction taps for B) selected by a tap selection unit.
Figure 27B:
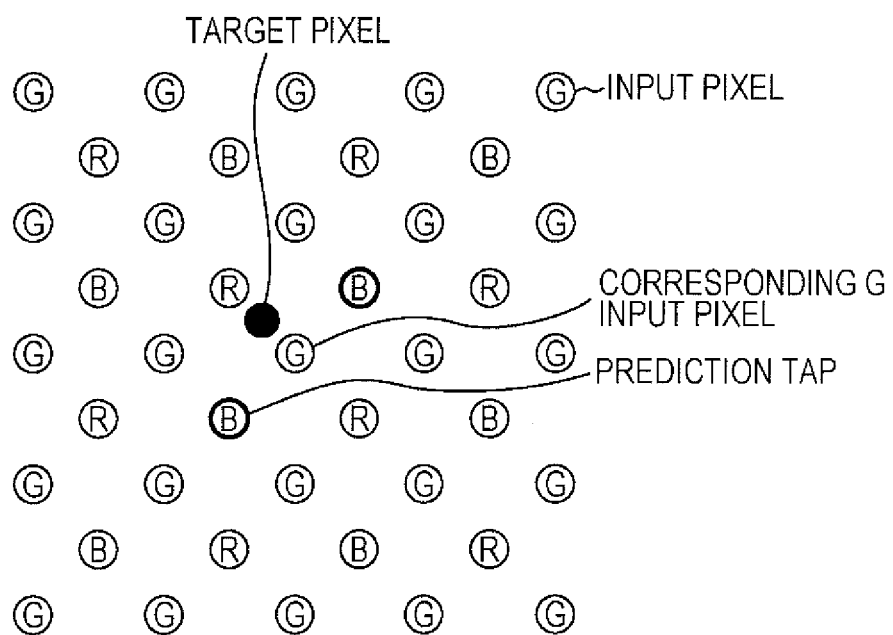

FIGS. 27A and 27B are diagrams showing configuration examples of the prediction tap (hereinafter, also referred to as prediction tap for B) selected by the tap selection unit 62B of FIG. 20.

The tap selection unit 62B (FIG. 20), for example, selects the input pixels which are set to the prediction taps for B for the target pixels, using the B input pixel (hereinafter, also referred to as corresponding B input pixel) which is closest to (the position of the input image corresponding to) the target pixels or the corresponding G input pixel, as a reference.

FIG. 27A shows a configuration example of the prediction taps for B in the normal mode.

In a case where the dynamic range information of the B component from the dynamic range detection unit 201 shows that the size of the local dynamic range of the B component (simple dynamic range of the B component or normalized dynamic range of the B component) for the target pixel is not large, the tap selection unit 62B sets the selection mode of the prediction taps to the normal mode and selects (the input pixels which are set to) the prediction taps.

In a case where the dynamic range information of the B component from the dynamic range detection unit 201 shows that the size of the local dynamic range of the B component for target pixel is large, the tap selection unit 62B sets the selection mode of the prediction taps to the large dynamic range mode and selects the prediction taps.

In the normal mode, the tap selection unit 62B selects the input pixel which is the prediction tap in the normal mode.

That is, in the normal mode, for example, as shown in FIG. 27A, the 5 B input pixels in total containing 4 B input pixels adjacent to upper left, upper right, lower left, and lower right portions of the corresponding B input pixel and 1 B input pixel adjacent to the left portion of the corresponding B input pixel, can be selected as the prediction taps for B.

FIG. 27B shows a configuration example of the prediction taps for B in the large dynamic range mode.

In the large dynamic range mode, the tap selection unit 62B changes the number of the prediction taps to be smaller than the case of the normal mode, and selects the input pixels which are set to the prediction taps in the large dynamic range mode.

In FIG. 27B, the number of prediction taps for B in the large dynamic range mode is, for example, 2 pixels, which is less than 5 pixels, which is the number of prediction taps for B in the normal mode.

That is, in the large dynamic range mode, as shown in FIG. 27B, for example, using the corresponding G input pixel for the target pixel as a reference, the B input pixels adjacent to the upper right and lower left portions of the corresponding G input pixel can be selected as the prediction taps for B.

As described above, in the case where the local dynamic range of the B component for the target pixel is not large, a certain number of B input pixels with 5 pixels around the corresponding B input pixel, for example, are selected as the prediction taps for B in the normal mode, and in the case where the local dynamic range of the B component for the target pixel is large, the number (number of taps) of B input pixels (having the area narrower and close to the corresponding G input pixel) smaller than the case of the normal mode, with 2 pixels around the corresponding G input pixel, are selected as the prediction taps for B in the large dynamic range mode, and accordingly, it is possible to prevent degradation of the image quality due to the occurrence of ringing and to obtain the B output image having sharpness, in the same manner as the image conversion device 60 of FIG. 8.

Figure 28A:
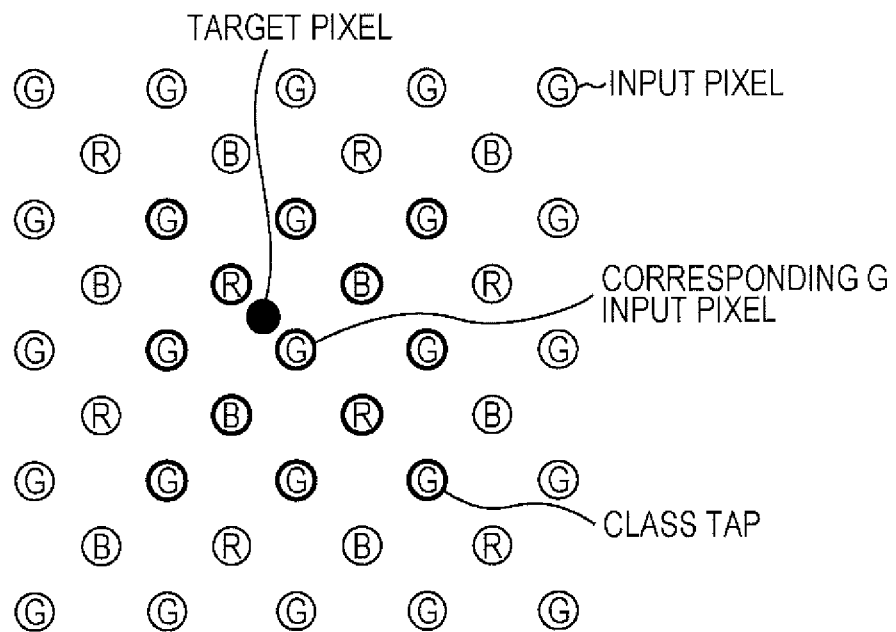
FIGS. 28A and 28B are diagrams showing configuration examples of class taps (prediction taps for B) selected by a tap selection unit.
Figure 28B:
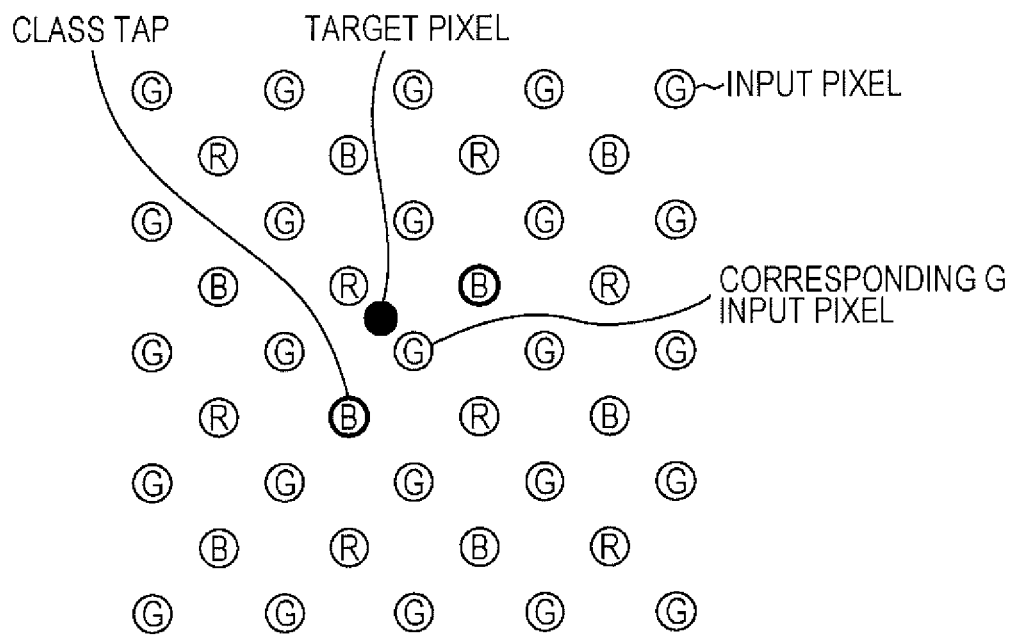

FIGS. 28A and 28B are diagrams showing configuration examples of the class taps (hereinafter, also referred to as class taps for B) selected by the tap selection unit 63B of FIG. 20.

In the same manner as the case of the tap selection unit 62B described in FIGS. 27A and 27B, the tap selection unit 63B sets the selection mode of the class taps to the normal mode or the large dynamic range mode based on the dynamic range information of the B component from the dynamic range detection unit 201, and selects the class taps.

FIG. 28A shows a configuration example of the class taps for B in the normal mode.

In the normal mode, for example, as shown in FIG. 28A, 13 input pixels in total with the G input pixels with 3×3 (horizontal×vertical) pixels having the corresponding G input pixel in center, and two B input pixels and two R input pixels existing in the area of the G input pixels with 3×3 pixels, can be selected as the class taps for B.

FIG. 28B shows a configuration example of the class taps for B in the large dynamic range mode.

In the large dynamic range mode, as shown in FIG. 28B, in the same manner as the case of the prediction taps for B of FIG. 27B, using the corresponding G input pixel as a reference, the B input pixels with 2 pixels adjacent to the upper left and lower right portions of the corresponding G input pixel, which are less than 13 pixels in a case of the normal mode, can be selected as the class taps for B.

As shown in FIGS. 23A to 28B, in a case of configuring the prediction taps and the class taps, only G input pixels are included in the prediction taps for G of FIGS. 23A and 23B, and the R input pixels and the B input pixels are not included therein. In addition, only R input pixels are included in the prediction taps for R of FIGS. 25A and 25B, and the G input pixels and the B input pixels are not included therein, and only B input pixels are included in the prediction taps for B of FIGS. 25A and 25B, and the G input pixels and the R input pixels are not included therein.

In this case, as described in FIG. 20, the image conversion device 200 can be configured without providing the level conversion unit 206G which performs level conversion of the prediction taps for G, the level conversion unit 206R which performs level conversion of the prediction taps for R, and the level conversion unit 206B which performs level conversion of the prediction taps for B.

Configuration Example of Classification unit 64G

FIG. 29 is a block diagram showing a configuration example of the classification unit 64G of FIG. 20.

In FIG. 29, the parts corresponding to the classification unit 64 of FIG. 13 are denoted with the same reference numerals, and the description thereof will be appropriately omitted hereinafter.

The classification units 64R and 64B of FIG. 20 are configured in the same manner as the classification unit 64G.

In FIG. 29, the classification unit 64G includes the ADRC processing unit 91 in common with the classification unit 64 of FIG. 13. However, the classification unit 64G is different from the classification unit 64 of FIG. 13, in a point that a threshold value processing unit 211 is newly provided and a class code generation unit 212 is provided instead of the class code generation unit 92.

The grayscale conversion value of the input image is supplied to the threshold value processing unit 211 from the grayscale conversion unit 204.

The threshold value processing unit 211 performs a threshold value process of the grayscale conversion value from the grayscale conversion unit 204, and accordingly supplies grayscale conversion value information showing the magnitude of the grayscale conversion value to the class code generation unit 212.

That is, the threshold value processing unit 211, for example, compares the grayscale conversion value from the grayscale conversion unit 204 and a predetermined threshold value, and supplies 1 bit showing whether or not the grayscale conversion value is larger than the predetermined threshold value, to the class code generation unit 212 as the grayscale conversion value information.

The threshold value processing unit 211 can compare the grayscale conversion value and a plurality of threshold values, respectively, and supply information showing the compared result thereof, that is, a plurality of bits showing (the magnitude of) the grayscale conversion value to the class code generation unit 212 as the grayscale conversion value information.

In addition to the grayscale conversion value information supplied from the threshold value processing unit 211, the ADRC code obtained by performing the ADRC of the class taps (for G) is also supplied to the class code generation unit 212 from the ADRC processing unit 91.

Herein, the dynamic range information of the G component is supplied to the ADRC processing unit 91 from the dynamic range detection unit 201 and the class taps for G are supplied thereto from the tap selection unit 63G through the level conversion unit 205G.

As described in FIG. 13, in a case where the dynamic range information (of the G component) shows that the local dynamic range (of the G component) for the target pixel is not large, the ADRC processing unit 91 sets the classification mode to the normal mode and performs the 1-bit ADRC in which the number of bits of the ADRC is the predetermined number of bits, for example, 1 bit.

In a case where the dynamic range information shows that the local dynamic range for the target pixel is large, the ADRC processing unit 91 sets the classification mode to the large dynamic range mode and performs the ADRC (for example, the 4-bit ADRC) in which the number of bits is larger than that in the normal mode.

In this case, when the 1-bit ADRC is performed for the class taps for G with 13 pixels shown in FIG. 24A as targets, for example, in the normal mode, the ADRC code having 13 bits is obtained.

As described above, in the normal mode, in a case where the ADRC code having 13 bits is obtained, in the ADRC performed for the class taps for G with 4 pixels shown in FIG. 24B as a target in the large dynamic range mode, the 4-bit ADRC is performed for the corresponding input pixel (corresponding G input pixel) among the input pixels as the class taps with 4 pixels shown in FIG. 24B, for example, and the 3-bit ADRC can be performed for the remaining input pixels with 3 pixels.

In this case, even in the large dynamic range mode, since the ADRC code having 13 bits (=4+3+3+3 bits) can be obtained in the same manner as in the normal mode, a memory space for storing the tap coefficients used in the normal mode and a memory space for storing the tap coefficients used in the large dynamic range mode can coincide with each other.

As shown in FIGS. 26A and 26B or FIGS. 28A and 28B, in a case of configuring the class taps in the normal mode with 13 input pixels, and the class taps in the large dynamic range mode with 2 input pixels which are fewer than 13 pixels in the normal mode, when performing the 1-bit ADRC in the normal mode, in the large dynamic range mode, 7-bit ADRC is performed for one of 2 input pixels as the class taps, for example, and 6-bit ADRC is performed for the other thereof, and therefore, the memory space for storing the tap coefficients used in the normal mode and the memory space for storing the tap coefficients used in the large dynamic range mode can coincide with each other.

As described above, in addition to the grayscale conversion value information supplied from the threshold value processing unit 211 and the ADRC code obtained by performing the ADRC for the class taps (for G) supplied from the ADRC processing unit 91, the dynamic range information (for G) is also supplied to the class code generation unit 212 from the dynamic range detection unit 201 (FIG. 20).

The class code generation unit 212 generates a code obtained by adding the dynamic range information from the dynamic range detection unit 201 and the grayscale conversion value information from the threshold value processing unit 211 to the ADRC code from the ADRC processing unit 91, as the class code showing the class of the target pixel, and supplies the code to the coefficient output unit 65G (FIG. 20).

Herein, as described in FIG. 20, the grayscale conversion value supplied to the threshold value processing unit 211 from the grayscale conversion unit 204 (FIG. 20) is a value obtained by performing the logarithm operation of (the average value of the G component as the pixel value of only the G input pixel having high sensitivity by a human in the corresponding position pixel value calculation area of) the input pixel, as the grayscale conversion.

By performing the classification for generating the class code using (the grayscale conversion value information showing magnitude of) the grayscale conversion value described above, it is possible to suppress degradation of the image quality of the output image due to optical shot noise generated by the image sensor 52 (FIG. 7).

That is, in the classification for generating the class code without using the grayscale conversion value, when noise components of the optical shot noise is included in the input image, the output image obtained by performing the image conversion process of the input image is an image having an emphasized high frequency and sharpness, but is an image having an amplified noise component of the optical shot noise, at the same time.

Meanwhile, the optical shot noise generated by the image sensor 52 has a property of being increased in proportion to the logarithm of light intensity input to the image sensor 52.

Herein, by performing the classification using the grayscale conversion value obtained by the logarithm operation of the input image, the classification of the target pixel is performed so as to be finely adapted to the property of the optical shot noise, and the prediction operation is performed using the tap coefficients of the class of the target pixel obtained by such classification.

As a result, in the image conversion device 200, it is possible to obtain the output image in which the degradation of the image quality due to the optical shot noise generated by the image sensor 52 (FIG. 7) (in addition, degradation of the image quality depending on luminance of the pixels) is suppressed.

As described above, according to the image conversion device 200, the input image which is the single plate-type image can be developed (subjected to the demosaic process) into the output image including the G output image, the R output image, and the B output image in which the degradation of the image quality due to the ringing or the optical shot noise is suppressed and high image quality with sharpness, that is, the output image with high image quality including the G component, the R component, and the B component as the pixel values for each pixel, is obtained.

In the classification unit 64R, the dynamic range information of the R component is supplied to the ADRC processing unit 91 from the dynamic range detection unit 201 and the class taps for R are supplied thereto from the tap selection unit 63R through the level conversion unit 205R. In addition, the dynamic range information of the R component is supplied to the class code generation unit 212 from the dynamic range detection unit 201, and hereinafter, the same process as the case of the classification unit 64G described above is performed.

In the classification unit 64B, the dynamic range information of the B component is supplied to the ADRC processing unit 91 from the dynamic range detection unit 201 and the class taps for B are supplied thereto from the tap selection unit 63B through the level conversion unit 205B. In addition, the dynamic range information of the B component is supplied to the class code generation unit 212 from the dynamic range detection unit 201, and hereinafter, the same process as the case of the classification unit 64G described above is performed.

Image Conversion Process Performed by Image Conversion Device 200

Figure 30:
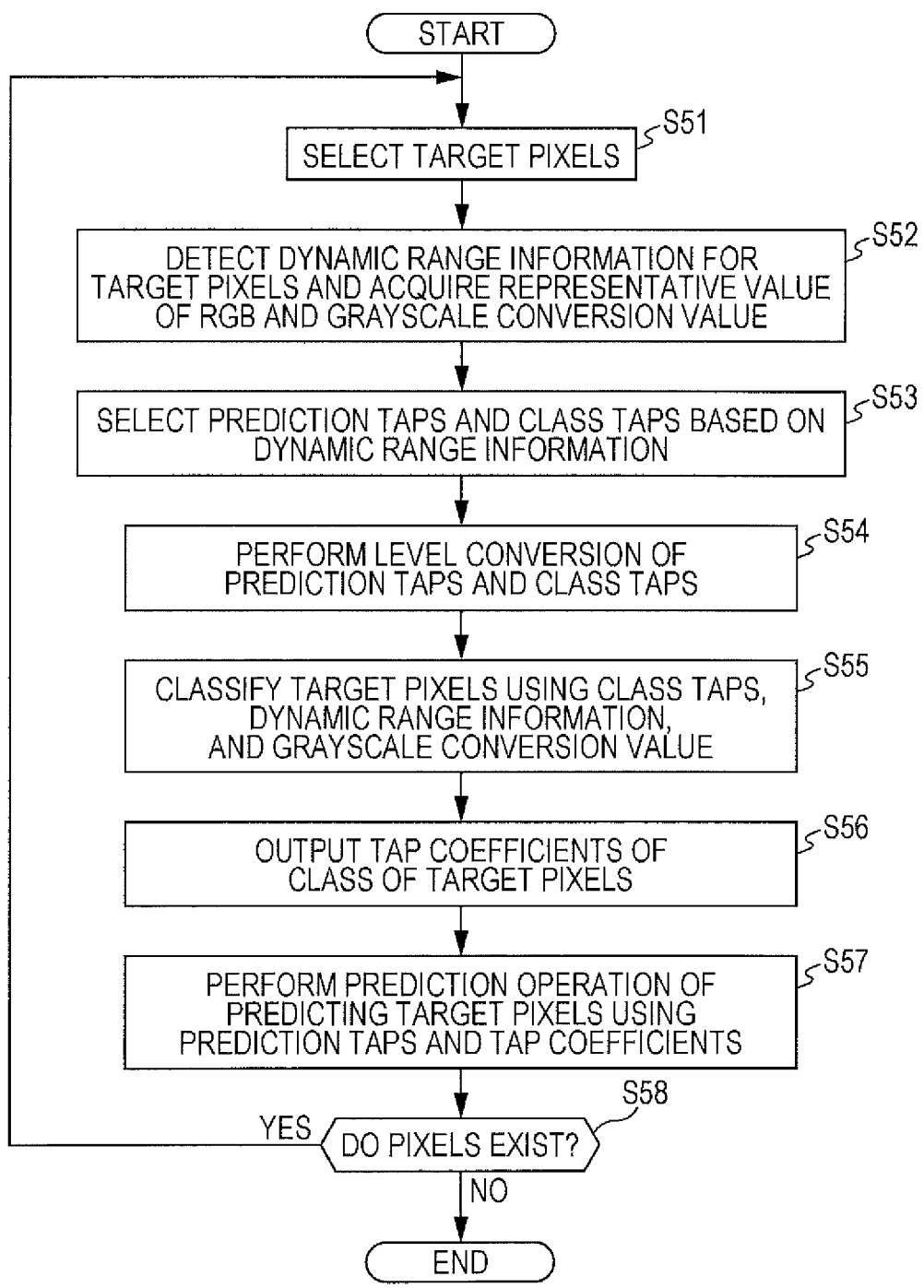
FIG. 30 is a flowchart illustrating an example of an image conversion process performed by an image conversion device.

FIG. 30 is a flowchart illustrating an example of the image conversion process performed by the image conversion device 200 of FIG. 20.

Hereinafter, a variable Q is introduced as a variable showing any or all of R, G, and B, and the R, G, and B are represented using the variable Q. For example, each or all of the tap selection units 62G, 62R, and 62B are represented as the tap selection unit 62Q.

In Step S51, the target pixel selection unit 11 selects one pixel which is not yet a target pixel, from the pixels (output pixels) configuring the output image with respect to the input image input to the image conversion device 200, as a target pixel, and the process proceeds to Step S52.

In Step S52, in the same manner as the dynamic range detection unit 61 of FIG. 8, the dynamic range detection unit 201 detects the dynamic range information of the Q component for the target pixel, using the input image input thereto, and supplies the dynamic range information to the tap selection units 62Q and 63Q and the classification unit 64Q.

In addition, in Step S52, the representative value calculation unit 202 calculates the Q representative value (the G representative value, the R representative value, and the B representative value), as described in FIG. 22, using the input image supplied thereto, for the target pixel, and supplies the Q representative value to the level conversion units 205Q and 206Q.

In Step S52, the average value calculation unit 203 acquires the average value of the pixel value (R component) of the plurality of R input pixels close to the position of the input image corresponding to the target pixel, as the corresponding position pixel value, using the input image supplied thereto, and supplies the average value to the grayscale conversion unit 204.

The grayscale conversion unit 204 performs the logarithm operation of the corresponding position pixel value from the average value calculation unit 203, as the grayscale conversion of the input image, and supplies the grayscale conversion value obtained as a result thereof to the classification units 64Q, and the process proceeds from Step S52 to Step S53.

In Step S53, the tap selection unit 62Q selects the input pixel which is the prediction tap for the target pixel, from the input image supplied thereto based on the dynamic range information of the Q component from the dynamic range detection unit 201, as described in FIGS. 23A and 23B, 25A and 25B and 27A and 27B, and supplies the pixel to the level conversion unit 206Q.

In addition, in Step S53, the tap selection unit 63Q selects the input pixel which is the class tap for the target pixel, from the input image supplied thereto based on the dynamic range information of the Q component from the dynamic range detection unit 201, as described in FIGS. 24A and 24B, 26A and 26B, and 28A and 28B, and supplies the pixel to the level conversion unit 205Q, and the process proceeds to Step S54.

In Step S54, the level conversion unit 205Q performs the level conversion of the class tap from the tap selection unit 63Q and supplies the class tap after the level conversion to the classification unit 64Q.

In addition, in Step S54, the level conversion unit 206Q performs the level conversion of the prediction tap from the tap selection unit 62Q and supplies the prediction tap after the level conversion to the prediction operation unit 66Q, and the process proceeds to Step S55.

In Step S55, the classification unit 64Q classifies (the Q component of) the target pixel, as described in FIG. 29, using the dynamic range information, the grayscale conversion value from the grayscale conversion unit 204, and the class tap from the level conversion unit 205Q based on the dynamic range information of the Q component from the dynamic range detection unit 201.

In addition, the classification unit 64Q outputs the class code showing the class of the target pixel obtained as a result of the classification thereof, to the coefficient output unit 65Q, and the process proceeds from Step S55 to Step S56.

In Step S56, the coefficient output unit 65Q acquires and outputs the tap coefficient stored in the address corresponding to the class code (showing the class of the Q component of the target pixel) from the classification unit 64Q. In addition, in Step S56, the prediction operation unit 66Q acquires the tap coefficient output by the coefficient output unit 65Q, and the process proceeds to Step S57.

In Step S57, the prediction operation unit 66Q performs prediction operation of the formula (1) using the prediction tap output by the level conversion unit 206Q and the tap coefficient acquired from the coefficient output unit 65Q. Accordingly, the prediction operation unit 66Q acquires and outputs the Q component as the pixel value of the target pixel, and the process proceeds to Step S58.

In Step S58, the target pixel selection unit 11 determines whether or not there is the output pixel which is not yet the target pixel. In a case where it is determined that there is the output pixel which is not yet the target pixel, in the Step S58, the process returns to Step S51, and then the processes subsequent thereto are repeated in the same manner as described above.

In a case where it is determined there is no output pixel which is not yet the target pixel, in the Step S58, the process ends.

Configuration Example of Learning Device

Figure 31:
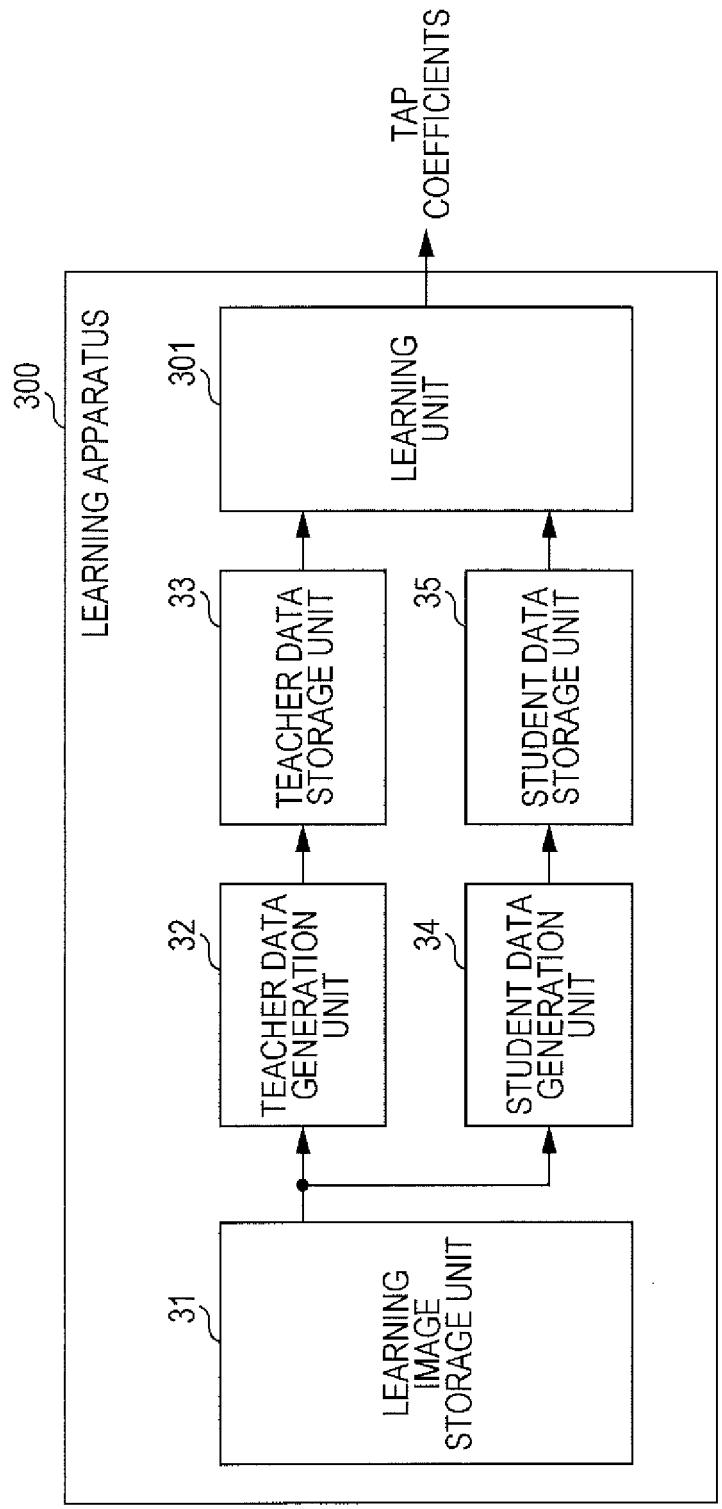
FIG. 31 is a block diagram showing a configuration example of a learning device which performs learning for acquiring a tap coefficient to be stored in coefficient output units.

FIG. 31 is a block diagram showing a configuration example of a learning device which performs learning for acquiring the tap coefficients stored in the coefficient output unit 65Q (65G, 65R, and 65B) of FIG. 20.

In a learning device 300 of FIG. 31, the parts corresponding to the learning device 100 of FIG. 16 are denoted with the same reference numerals, and the description thereof will be appropriately omitted hereinafter.

The learning device 300 of FIG. 31 includes the learning image storage unit 31 to the student data storage unit 35, in common with the learning device 100 of FIG. 16. However, the learning device 300 of FIG. 31 is different from the learning device 100 of FIG. 16, in a point of including a learning unit 301 instead of the learning unit 101.

In FIG. 31, the learning image storage unit 31 stores a high quality image having high resolution including three color components of the G component, the R component, and the B component, for each pixel and corresponding to the output image obtained by the image conversion device 200 of FIG. 20, for example.

The teacher data generation unit 32 supplies the image for learning stored in the learning image storage unit 31, to the teacher data storage unit 33 as the teacher image as it is, to be stored therein.

The student data generation unit 34 generates the input image which is the single plate-type image, that is, a student image having lower resolution and sharpness than those of the teacher data, corresponding to the image obtained by the image sensor 52, in the embodiment, by thinning and filtering the image for learning stored in the learning image storage unit 31 and further thinning two color components among the three color components for each pixel, and supplies the student data to the student data storage unit 35 to be stored therein.

The learning unit 301 acquires the tap coefficient for each class by formulating and solving the normal equation of the formula (8) for each class, using the teacher image and the student image described above.

Configuration Example of Learning Unit 301

Figure 32:
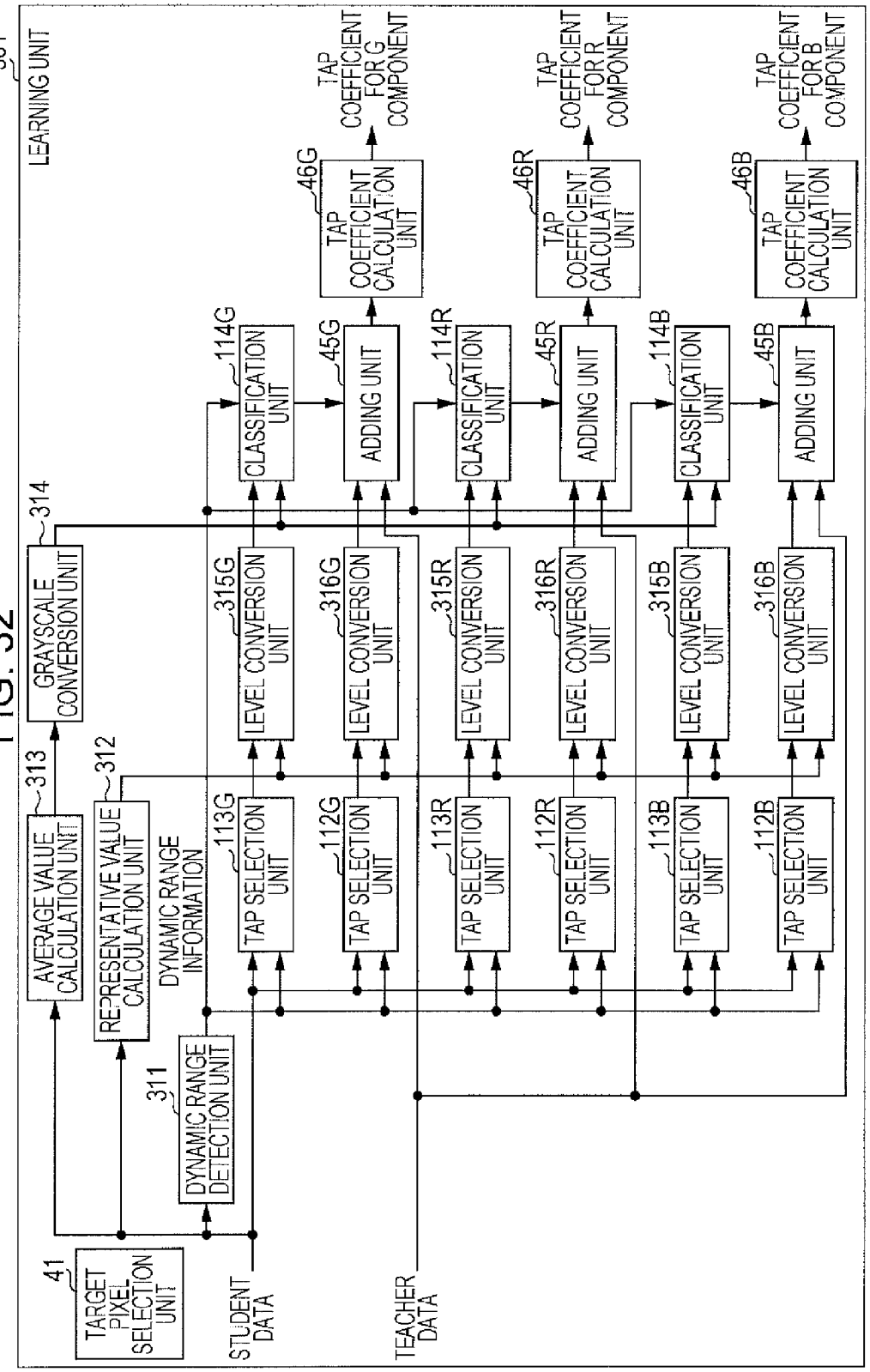
FIG. 32 is a block diagram showing a configuration example of a learning unit.

FIG. 32 is a block diagram showing a configuration example of the learning unit 301 of FIG. 31.

In the drawing, the parts corresponding to the learning unit 101 of FIG. 17 are denoted with the same reference numerals, and the description thereof will be appropriately omitted hereinafter.

In FIG. 32, the teacher image stored in the teacher data storage unit 33 (FIG. 31) is supplied to the adding unit 45Q.

In addition, the student image stored in the student data storage unit 35 (FIG. 31) is supplied to the tap selection units 112Q and 113Q, a dynamic range detection unit 311, a representative value calculation unit 312, and an average value calculation unit 313.

In addition to the teacher image supplied from the teacher data storage unit 33, (the class code showing) the class of (the Q component of) the target pixel is supplied to the adding unit 45Q from the classification unit 114Q and the prediction tap for Q for the target pixel is also supplied thereto from a level conversion unit 316Q.

In the same manner as that of the adding unit 45 of FIG. 17, the adding unit 45Q performs adding with the target pixel and (the pixel value) of the pixel of the student image configuring the prediction tap for the target pixel from the level conversion unit 316Q as targets, among the teacher image from the teacher data storage unit 33, for each class code supplied from the classification unit 114Q.

In addition, in the same manner as the adding unit 45 of FIG. 17, the adding unit 45Q performs the addition described above by setting all pixels of the teacher image stored in the teacher data storage unit 33 (FIG. 3) as the target pixel, to formulate the normal equation shown in the formula (8) for each class, and then the normal equation is supplied to a tap coefficient calculation unit 46Q.

In the same manner as that of the tap coefficient calculation unit 46 of FIG. 17, the tap coefficient calculation unit 46Q acquires and outputs the tap coefficient for the Q component for each class, that is, the tap coefficient used for predicting the Q output image (the G output image, the R output image, and the B output image) having the Q component as the pixel value, by solving the normal equation for each class supplied from the adding unit 45Q.

In the same manner as the tap selection unit 62Q of FIG. 20, the tap selection unit 112Q selects (the pixel value of) the pixel which is set to the prediction tap for Q from the student image for the target pixel, and supplies the pixel to the level conversion unit 316Q.

The dynamic range information of the Q component is supplied to the tap selection unit 112Q from the dynamic range detection unit 311.

In the same manner as the tap selection unit 62Q of FIG. 20, the tap selection unit 112Q changes the number of taps which is the number of pixels which are set to the prediction taps, based on the dynamic range information of the Q component from the dynamic range detection unit 311.

In the same manner as the tap selection unit 63Q of FIG. 20, the tap selection unit 113Q selects (the pixel value of) the pixel which is set to the class tap for Q from the student image for the target pixel, and supplies the pixel to a level conversion unit 315Q.

The dynamic range information of the Q component is supplied to the tap selection unit 113Q from the dynamic range detection unit 311.

In the same manner as the tap selection unit 62Q of FIG. 20, the tap selection unit 113Q changes the number of taps which is the number of pixels which are set to the class taps, based on the dynamic range information of the Q component from the dynamic range detection unit 311.

The dynamic range information of the Q component is supplied to the classification unit 114Q from the dynamic range detection unit 311, and the class tap for Q is supplied thereto from the level conversion unit 315Q. In addition, the grayscale conversion value is supplied to the classification unit 114Q from a grayscale conversion unit 314.

The classification unit 114Q performs the same classification as the classification unit 64Q of FIG. 20, using the dynamic range information of the Q component, the class taps for Q, and the grayscale conversion value, and supplies the class code corresponding to the class of (the Q component of) the target pixel obtained as a result thereof to the adding unit 45Q.

In the same manner as the classification unit 64Q of FIG. 20, the classification unit 114Q changes the number of bits of the ADRC as the predetermined regulation employed for the classification, based on the dynamic range information of the Q component from the dynamic range detection unit 311.

In the same manner as the dynamic range detection unit 201 of FIG. 20, the dynamic range detection unit 311 detects the dynamic range information of the Q component, for the target pixel selected from the pixels of the teacher image in the target pixel selection unit 41, and supplies the dynamic range information to the tap selection units 112Q and 113Q and the classification unit 114Q.

In the same manner as that of the representative value calculation unit 202 of FIG. 20, the representative value calculation unit 312 calculates the Q representative value (the G representative value, the R representative value, and the B representative value) for the target pixel from the input image supplied thereto, and supplies the Q representative value to the level conversion unit 315Q and the level conversion unit 316Q.

In the same manner as that of the average value calculation unit 203 of FIG. 20, the average value calculation unit 313 acquires the average value of the R component as the pixel value of the plurality of input pixels close to the position of the input image corresponding to the target pixel, as the corresponding position pixel value which is the pixel value in the position of the input image corresponding to the target pixel, and supplies the average value to the grayscale conversion unit 314.

In the same manner as that of the grayscale conversion unit 204 of FIG. 20, the grayscale conversion unit 314 performs the logarithm operation of, for example, (the corresponding position pixel value of) the pixel value in the position of the input image corresponding to the target pixel from the average value calculation unit 313, as the grayscale conversion of the input image, and supplies the grayscale conversion value obtained as a result thereof to the classification unit 114Q.

In the same manner as that of the level conversion unit 205Q of FIG. 20, the level conversion unit 315Q performs the level conversion of the class tap for Q from the tap selection unit 113Q using the Q representative value from the representative value calculation unit 312 if necessary, and supplies the class tap after the level conversion to the classification unit 114Q.

In the same manner as the level conversion unit 206Q of FIG. 20, the level conversion unit 316Q performs the level conversion of the prediction tap for Q from the tap selection unit 112Q using the Q representative value from the representative value calculation unit 312 if necessary, and supplies the prediction tap after the level conversion to the adding unit 45Q.

As described in FIG. 20, it is not necessary to provide the level conversion unit 205Q or 206Q in the image conversion device 200, in some cases. In the case where it is not necessary to provide the level conversion unit 205Q or 206Q in the image conversion device 200, it is not necessary to provide the level conversion unit 315Q or 316Q of FIG. 32 corresponding to the level conversion unit 205Q or 206Q in the learning unit 301, either.

Learning Process of Learning Device 300

Figure 33:
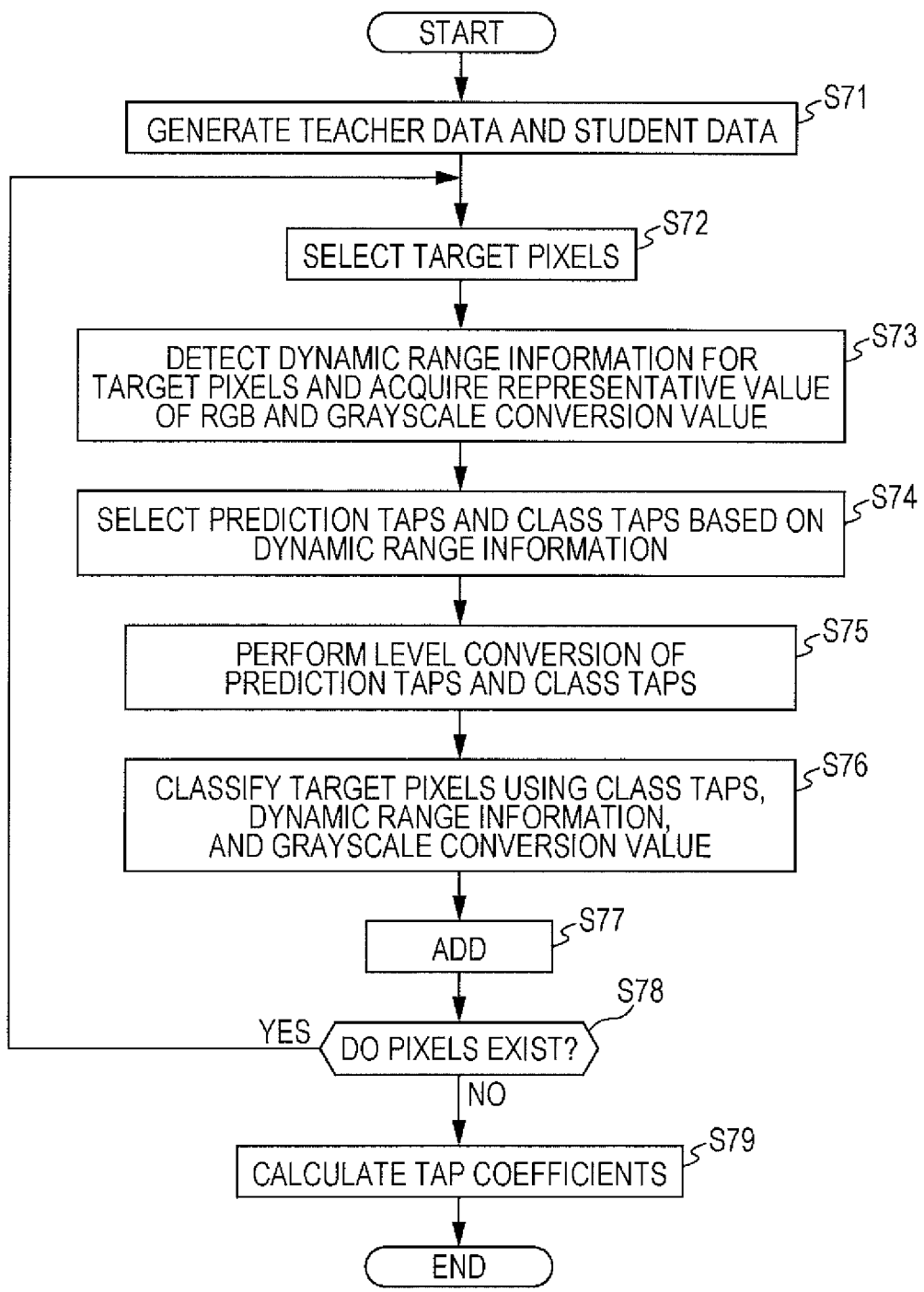
FIG. 33 is a flowchart illustrating a process (learning process) of a learning device.

FIG. 33 is a flowchart illustrating a process (learning process) of the learning device 300 of FIG. 31.

First, in Step S71, the teacher data generation unit 32 and the student data generation unit 34 generate a teacher image (teacher data) and a student image (student data) from the image for learning which is stored in the learning image storage unit 31, and supply the images to the teacher data storage unit 33 and the student data storage unit 35, respectively, to be stored therein.

After that, the process proceeds to Step S72. In the learning unit 301, the target pixel selection unit 41 selects the pixel which is not yet set as the target pixel, as the target pixel, from the pixels of the teacher image stored in the teacher data storage unit 33, and the process proceeds to Step S73.

In Step S73, in the same manner as the dynamic range detection unit 20 of FIG. 20, the dynamic range detection unit 311 detects the dynamic range information of the Q component for the target pixel, in the same manner as the dynamic range detection unit 201 of FIG. 20, using the student image stored in the student data storage unit 35, and supplies the dynamic range information to the tap selection units 112Q and 113Q and the classification unit 114Q.

In addition, in Step S73, the representative value calculation unit 312 calculates the Q representative value, in the same manner as the representative value calculation unit 202 of FIG. 20, using the student image stored in the student data storage unit 35, for the target pixel, and supplies the Q representative value to the level conversion units 315Q and 316Q.

In Step S73, in the same manner as the average value calculation unit 203 of FIG. 20, the average value calculation unit 313 acquires the average value of the pixel value (G component) of the plurality of G input pixels close to the position of the student image corresponding to the target pixel, as the corresponding position pixel value, using the student image stored in the student data storage unit 35, and supplies the average value to the grayscale conversion unit 314.

In the same manner as the grayscale conversion unit 204 of FIG. 20, the grayscale conversion unit 314 performs the logarithm operation of the corresponding position pixel value from the average value calculation unit 313, as the grayscale conversion of the input image, and supplies the grayscale conversion value obtained as a result thereof to the classification units 114Q, and the process proceeds from Step S73 to Step S74.

In Step S74, in the same manner as the tap selection unit 62Q of FIG. 20, the tap selection unit 112Q selects the pixel which is the prediction tap for the target pixel, from the student image stored in the student data storage unit 35, based on the dynamic range information from the dynamic range detection unit 311, and supplies the pixel to the level conversion unit 316Q.

In addition, in Step S74, in the same manner as the tap selection unit 63Q of FIG. 20, the tap selection unit 113Q selects the pixel which is the class tap for the target pixel, from the student image stored in the student data storage unit 35, based on the dynamic range information from the dynamic range detection unit 311, and supplies the pixel to the level conversion unit 315Q, and the process proceeds to Step S75.

In Step S75, in the same manner as the level conversion unit 205Q of FIG. 20, the level conversion unit 315Q performs the level conversion of the class tap from the tap selection unit 113Q and supplies the class tap after the level conversion to the classification unit 114Q.

In addition, in Step S75, in the same manner as the level conversion unit 206Q of FIG. 20, the level conversion unit 316Q performs the level conversion of the prediction tap from the tap selection unit 112Q and supplies the prediction tap after the level conversion to the adding unit 45Q, and the process proceeds to Step S76.

In Step S76, the classification unit 114Q classifies (the Q component) of the target pixel, in the same manner as the classification unit 64Q of FIG. 20, using the dynamic range information, the grayscale conversion value from the grayscale conversion unit 314, and the class tap from the level conversion unit 315Q based on the dynamic range information of the Q component from the dynamic range detection unit 311.

In addition, the classification unit 114Q outputs the class code showing the class of the target pixel obtained as a result of the classification thereof, to the adding unit 45Q, and the process proceeds from Step S76 to Step S77.

In Step S77, the adding unit 45Q performs adding of the formula (8) with the pixel of the teacher image as the target pixel stored in the teacher data storage unit 33 and the pixel of the student image as the prediction tap selected for the target pixel supplied from the tap selection unit 112Q as targets, for each class code supplied from the classification unit 114Q, and the process proceeds to Step S78.

In Step S78, the target pixel selection unit 41 determines whether or not the pixel of the teacher image which is not yet set as the target pixel is stored in the teacher data storage unit 33 (FIG. 31). In a case where it is determined that the pixel of the teacher image which is not yet set as the target pixel is stored in the teacher data storage unit 33 in Step S78, the process returns to Step S72, and then the processes subsequent thereto are repeated in the same manner as described above.

In a case where it is determined that the pixel of the teacher image which is not yet set as the target pixel is not stored in the teacher data storage unit 33 in Step S78, the adding unit 45Q supplies the matrix on the left side and the vector on the right side of the formula (8) for each class obtained by the processes from Steps S72 to S77 to the tap coefficient calculation unit 46Q, and the process proceeds to Step S79.

In Step S79, the tap coefficient calculation unit 46Q acquires and outputs the tap coefficient for the Q component for each class, by solving the normal equation for each class configured by the matrix on the left side and the vector on the right side of the formula (8) for each class supplied from the adding unit 45Q, and the process ends.

In the image conversion device 200 of FIG. 20, the tap coefficient for the Q component acquired by the learning process described above is stored in the coefficient output unit 65Q. That is, the tap coefficient for the Q component is stored in the coefficient output unit 65G, the tap coefficient for the R component is stored in the coefficient output unit 65R, and the tap coefficient for the B component is stored in the coefficient output unit 65B.

Description of Computer to which Present Technology is Applied

Next, the sequence of the processes described above can be performed by hardware or by software. In a case of performing the sequence of the processes by the software, a program configuring the software is installed in a general-purpose computer or the like.

Figure 34:
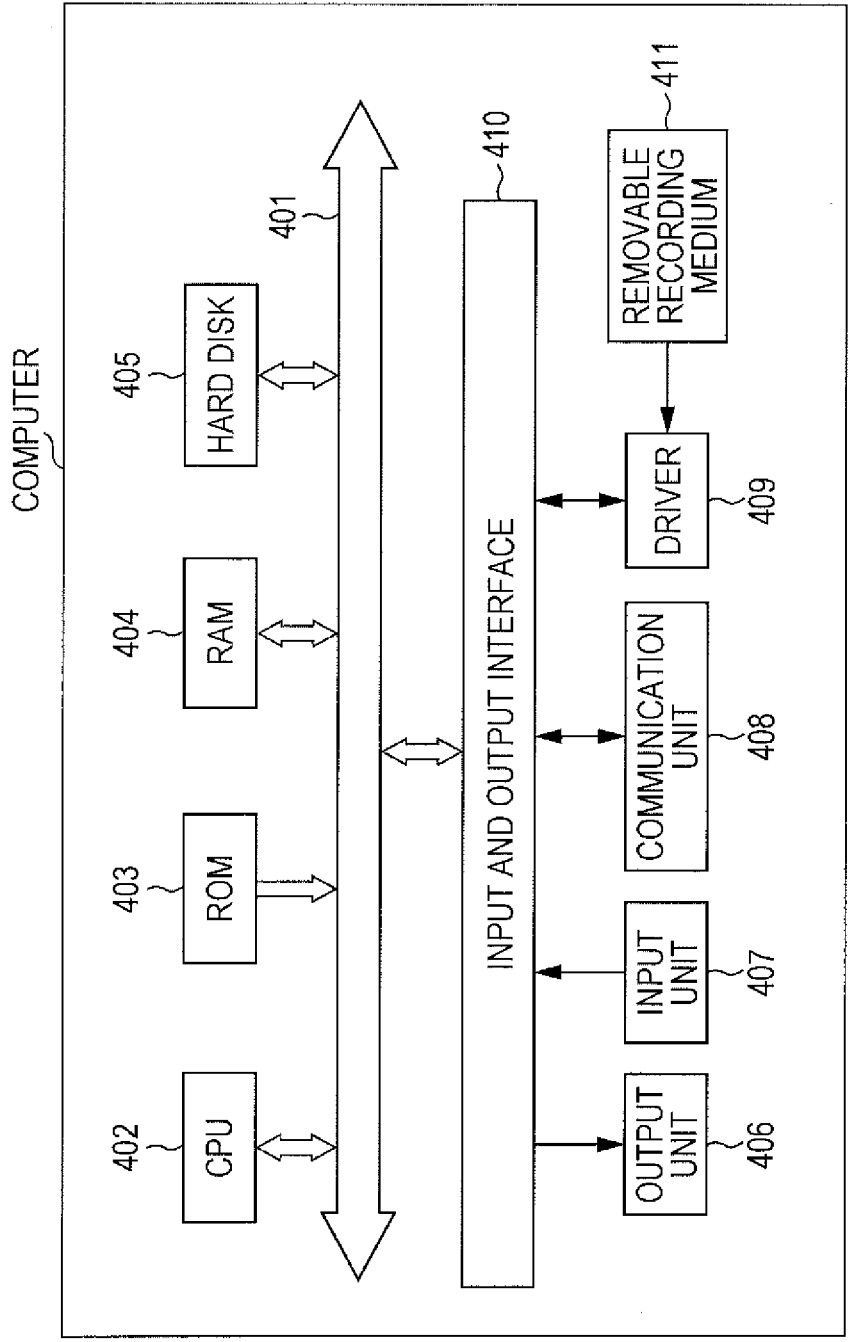
FIG. 34 is a block diagram showing a configuration example of one embodiment of a computer to which the present technology is applied.

Herein, FIG. 34 shows a configuration example of an embodiment of a computer in which the program for executing the sequence of the processes described above is installed.

The program can be previously recorded on a hard disk 405 or a ROM 403 as a recording medium embedded in the computer.

Alternatively, the program can be stored (recorded) on a removable recording medium 411. Such a removable recording medium 411 can be provided as so-called package software. Herein, as the removable recording medium 411, a flexible disk, a compact disc read-only memory (CD-ROM), a magneto-optical (MO) disc, a digital versatile disc (DVD), a magnetic disc, a semiconductor memory, or the like is used, for example.

In addition to being installed in the computer from the removable recording medium 411 described above, the program can also be downloaded to the computer through a communication network or a broadcasting network and be installed on the embedded hard disk 405. That is, the program can be wirelessly transferred to the computer from a download site, for example, through a satellite for digital satellite broadcasting, or can be transferred to the computer in a wired manner through a network such as local area network (LAN) or the Internet.

The computer includes a central processing unit (CPU) 402 embedded therein, and an input and output interface 410 is connected to the CPU 402 through a bus 401.

If a command is input by an input unit 407 manipulated by a user through the input and output interface 410, the CPU 402 executes the program stored in the read-only memory (ROM) 403 based on the command. Alternatively, the CPU 402 loads the program stored in the hard disk 405 in a random access memory (RAM) 404 and executes the program.

Accordingly, the CPU 402 performs the process according to the flowchart described above or the process performed by the configuration of the block diagram described above. Then, the CPU 402 performs the output of the result of the process from an output unit 406, the transmission thereof from a communication unit 408, or the recording thereof to the hard disk 405, through the input and output interface 410, if necessary, for example.

An input unit 407 is configured with a keyboard, a mouse, or a microphone. The output unit 406 is configured with a liquid crystal display (LCD) or a speaker.

Herein, in the specification, the process performed by the computer according to the program is not necessarily performed in time series according to the order disclosed in the flowchart. That is, the process performed by the computer according to the program includes process performed in parallel or separately (for example, parallel processing or process performed by an object).

The program may be subjected to a process performed by one computer (processor) or may be subjected to a distributed process performed by a plurality of computers. The program may be executed after being transferred to a distant computer.

In the specification, a system means an assembly of a plurality of constituent elements (device, module (component) or the like), and all the constituent elements may not be included in the same housing. Accordingly, both of a plurality of devices which are accommodated in separate housings and are connected to each other through a network, and one device in which a plurality of modules are accommodated in one housing are systems.

The embodiment of the present technology is not limited to the embodiments described above, and various modifications can be performed within a range not departing from the gist of the present technology.

For example, the present technology can have a configuration of cloud computing which divides and jointly processes one function with a plurality of devices through a network.

Each step described in the flowcharts described above can be executed by one device and can be also divided and executed by a plurality of devices.

In a case where the plurality of processes are included in one step, the plurality of processes included in one step can be executed by one device and can be also divided and executed by a plurality of devices.

In the embodiments, as the single plate-type image, the image including any color component from the three color components of RGB as a pixel value for each pixel is employed. However, in addition thereto, as the single plate-type image, an image including 4 or 5 color components obtained by adding cyan or yellow to the three color components of RGB or the color components with a larger number of color components as a pixel value for each pixel can be employed.

In addition to the digital camera, the present technology can also be applied to an application for editing an image, for example.

The present technology can have the configuration as described below.

<1> An image processing apparatus including: a prediction tap selection unit which selects a pixel which is a prediction tap used for prediction operation for acquiring a pixel value of a target pixel which is a target from a second image obtained by converting a first image, from the first image; a classification unit which classifies the target pixel to any class from a plurality of classes according to a predetermined regulation; a tap coefficient output unit which outputs a tap coefficient of a class of the target pixel from tap coefficients used for the prediction operation for each of the plurality of classes, acquired by learning to minimize an error between a result of the prediction operation using a student image corresponding to the first image and a teacher image corresponding to the second image; n operation unit which acquires a pixel value of the target pixel by performing the prediction operation using the tap coefficient of the class of the target pixel and the prediction tap of the target pixel; and a dynamic range detection unit which detects dynamic range information showing a local dynamic range in a position of the first image corresponding to the target pixel, in which the prediction tap selection unit changes the number of taps which is the number of pixels which are the prediction taps, based on the dynamic range information.

<2> The image processing apparatus according to <1>, in which the classification unit changes the predetermined regulation based on the dynamic range information.

<3> The image processing apparatus according to <1> or <2>, in which the dynamic range information is information showing a normalized dynamic range obtained by normalizing a difference between a maximum value and a minimum value of the pixel values of the pixels of the first image in a predetermined dynamic range detection area including the position of the first image corresponding to the target pixel, with an average value of the pixel values of the pixels of the first image in the dynamic range detection area.

<4> The image processing apparatus according to any one of <1> to <3>, further including: a class tap selection unit which selects a pixel which is a class tap used for the classification from the first image; and a grayscale conversion unit which performs grayscale conversion of the first image, in which the classification unit performs classification of the target pixel using the class tap and a grayscale value obtained as a result of the grayscale conversion of the first image.

<5> The image processing apparatus according to any one of <1> to <4>, in which the first image includes one color component from a plurality of color components as a pixel value for each pixel, the second image includes the plurality of color components as the pixel value for each pixel, and the operation unit acquires the plurality of color components as the pixel value of the target pixel.

<6> The image processing apparatus according to any one of <1> to <5>, in which the prediction tap selection unit makes the number of prediction taps small as the dynamic range is large, based on the dynamic range information.

<7> The image processing apparatus according to <2>, further including: a class tap selection unit which selects a pixel which is a class tap used for the classification, from the first image, in which the classification unit performs classification of the target pixel by performing adaptive dynamic range coding (ADRC) of quantizing pixel values of each pixel of the class tap to the predetermined number of bits, and makes the predetermined number of bits of the ADRC large as the dynamic range is large, based on the dynamic range information.

<8> An image processing method including: selecting a pixel which is a prediction tap used for prediction operation for acquiring a pixel value of a target pixel which is a target from a second image obtained by converting a first image, from the first image; classifying the target pixel to any class from a plurality of classes according to a predetermined regulation; outputting a tap coefficient of a class of the target pixel from tap coefficients used for the prediction operation for each of the plurality of classes, acquired by learning to minimize an error between a result of the prediction operation using a student image corresponding to the first image and a teacher image corresponding to the second image; acquiring a pixel value of the target pixel by performing the prediction operation using the tap coefficient of the class of the target pixel and the prediction tap of the target pixel; and detecting dynamic range information showing a local dynamic range in a position of the first image corresponding to the target pixel, in which, in the selecting of the pixel, the number of taps which is the number of pixels which are the prediction taps is changed, based on the dynamic range information.

<9> A program for executing a computer to function as: a prediction tap selection unit which selects a pixel which is a prediction tap used for prediction operation for acquiring a pixel value of a target pixel which is a target from a second image obtained by converting a first image, from the first image; a classification unit which classifies the target pixel to any class from a plurality of classes according to a predetermined regulation; a tap coefficient output unit which outputs a tap coefficient of a class of the target pixel from tap coefficients used for the prediction operation for each of the plurality of classes, acquired by learning to minimize an error between a result of the prediction operation using a student image corresponding to the first image and a teacher image corresponding to the second image; an operation unit which acquires a pixel value of the target pixel by performing the prediction operation using the tap coefficient of the class of the target pixel and the prediction tap of the target pixel; and a dynamic range detection unit which detects dynamic range information showing a local dynamic range in a position of the first image corresponding to the target pixel, in which the prediction tap selection unit changes the number of taps which is the number of pixels which are the prediction taps, based on the dynamic range information.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    a prediction tap selection unit which selects a pixel which is a prediction tap used for prediction operation for acquiring a pixel value of a target pixel, which is a target from a second image obtained by converting a first image, from the first image;
    a classification unit which classifies the target pixel to any class from a plurality of classes according to a predetermined regulation;
    a tap coefficient output unit which outputs a tap coefficient of a class of the target pixel from tap coefficients used for the prediction operation for each of the plurality of classes, acquired by learning to minimize an error between a result of the prediction operation using a student image corresponding to the first image and a teacher image corresponding to the second image;
    an operation unit which acquires a pixel value of the target pixel by performing the prediction operation using the tap coefficient of the class of the target pixel and the prediction tap of the target pixel; and
    a dynamic range detection unit which (a) detects dynamic range information showing a local dynamic range in a position of the first image corresponding to the target pixel and (b) outputs the dynamic range information to the classification unit,
    wherein the prediction tap selection unit changes the number of taps, which is the number of pixels which are the prediction taps, based on the dynamic range information.

2. The image processing apparatus according to claim 1, wherein the classification unit changes the predetermined regulation based on the dynamic range information.

3. The image processing apparatus according to claim 2, wherein the dynamic range information is information showing a normalized dynamic range obtained by normalizing a difference between a maximum value and a minimum value of the pixel values of the pixels of the first image in a predetermined dynamic range detection area including the position of the first image corresponding to the target pixel, with an average value of the pixel values of the pixels of the first image in the dynamic range detection area.

4. The image processing apparatus according to claim 2, further comprising:
    a class tap selection unit which selects a pixel which is a class tap used for the classification from the first image; and
    a grayscale conversion unit which performs grayscale conversion of the first image,
    wherein the classification unit performs classification of the target pixel using the class tap and a grayscale value obtained as a result of the grayscale conversion of the first image.

5. The image processing apparatus according to claim 2,
    wherein the first image includes one color component from a plurality of color components as a pixel value for each pixel,
    the second image includes the plurality of color components as the pixel value for each pixel, and
    the operation unit acquires the plurality of color components as the pixel value of the target pixel.

6. The image processing apparatus according to claim 2, wherein the prediction tap selection unit makes the number of prediction taps small as the dynamic range is large, based on the dynamic range information.

7. The image processing apparatus according to claim 2, further comprising:
    a class tap selection unit which selects a pixel which is a class tap used for the classification, from the first image,
    wherein the classification unit
    performs classification of the target pixel by performing adaptive dynamic range coding (ADRC) of quantizing pixel values of each pixel of the class tap to the predetermined number of bits, and
    makes the predetermined number of bits of the ADRC large as the dynamic range is large, based on the dynamic range information.

8. An image processing method comprising:
    detecting dynamic range information showing a local dynamic range in a position of a first image corresponding to a target pixel;
    selecting a pixel which is a prediction tap used for prediction operation for acquiring a pixel value of the target pixel, which is a target from a second image obtained by converting the first image, from the first image;
    classifying the target pixel to any class from a plurality of classes according to a predetermined regulation based on the dynamic range information;
    outputting a tap coefficient of a class of the target pixel from tap coefficients used for the prediction operation for each of the plurality of classes, acquired by learning to minimize an error between a result of the prediction operation using a student image corresponding to the first image and a teacher image corresponding to the second image; and acquiring a pixel value of the target pixel by performing the prediction operation using the tap coefficient of the class of the target pixel and the prediction tap of the target pixel, wherein, in the selecting step for the pixel, a number of taps which is a number of pixels which are the prediction taps is changed, based on the dynamic range information.

9. A non-transitory computer readable medium storing a program for executing a computer to function as:

a prediction tap selection unit which selects a pixel which is a prediction tap used for prediction operation for acquiring a pixel value of a target pixel, which is a target from a second image obtained by converting a first image, from the first image;

a classification unit which classifies the target pixel to any class from a plurality of classes according to a predetermined regulation;

a tap coefficient output unit which outputs a tap coefficient of a class of the target pixel from tap coefficients used for the prediction operation for each of the plurality of classes, acquired by learning to minimize an error between a result of the prediction operation using a student image corresponding to the first image and a teacher image corresponding to the second image;

an operation unit which acquires a pixel value of the target pixel by performing the prediction operation using the tap coefficient of the class of the target pixel and the prediction tap of the target pixel; and a dynamic range detection unit which (a) detects dynamic range information showing a local dynamic range in a position of the first image corresponding to the target pixel and (b) outputs the dynamic range information to the classification unit, wherein the prediction tap selection unit changes a number of taps which is a number of pixels which are the prediction taps, based on the dynamic range information.

* * * * *